(12) United States Patent
Huh et al.

(10) Patent No.: US 11,921,353 B2
(45) Date of Patent: Mar. 5, 2024

(54) OPTICAL IMAGING SYSTEM

(71) Applicant: Samsung Electro-Mechanics Co., Ltd., Suwon-si (KR)

(72) Inventors: Jae Hyuk Huh, Suwon-si (KR); Jae Hyun Baik, Suwon-si (KR); Yong Joo Jo, Suwon-si (KR)

(73) Assignee: Samsung Electro-Mechanics Co., Ltd., Suwon-si (KR)

(\*) Notice: Subject to any disclaimer, the term of this patent is extended or adjusted under 35 U.S.C. 154(b) by 210 days.

(21) Appl. No.: 17/163,752

(22) Filed: Feb. 1, 2021

(65) Prior Publication Data

US 2021/0149156 A1 May 20, 2021

Related U.S. Application Data

(63) Continuation of application No. 16/136,567, filed on Sep. 20, 2018, now Pat. No. 10,935,759.

(30) Foreign Application Priority Data

Nov. 8, 2017 (KR) .................. 10-2017-0148105
Mar. 2, 2018 (KR) .................. 10-2018-0025358

(51) Int. Cl.
*G02B 9/64* (2006.01)
*G02B 13/00* (2006.01)
(Continued)

(52) U.S. Cl.
CPC .......... *G02B 9/64* (2013.01); *G02B 13/0045* (2013.01); *G02B 27/0037* (2013.01); *H04N 23/54* (2023.01)

(58) Field of Classification Search
None
See application file for complete search history.

(56) References Cited

U.S. PATENT DOCUMENTS 10,073,251 B2 9/2018 Lin et al.
2014/0009843 A1\* 1/2014 Tsai .................. G02B 27/0025
359/708
(Continued)

FOREIGN PATENT DOCUMENTS

CN 104570280 A 4/2015
CN 104597582 A 5/2015
(Continued)

OTHER PUBLICATIONS

Korean Office Action dated Aug. 26, 2019, in counterpart Korean Patent Application No. 10-2018-0025358 (10 pages in English, 7 pages in Korean).
(Continued)

*Primary Examiner* — Darryl J Collins
(74) *Attorney, Agent, or Firm* — NSIP Law

(57) ABSTRACT

An optical imaging system includes an optical system including at least six lenses, sequentially disposed from an object side toward an image side, an image sensor configured to convert light incident through the optical system into an electronic signal, and a variable stop configured to change an incident hole diameter and disposed toward the object side of a lens of the optical system closest to the object side, wherein TTL is a distance to an imaging plane of the image sensor from an object-side surface of the lens closest to the object side and 4.7 mm<TTL<6.00 mm, and wherein Ri is a radius of curvature of an object-side surface of a lens of the optical system second closest to the image sensor, Rj is a radius of curvature of an image-side surface of the lens that is second closest to the image sensor, and $-0.5<(|Ri|-|Rj|)/(|Ri|+|Rj|)<0.5$.

8 Claims, 32 Drawing Sheets

(51) Int. Cl.
*G02B 27/00* (2006.01)
*H04N 23/54* (2023.01)

(56) References Cited

U.S. PATENT DOCUMENTS

| | | |
|---|---|---|
| 2014/0015991 A1 | 1/2014 | Yamada et al. |
| 2014/0078603 A1 | 3/2014 | You |
| 2014/0139698 A1 | 5/2014 | Fukuta et al. |
| 2015/0103414 A1 | 4/2015 | Baik |
| 2016/0033742 A1 | 2/2016 | Huang |
| 2016/0341934 A1 | 11/2016 | Mercado |
| 2017/0082834 A1 | 3/2017 | Tang et al. |
| 2017/0082835 A1 | 3/2017 | Tang et al. |
| 2017/0146811 A1 | 5/2017 | Son |
| 2018/0031808 A1 | 2/2018 | Yao et al. |
| 2018/0052304 A1 | 2/2018 | Wu et al. |
| 2018/0074295 A1 | 3/2018 | Lin et al. |
| 2018/0149833 A1 | 5/2018 | Lee et al. |
| 2018/0188482 A1 | 7/2018 | Jhang et al. |
| 2018/0188483 A1 | 7/2018 | Hsieh et al. |
| 2018/0188485 A1* | 7/2018 | Fan ................... G02B 9/64 |
| 2019/0025549 A1* | 1/2019 | Hsueh ............. G02B 13/0045 |
| 2019/0025551 A1* | 1/2019 | Kuo ................ G02B 13/0045 |
| 2021/0048624 A1* | 2/2021 | Liu ................. G02B 13/0045 |

FOREIGN PATENT DOCUMENTS

| | | |
|---|---|---|
| CN | 105319680 A | 2/2016 |
| CN | 106547071 A | 3/2017 |
| CN | 106547072 A | 3/2017 |
| CN | 106896476 A | 6/2017 |
| CN | 106896477 A | 6/2017 |
| CN | 106896478 A | 6/2017 |
| JP | 5574049 B2 | 8/2014 |
| JP | 5578275 B2 | 8/2014 |
| KR | 10-2014-0035829 A | 3/2014 |
| KR | 10-2016-0126445 A | 11/2016 |
| KR | 10-2017-0059806 A | 5/2017 |
| TW | 1589922 B | 7/2017 |

OTHER PUBLICATIONS

Chinese Office Action dated Jan. 11, 2021, in counterpart Chinese Patent Application No. 201811319496.3 (4 pages in English, 6 pages in Chinese).

U.S. Appl. No. 16/136,567, filed Sep. 20, 2018, Jae Hyuk Huh et al., Samsung Electro-Mechanics Co., Ltd.

Chinese Office Action dated Jul. 1, 2021, in counterpart Chinese Patent Application No. 201811319496.3 (23 pages in English and 21 pages in Chinese).

* cited by examiner

OPTICAL IMAGING SYSTEM

CROSS-REFERENCE TO RELATED APPLICATIONS

This application is a continuation of application Ser. No. 16/136,567 filed on Sep. 20, 2018, and claims the benefit under 35 USC 119(a) of Korean Patent Application Nos. 10-2017-0148105 filed on Nov. 8, 2017, and 10-2018-0025358 filed on Mar. 2, 2018, in the Korean Intellectual Property Office, the entire disclosures of which are incorporated herein by reference for all purposes.

BACKGROUND

1. Field

This application relates to an optical imaging system.

2. Description of Related Art

Recently, portable terminals include cameras to enable the capturing and transmission of video images and photography. As utilization of cameras installed in portable terminals has increased, there has been a gradually increasing need for high resolution and high performance in cameras for portable terminals.

However, according to current trends for minimized or lightweight portable terminals, there is a limit in embodying a camera with high resolution and high performance in portable terminals.

To overcome these problems, recently, camera lenses have been formed of a plastic material lighter than glass and optical imaging systems have been configured with six or more lenses to achieve high resolution.

Optical imaging systems have also been configured with a small f-number (Fno) value to embody a light image even in a low light level environment.

However, when an optical imaging system is configured with a small Fno value, a light image is embodied, but it may be difficult to embody a clear image due to a degraded depth.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes an optical system including at least six lenses sequentially disposed from an object side toward an image side, an image sensor configured to convert light incident through the optical system into an electronic signal, and a variable stop configured to change an incident hole diameter and disposed toward the object side of a lens of the optical system closest to the object side, wherein TTL is a distance to an imaging plane of the image sensor from an object-side surface of the lens closest to the object side and 4.7 mm<TTL<6.00 mm, and wherein Ri is a radius of curvature of an object-side surface of a lens of the optical system second closest to the image sensor, Rj is a radius of curvature of an image-side surface of the lens that is second closest to the image sensor, and $-0.5<(|Ri|-|Rj|)/(|Ri|+|Rj|)<0.5$.

In the optical imaging system, $|Ri/Rj|$ may be greater than 0.8 and less than or equal to 1.2.

In the optical imaging system, f14 may be a synthesized focal length of four lenses of the optical system disposed closest to the object side, f may be an overall focal length of the optical system, and f14 may be greater than f.

IMGHT may be one half of a diagonal length of the imaging plane of the image sensor and TTL/IMGHT may be less than 2.0.

FOV may be an angle of view of the optical system and FOV may be greater than or equal to 70°.

Nmax may be a largest refractive index among a refractive index of a lens of the optical system second closest to the object side, a refractive index of a lens of the optical system that is third closest to the object side, and a refractive index of a lens of the optical system that is fourth closest to the object side, and Nmax may be greater than 1.64 and less than or equal to 1.75.

The overall focal length of the optical system, f, may be greater than 4.0 and less than 4.5.

EPD_max may be a maximum diameter of an entrance pupil of the optical system, and f/EPD_max may be less than or equal to 1.7.

EPD_min may be a minimum diameter of an entrance pupil of the optical system, and f/EPD_min greater than 2.0.

The at least six lenses may include a first lens having a positive refractive power, a second lens having a positive refractive power, a third lens having a negative refractive power, a fourth lens having a positive refractive power, a fifth lens having a negative refractive power and an inflection point on an image-side surface, and a sixth lens having a negative refractive power and an inflection point on an image-side surface.

The at least six lenses may include a first lens having a positive refractive power, a second lens having a negative refractive power, a third lens having a positive refractive power, a fourth lens having a positive refractive power, a fifth lens having a positive or negative refractive power, a sixth lens having a positive or negative refractive power and an inflection point on an image-side surface, and a seventh lens having a negative refractive power and an inflection point on an image-side surface.

The at least six lenses may include a first lens having a positive refractive power, a second lens having a positive refractive power, a third lens having a positive refractive power, a fourth lens having a negative refractive power, a fifth lens having a negative refractive power, a sixth lens having a positive refractive power, a seventh lens having a positive refractive power and an inflection point on an image-side surface, and an eighth lens having a negative refractive power and an inflection point on an image-side surface.

In another general aspect, an optical imaging system includes an optical system having at least six lenses, sequentially disposed from an object side toward an image side, an image sensor configured to convert light incident through the optical system into an electronic signal, a variable stop configured to change an incident hole diameter and disposed toward the object side of a lens of the optical system closest to the object side, wherein the lens closest to the object side has a positive refractive power, wherein a lens of the optical system second closest to the object side has an object-side surface having a convex shape, wherein Nmax is a largest refractive index among a refractive index of the lens second closest to the object side, a refractive index of a lens of the optical system that is third closest to the object side, and a refractive index of a lens of the optical system that is fourth closest to the object side, and 1.64<Nmax≤1.75, and wherein Ri is a radius of curvature of an object-side surface of a lens of the optical system second closest to the image sensor, Rj is a radius of curvature of an image-side surface of the lens that is second closest to the image sensor, and −0.5<(|Ri|−|Rj|)/(|Ri|+|Rj|)<0.5.

A lens of the optical system closest to the image sensor and the lens second closest to the image sensor may each include an inflection point on an image-side surface.

In another general aspect, an optical imaging system includes an optical system having at least six lenses, sequentially disposed from an object side toward an image side, an image sensor configured to convert light incident through the optical system into an electronic signal, and a variable stop configured to change an incident hole diameter from a first diameter to a second diameter less than the first diameter, and the variable stop is disposed toward the object side of a lens of the optical system closest to the object side, wherein the optical system includes a first f-number (Fno) and a first focal point at the first diameter of the incident hole and a second Fno and a second focal point at the second diameter of the incident hole, and wherein the first focal point and the second focal point are at substantially the same position.

The optical imaging system may further include a stop disposed between first and second lenses of the optical system closest to the object side or second and third lenses of the optical system closest to the object side, wherein at the first diameter the optical system may have a first aperture including the stop and at the second diameter the optical system may have a second aperture including the variable stop.

In the optical system, Ri may be a radius of curvature of an object-side surface of a lens of the optical system second closest to the image sensor, Rj may be a radius of curvature of an image-side surface of the lens that is second closest to the image sensor, and −0.5<(|Ri|−|Rj|)/(|Ri|+|Rj|) may be greater than −0.5 and less than 0.5.

The first Fno may be less than 1.7 and the second Fno may be greater than 2.0.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
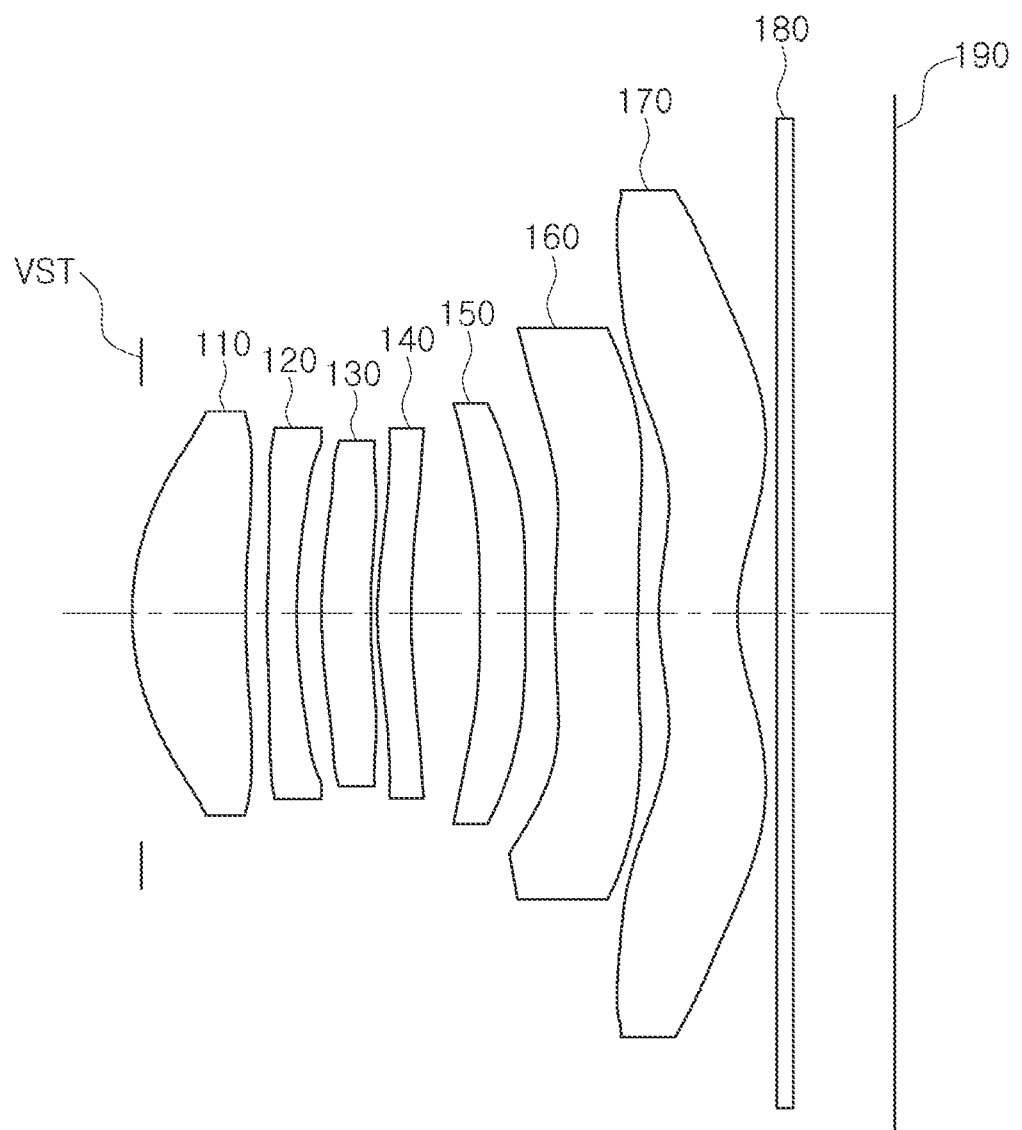
FIG. 1 is a diagram illustrating a state in which a variable stop is open to a maximum degree in an example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, for example, as to what an example may include or implement, means that at least one example exists in which such a feature is included or implemented, but not all examples are limited thereto.

The thicknesses, sizes, and shapes of lenses in the following diagrams illustrating structures of lenses are exaggerated to some degree for explanation of the drawings, for example, shapes of spherical surfaces or aspherical surfaces presented in the drawings illustrating the structures of lenses are presented merely as examples and the present disclosure is not limited to such shapes.

An aspect of the present disclosure may provide an optical imaging system adjusting an amount of incident light, depending on a light level of a surrounding environment, and having high resolution.

An optical imaging system in the examples presented herein may include a plurality of lenses arranged along an optical axis. The plurality of lenses may be spaced apart from each other along an optical axis by a predetermined distance. The lenses may be referred to as an optical system, for example, the lenses may be disposed in an optical system that includes other elements, or the lenses may be the optical system.

For example, the optical imaging system includes six or more lenses.

In an example in which the optical imaging system includes six lenses, a first lens refers to a lens closest to an object, while a sixth lens refers to a lens closest to an imaging plane.

In another example in which the optical imaging system includes seven lenses, a first lens refers to a lens closest to an object, while a seventh lens refers to a lens closest to an imaging plane.

In still another example in which the optical imaging system includes eight lenses, a first lens refers to a lens closest to an object, while an eighth lens refers to a lens closest to an imaging plane.

A first surface of each lens refers to a surface closest to an object (or object-side surface) and a second surface refers to a surface closest to an imaging plane (or an image-side surface). In the examples described herein, a radius of curvature of a lens, a thickness, a distance, an effective aperture radius, and the like have a unit of millimeters (mm) and an angle has a unit of degrees (°).

The effective aperture radius may refer to a radius of one surface (object-side surface or image-side surface) of each lens through which incident light actually passes. For example, an effective aperture radius of the object-side surface of the first lens may refer to a straight distance between an optical axis and an end portion of the object-side surface of the first lens, on which light is incident.

In a description for shapes of the lenses, the meaning that one surface of a lens is convex is that a paraxial axis portion of a corresponding surface is convex, and the meaning that one surface of a lens is concave is that a paraxial axis portion of a corresponding surface is concave. Therefore, although it is described that one surface of a lens is convex, an edge portion of the lens may be concave. Likewise, although it is described that one surface of a lens is concave, an edge portion of the lens may be convex.

The paraxial region may refer to a narrow region adjacent to and including an optical axis.

In the examples described herein, the optical imaging system may include six or more lenses.

In the example in which the optical imaging system includes six lenses, the optical imaging system may include a first lens, a second lens, a third lens, a fourth lens, a fifth lens, and a sixth lens that are sequentially disposed from an object side.

In the example in which the optical imaging system includes seven lenses, the optical imaging system may include a first lens, a second lens, a third lens, a fourth lens, a fifth lens, a sixth lens, and a seventh lens that are sequentially disposed from an object side.

In the example in which the optical imaging system includes eight lenses, the optical imaging system may include a first lens, a second lens, a third lens, a fourth lens, a fifth lens, a sixth lens, a seventh lens, and an eighth lens that are sequentially disposed from an object side.

The optical imaging system in the examples described herein may further include other components.

For example, the optical imaging system may further include an image sensor configured to convert an incident image of an object into an electronic signal.

The optical imaging system may further include an infrared block filter configured to block infrared light. The infrared block filter may be disposed between the image sensor and a lens closest to the image sensor.

The optical imaging system may further include a stop for adjusting a light amount. For example, a variable stop may be disposed in front of the first lens and a stop may be disposed between the second lens and the third lens.

The variable stop may be configured with a variable diameter. For example, the variable stop with a variable diameter refers to a variable diameter hole in the variable stop to pass incident light through the variable stop to the optical system. The variable diameter hole may have an adjustable diameter.

In the examples described herein, all lenses included in the optical imaging system may be formed of a plastic material. However, the material of the lenses is not limited to plastic in all examples and may include other materials, for example, glass, fused-silica, quartz, sapphire, and the like.

Each of the plurality of lenses in the examples may have at least one aspherical surface.

That is at least one of first and second surfaces of each lens may be an aspherical surface. Here, the aspherical surface of each lens may be represented according to Equation 1 below.

$$Z = \frac{cY^2}{1 + \sqrt{1 - (1+K)c^2Y^2}} + AY^4 + BY^6 + CY^8 + DY^{10} + EY^{12} + FY^{14} + GY^{16} + HY^{18} + \ldots \quad (1)$$

In the above Equation 1, c is a curvature of a lens (an inverse of a radius of curvature), K is a conic constant, and Y is a distance to an optical axis from an arbitrary point on an aspherical surface of a lens. Constants A to H refer to aspherical surface coefficients. In addition, Z is a distance between the certain point on the aspherical surface of the lens at the distance Y and a tangential plane meeting the apex of the aspherical surface of the lens.

The example optical imaging system including first to sixth lenses may have positive/positive/negative/positive/negative/negative refractive powers sequentially from the object side.

The example optical imaging system including first to seventh lenses may have positive/negative/positive/positive/positive/positive/negative refractive powers sequentially from the object side.

Alternatively, the example optical imaging system including first to seventh lenses may have positive/negative/positive/positive/positive/negative/negative refractive powers sequentially from the object side.

Alternatively, the example optical imaging system including first to seventh lenses may have positive/negative/positive/positive/negative/positive/negative refractive powers sequentially from the object side.

The example optical imaging system including first to eighth lenses may have positive/positive/positive/negative/negative/positive/positive/negative refractive powers sequentially from the object side.

The optical imaging system in the examples described herein may satisfy the following Conditional Expressions 1 to 10.

TTL/IMGHT<2.0 (Conditional Expression 1)

FOV≥70° (Conditional Expression 2)

1.64<Nmax≤1.75 (Conditional Expression 3)

4.7 mm<TTL<6.00 mm (Conditional Expression 4)

4.0 mm<f<4.5 mm (Conditional Expression 5)

f/EPD_max≤1.7 (Conditional Expression 6)

f/EPD_min>2.0 (Conditional Expression 7)

−0.5<(|Ri|−|Rj|)/(|Ri|+|Rj|)<0.5 (Conditional Expression 8)

0.8<|Ri/Rj|≤1.2 (Conditional Expression 9)

f14>f (Conditional Expression 10)

In the above Conditional Expressions 1 to 10, TTL is a distance from the object-side surface of the first lens to the imaging plane of the image sensor on an optical axis, IMGHT is one half of a diagonal length of an imaging plane of an image sensor, FOV is an angle of view of the optical imaging system, Nmax is a largest refractive index among refractive indexes of the second, third, and fourth lenses, f is an overall focal length of the optical imaging system, EPD_max is a maximum diameter of an entrance pupil, EPD_min is a minimum diameter of the entrance pupil, and f14 is a synthetic focal length of first to fourth lenses.

Ri is a radius of curvature of an object-side surface of a lens second closest to the image sensor and Rj is a radius of curvature of an image-side surface of the lens second closest to the image sensor. In an example in which the optical imaging system includes six lenses, Ri is a radius of curvature of an object-side surface of a fifth lens and Rj is a radius of curvature of an image-side surface of the fifth lens. In an example in which the optical imaging system includes seven lenses, Ri is a radius of curvature of an object-side surface of a sixth lens and Rj is a radius of curvature of an image-side surface of the sixth lens. In an example in which the optical imaging system includes eight lenses, Ri is a radius of curvature of an object-side surface of a seventh lens and Rj is a radius of curvature of an image-side surface of the seventh lens.

In the above configured optical imaging system, a plurality of lenses may perform an aberration correction function, thereby enhancing an aberration performance.

FIGS. 1 to 6 are diagrams for explanation of an optical imaging system according to the examples described herein.

Figure 2:
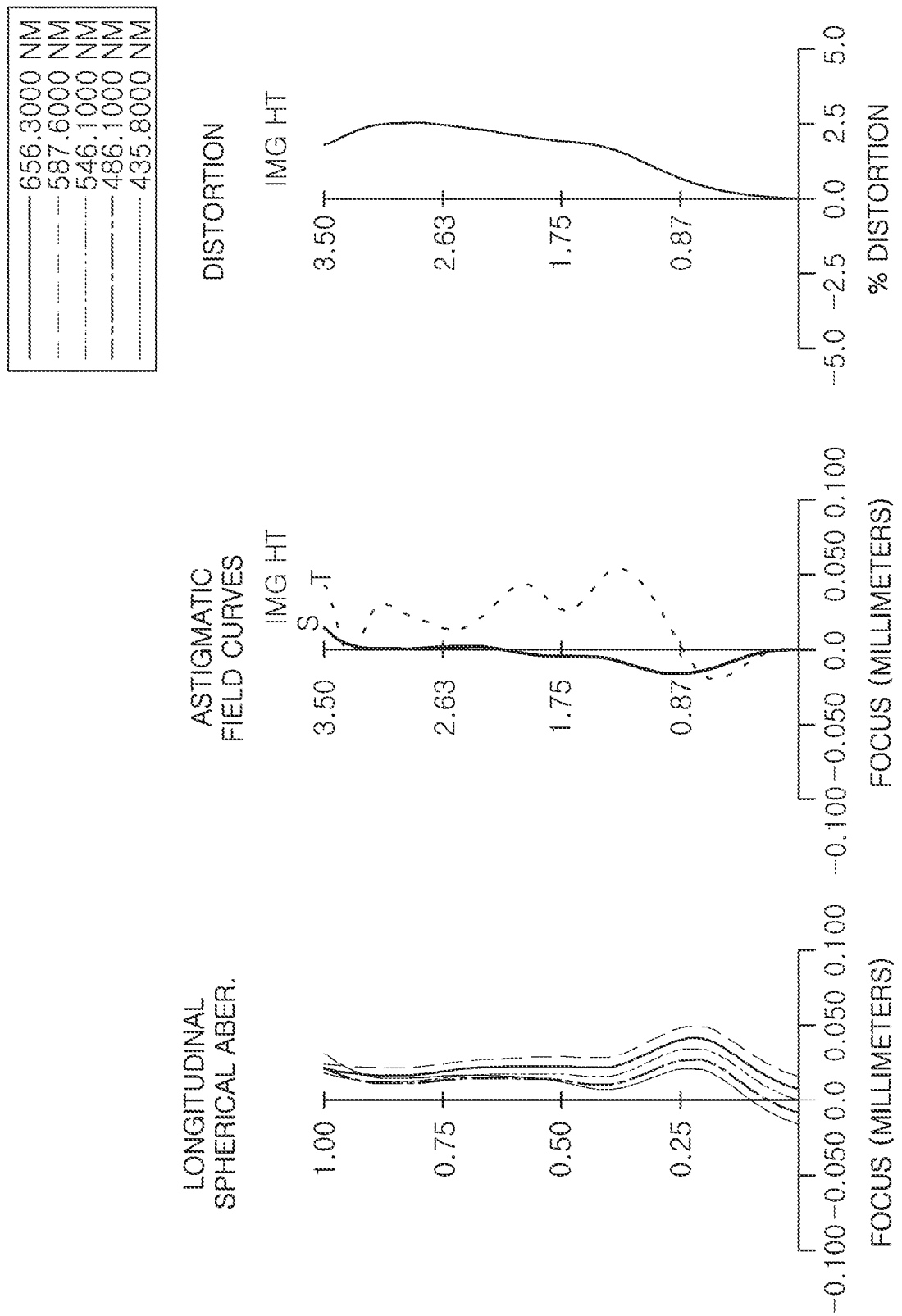
FIG. 2 is a set of curves illustrating aberration characteristics of the optical imaging system shown in FIG. 1.
Figure 3:
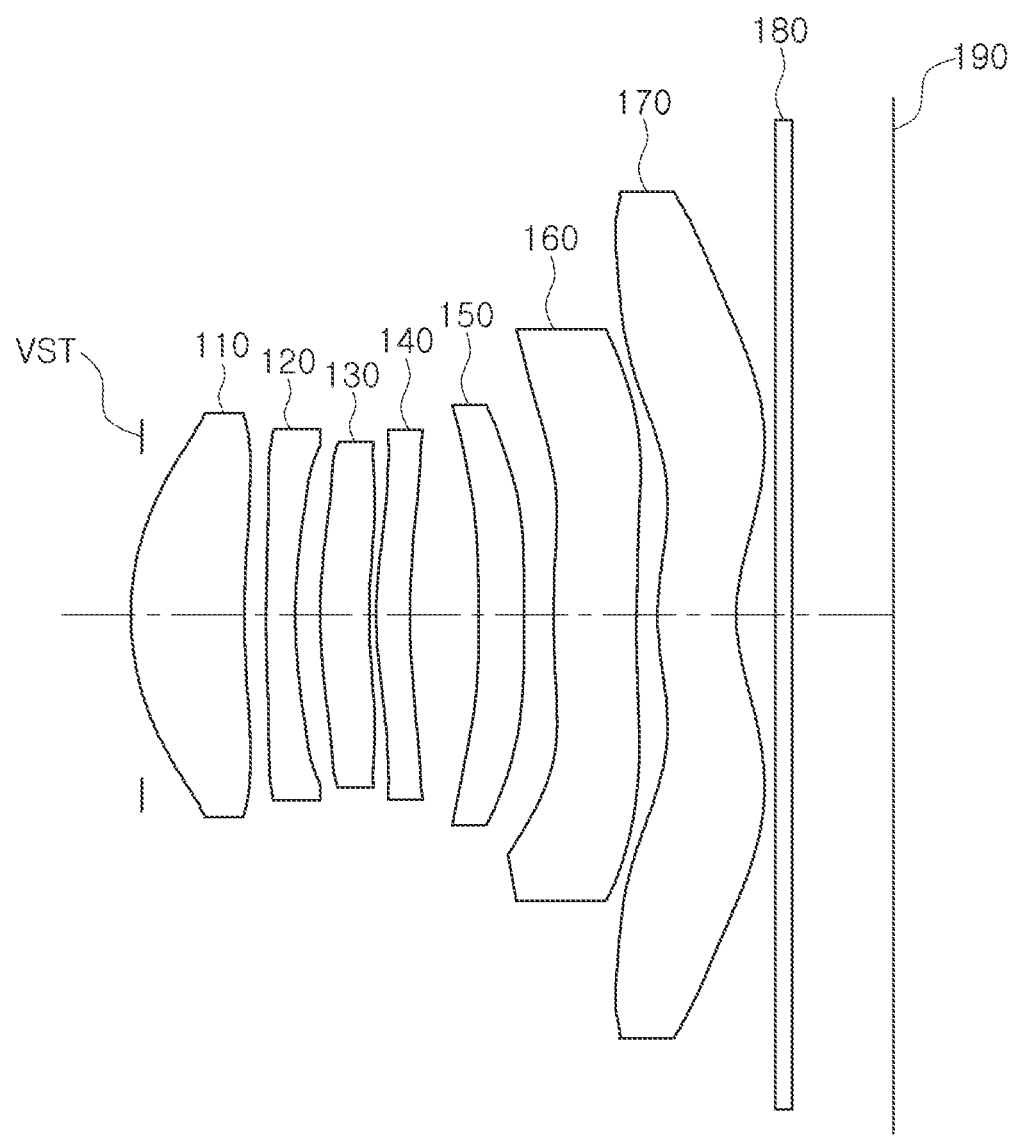
FIG. 3 is a diagram illustrating a case in which the variable stop is narrowed in the example of an optical imaging system.
Figure 4:
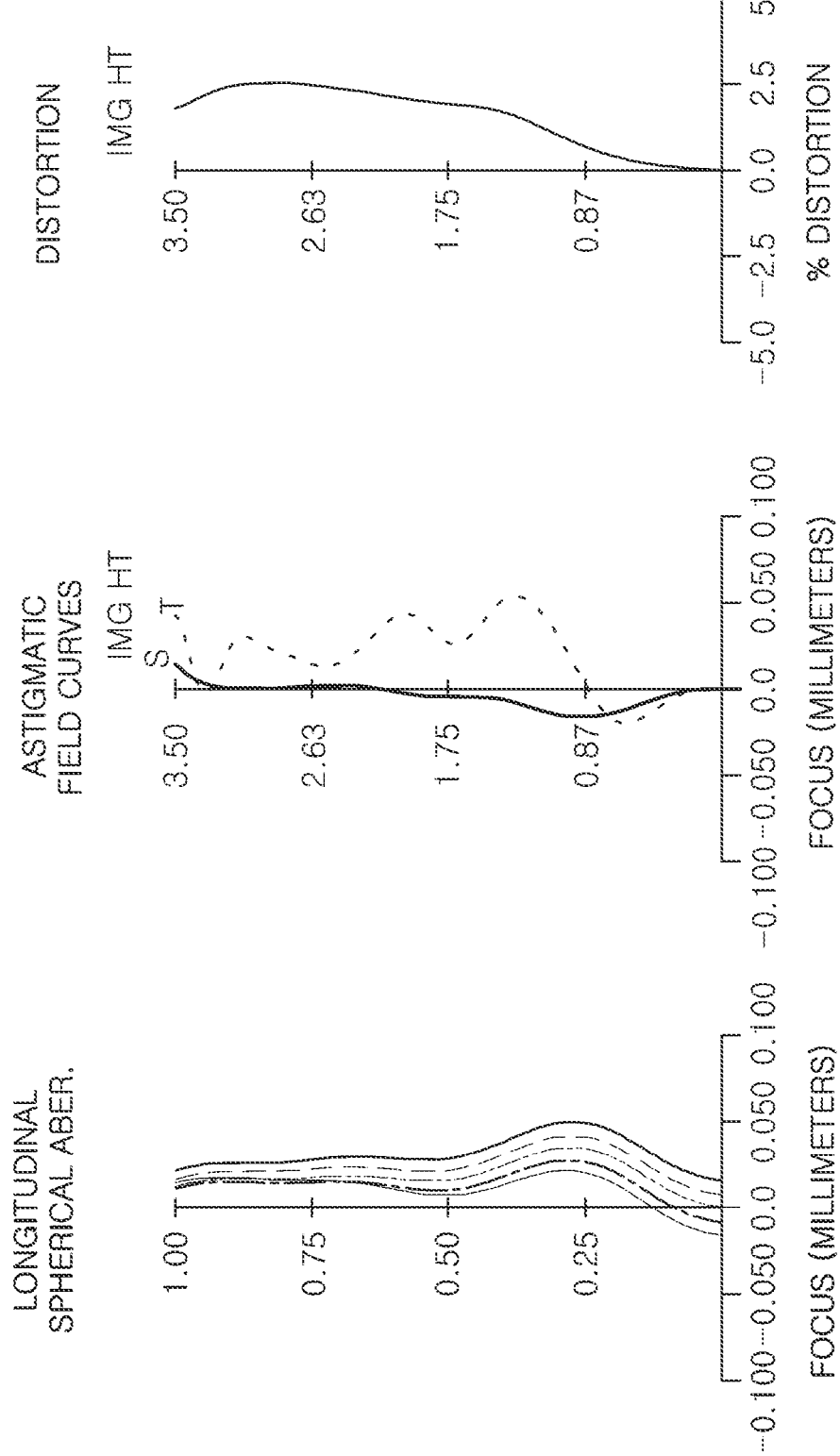
FIG. 4 shows a set of curves illustrating aberration characteristics of the optical imaging system shown in FIG. 3.
Figure 5:
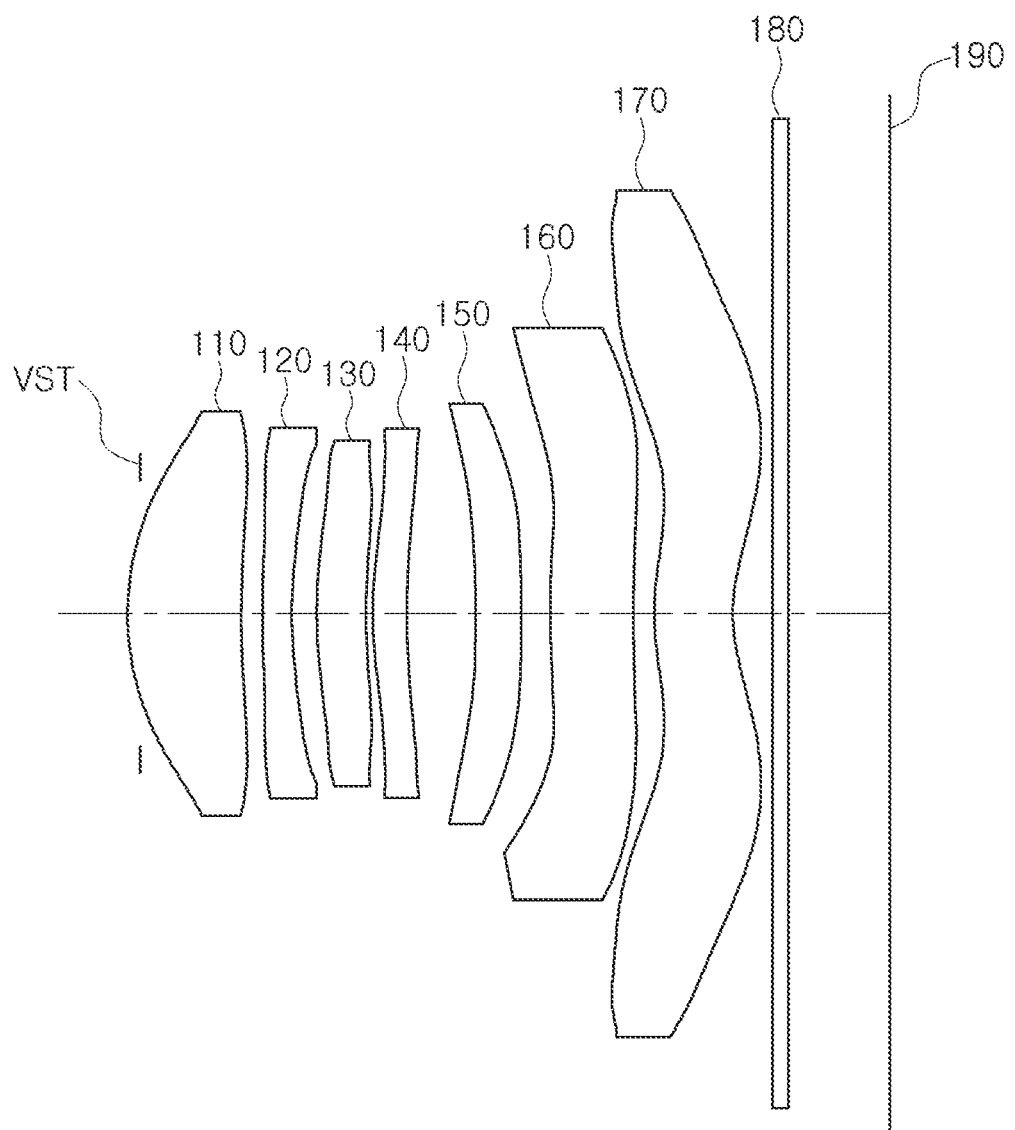
FIG. 5 is a diagram illustrating a case in which the variable stop is narrowed to a maximum degree in the example of an optical imaging system.
Figure 6:
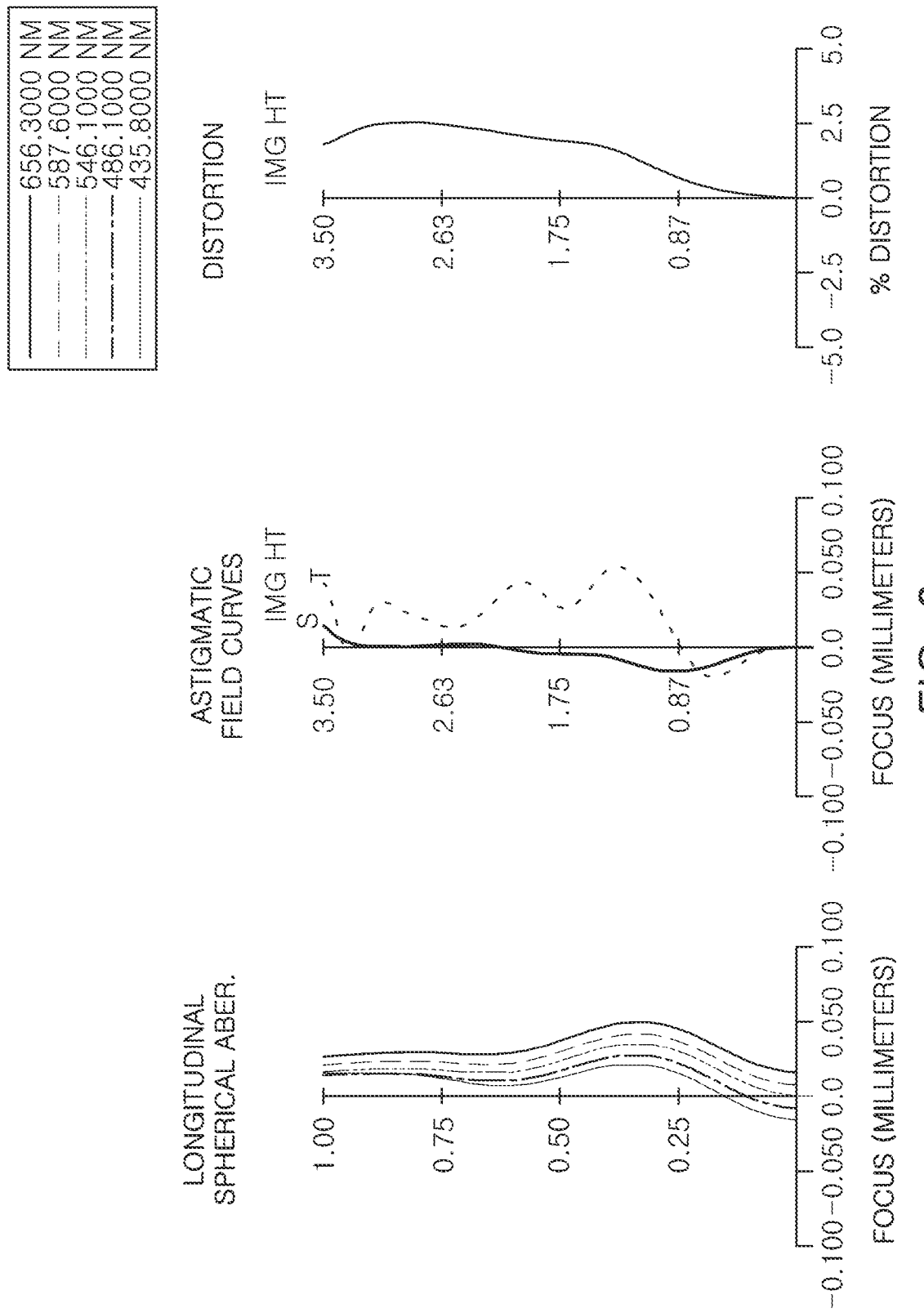
FIG. 6 is a set of curves illustrating aberration characteristics of the optical imaging system shown in FIG. 5.

FIGS. 1 and 2 show a state in which a variable stop is open to a predetermined maximum degree in the optical imaging system according to the example. FIGS. 3 and 4 show a state in which a variable stop is narrowed, such that the variable stop is narrower than the predetermined maximum. FIGS. 5 and 6 show a state in which a variable stop is narrowed to a predetermined maximum degree narrower than shown in FIGS. 3 and 4 in the example.

The optical imaging system according to the example may include an optical system including a first lens 110, a second lens 120, a third lens 130, a fourth lens 140, a fifth lens 150, a sixth lens 160, and a seventh lens 170 and the optical imaging system may further include an infrared block filter 180, an image sensor 190, and a variable stop VST.

Lens characteristics of each lens (a radius of curvature, a thickness of a lens, a distance between lenses, a refractive index, Abbe number, and an effective aperture radius) are shown in Tables 1 to 3 below.

TABLE 1

Fno = 1.5, f = 4.3, FOV = 76.72

| Surface No. | | Radius of Curvature | Thickness/ Distance | Refractive Index | Abbe Number | Effective Aperture Radius |
|---|---|---|---|---|---|---|
| S0 | VST | | | | | 1.550 |
| S1 | First Lens | 1.830 | 0.772 | 1.544 | 56.094 | 1.368 |
| S2 | | 6.299 | 0.145 | | | 1.331 |
| S3 | Second Lens | 8.273 | 0.200 | 1.661 | 20.353 | 1.254 |
| S4 | | 3.569 | 0.170 | | | 1.150 |
| S5 | Third Lens | 3.731 | 0.334 | 1.544 | 56.094 | 1.150 |
| S6 | | 3.762 | 0.047 | | | 1.170 |
| S7 | Fourth Lens | 2.662 | 0.230 | 1.5,14 | 56.094 | L192 |
| S8 | | 5.150 | 0.469 | | | 1.250 |
| S9 | Fifth Lens | −1000.000 | 0.311 | 1.661 | 20.353 | 1.300 |
| S10 | | −1000.000 | 0.197 | | | 1.548 |
| S11 | Sixth Lens | 1000.000 | 0.567 | 1.639 | 23.528 | 1.721 |

TABLE 1-continued

Fno = 1.5, f = 4.3, FOV = 76.72

| Surface No. | | Radius of Curvature | Thickness/ Distance | Refractive Index | Abbe Number | Effective Aperture Radius |
|---|---|---|---|---|---|---|
| S12 | | −1000.000 | 0.143 | | | 2.250 |
| S13 | Seventh Lens | 1.688 | 0.535 | 1.534 | 55.656 | 2.720 |
| S14 | | 1.173 | 0.267 | | | 2.880 |
| S15 | Infrared Block Filter | Infinity | 0.110 | 1.518 | 64.197 | 3.305 |
| S16 | | Infinity | 0.680 | | | 3.344 |
| S17 | Imaging Plane | Infinity | 0.010 | | | 3.701 |

Table 1 above shows the case in which a diameter of a variable stop is largest (open to a predetermined maximum degree).

TABLE 2

Fno = 2.0, f = 4.3, FOV = 76.72

| Surface No. | | Radius of Curvature | Thickness/ Distance | Refractive Index | Abbe Number | Effective Aperture Radius |
|---|---|---|---|---|---|---|
| S0 | VST | | | | | 1.100 |
| S1 | First Lens | 1.830 | 0.772 | 1.544 | 56.094 | 1.368 |
| S2 | | 6.299 | 0.145 | | | 1.331 |
| S3 | Second Lens | 8.273 | 0.200 | 1.661 | 20.353 | 1.254 |
| S4 | | 3.569 | 0.170 | | | 1.150 |
| S5 | Third Lens | 3.731 | 0.334 | 1.544 | 56.094 | 1.150 |
| S6 | | 3.762 | 0.047 | | | 1.170 |
| S7 | Fourth Lens | 2.662 | 0.230 | 1.544 | 56.094 | 1.192 |
| S8 | | 5.150 | 0.469 | | | 1.250 |
| S9 | Fifth Lens | −1000.000 | 0.311 | 1.661 | 20,353 | 1.300 |
| S10 | | −1000.000 | 0.197 | | | 1.548 |
| S11 | Sixth Lens | 1000.000 | 0.567 | 1.639 | 23.528 | 1.721 |
| S12 | | −1000.000 | 0.143 | | | 2.250 |
| S13 | Seventh Lens | 1.688 | 0.535 | 1.534 | 55.656 | 2.720 |
| S14 | | 1.173 | 0.267 | | | 2.880 |
| S15 | Infrared Block Filter | Infinity | 0.110 | 1.518 | 64.197 | 3.305 |
| S16 | | Infinity | 0.680 | | | 3.344 |
| S17 | Imaging Plane | Infinity | 0.010 | | | 3.701 |

Table 2 above shows the case in which a diameter of a variable stop is smaller than in Table 1 above.

TABLE 3

Fno = 2.4, f = 4.3, FOV = 76.72

| Surface No. | | Radius of Curvature | Thickness/ Distance | Refractive Index | Abbe Number | Effective Aperture Radius |
|---|---|---|---|---|---|---|
| S0 | VST | | | | | 0.900 |
| S1 | First Lens | 1.830 | 0.772 | 1.544 | 56.094 | 1.368 |
| S2 | | 6.299 | 0.145 | | | 1.331 |
| S3 | Second Lens | 8.273 | 0.200 | 1.661 | 20.353 | 1.254 |

TABLE 3-continued

Fno = 2.4, f = 4.3, FOV = 76.72

| Surface No. | | Radius of Curvature | Thickness/ Distance | Refractive Index | Abbe Number | Effective Aperture Radius |
|---|---|---|---|---|---|---|
| S4 | | 3.569 | 0.170 | | | 1.150 |
| S5 | Third Lens | 3.731 | 0.334 | 1.544 | 56.094 | 1.150 |
| S6 | | 3.762 | 0.047 | | | 1.170 |
| S7 | Fourth Lens | 2.662 | 0.230 | 1.544 | 56.094 | 1.192 |
| S8 | | 5.150 | 0.469 | | | 1.250 |
| S9 | Fifth Lens | −1000.000 | 0.311 | 1.661 | 20.353 | 1.300 |
| S10 | | −1000.000 | 0.197 | | | 1.548 |
| S11 | Sixth Lens | 1000.000 | 0.567 | 1.639 | 23.528 | 1.721 |
| S12 | | −1000.000 | 0.143 | | | 2.250 |
| S13 | Seventh Lens | 1.688 | 0.535 | 1.534 | 55.656 | 2.720 |
| S14 | | 1.173 | 0.267 | | | 2.880 |
| S15 | Infrared Block Filter | Infinity | 0.110 | 1.518 | 64.197 | 3.305 |
| S16 | | Infinity | 0.680 | | | 3.344 |
| S17 | Imaging Plane | Infinity | 0.010 | | | 3.701 |

Table 3 above shows the case in which a diameter of a variable stop is smallest (narrowed to a predetermined maximum degree).

The optical imaging system according to the example may include the variable stop VST disposed in front of the first lens 110.

The variable stop VST is a device selectively changing an amount of light incident on the optical system including the first lens 110 to the seventh lens 170. For example, a diameter of the variable stop VST may be increased to allow a relatively high amount of light to be incident in a low light level environment (refer to FIG. 1 and Table 1) and a diameter of the variable stop VST may be reduced to allow a relatively low amount of light to be incident in a high light level environment (refer to FIG. 5 and Table 3).

The optical imaging system according to the example may change f-number (Fno) depending on a diameter of the variable stop VST. Fno refers to a value indicating brightness of the optical system.

In the optical imaging system according to the example, when a diameter of the variable stop VST is largest (open to a predetermined maximum degree), Fno may be less than 1.7 and when a diameter of the variable stop VST is smallest (narrowed to a predetermined maximum degree), Fno may be greater than 2.0.

In general, when Fno is changed, a position in which a focal point is formed may be changed. For example, a position in which a focal point is formed when Fno is 1.5 may be different from a position in which a focal point is formed when Fno is 2.4.

However, in the example optical imaging system, even if Fno is changed, a focal point is formed at the same position and, thus, image quality may be maintained constant.

FIG. 2 is a set of curves illustrating aberration characteristics when the example optical imaging system has a smallest Fno value.

A left curve of FIG. 2 shows longitudinal spherical aberration of an optical imaging system with respect to light with various wavelengths.

In the longitudinal spherical aberration curve of FIG. 2, a horizontal axis is a coefficient of longitudinal spherical aberration and a vertical axis is normalization of a distance to an effective aperture from an optical axis.

In a vertical axis of the longitudinal spherical aberration curve of FIG. 2, when a distance to the effective aperture from the optical axis is 1, a point of 0.25 may refer to a point of 25% of the distance to the effective aperture from the optical axis and a point of 0.75 may refer to a point of 75% of the distance to the effective aperture from the optical axis.

The effective aperture is a stop that actually blocks light and, in the example optical imaging system, the variable stop VST disposed in front of the first lens may function as an effective aperture.

Referring to FIG. 2, when the variable stop VST is open to a maximum degree and Fno has a smallest value, the optical imaging system may be configured in such a way that longitudinal spherical aberration has a largest value at a position closest to an optical axis and has a smallest value at a position closest to an effective aperture with respect to light with a wavelength equal to or greater than 546.1 nanometers (nm).

For example, the optical imaging system may be configured in such a way that longitudinal spherical aberration has a largest value at a point between 0 and 0.5 and has a smallest value at a point between 0.5 and 1.0.

Alternatively, the optical imaging system may be configured in such a way that longitudinal spherical aberration has a largest value at a point between 0.2 and 0.3 and has a smallest value at a point between 0.7 and 0.9.

For example, the optical imaging system may be configured in such a way that longitudinal spherical aberration is largest at a point of 0.25 and is smallest at a point of 0.75 with respect to light with a wavelength equal to or greater than 546.1 nm.

The optical imaging system according to the present example may be configured in such a way that a longitudinal spherical aberration curve has an inflection point.

In the present example, the first lens 110 may have a positive refractive power, a first surface of the first lens 110 may have a convex shape in a paraxial region, and a second surface of the first lens 110 may have a concave shape in a paraxial region.

The second lens 120 may have a negative refractive power, a first surface of the second lens 120 may have a convex surface in a paraxial region, and a second surface of the second lens 120 may have a concave shape in a paraxial region.

The first lens 110 and the second lens 120 may be formed of plastic materials with different optical characteristics. For example, a difference of Abbe number between the first lens 110 and the second lens 120 may be greater than 30.

The third lens 130 may have a positive refractive power, a first surface of the third lens 130 may have a convex shape in a paraxial region, and a second surface of the third lens 130 may have a concave shape in a paraxial region.

The fourth lens 140 may have a positive refractive power, a first surface of the fourth lens 140 may have a convex shape in a paraxial region, and a second surface of the fourth lens 140 may have a concave shape in a paraxial region.

The fifth lens 150 may have a positive refractive power and first and second surfaces of the fifth lens 150 may have a very large radius of curvature. The first surface of the fifth lens 150 may have a concave shape in a paraxial region and the second surface of the fifth lens 150 may have a convex shape in a paraxial region.

The sixth lens 160 may have a positive refractive power and first and second surfaces of the sixth lens 160 may have a very large radius of curvature. The first and second surfaces of the sixth lens 160 may have a convex shape in a paraxial region.

At least one inflection point may be formed on at least one of the first and second surfaces of the sixth lens 160. For example, the first surface of the sixth lens 160 may have a shape that becomes more concave toward an edge from a convex shape in a paraxial region. The second surface of the sixth lens 160 may have a shape that becomes more concave toward an edge from a convex shape in a paraxial region.

The seventh lens 170 may have a negative refractive power, a first surface of the seventh lens 170 may have a convex shape in a paraxial region, and a second surface of the seventh lens 170 may have a concave shape in a paraxial region.

At least one inflection point may be formed on at least one of the first and second surfaces of the seventh lens 170. For example, the first surface of the seventh lens 170 may have a shape that becomes more concave toward an edge from a convex shape in a paraxial region. The second surface of the seventh lens 170 may have a shape that becomes more convex toward an edge from a concave shape in a paraxial region.

Each surface of the first lens 110 to the seventh lens 170 may have an aspherical surface coefficient shown in Table 4 below. For example, both an object-side surface and an image-side surface of the first lens 110 to the seventh lens 170 are aspherical surfaces.

TABLE 4

|   | S1 | S2 | S3 | S4 | S5 | S6 | S7 |
|---|---|---|---|---|---|---|---|
| R | 1.8300896 | 6.2991055 | 8.2729295 | 3.5690962 | 3.7310590 | 3.7619952 | 2.6621690 |
| K | −1.6552217 | −24.0002040 | −50.6870574 | 4.8241626 | −12.7994972 | −42.8915719 | −0.3530718 |
| A | 0.0116091 | −0.0129476 | −0.0389719 | −0.0434129 | −0.0082797 | −0.1081493 | −0.2370002 |
| B | 0.0965387 | −0.0363024 | −0.0310197 | −0.0633982 | 0.1615828 | 0.3169587 | 0.5814920 |
| C | −0.3155559 | 0.0414684 | −0.0002133 | 0.1513420 | −0.9392688 | −0.8513916 | −1.6629030 |
| D | 0.6103956 | −0.0431300 | 0.2203593 | −0.3827429 | 2.4165689 | 1.2909706 | 3.4439451 |
| E | −0.7409635 | 0.0427570 | −0.4423371 | 0.8176100 | −3.9615890 | −1.5485732 | −5.2966339 |
| F | 0.5643710 | −0.0364053 | 0.4475599 | −1.0506755 | 4.1252343 | 1.5974902 | 5.6879394 |
| G | −0.2624528 | 0.0209420 | −0.2552890 | 0.7674961 | −2.5899193 | −1.1375690 | −3.8338174 |
| H | 0.0677393 | −0.0066627 | 0.0785311 | −0.2880086 | 0.9003932 | 0.4537753 | 1.4272539 |
| J | −0.0074222 | 0.0008573 | −0.0102827 | 0.0422082 | −0.1340505 | −0.0754816 | −0.2227640 |

|   | S8 | S9 | S10 | S11 | S12 | S13 | S14 |
|---|---|---|---|---|---|---|---|
| R | 5.1499618 | −1000.0000000 | −1000.0000000 | 1000.0000000 | −1000.0000000 | 1.6880487 | 1.1730407 |
| K | −4.2495116 | 0.0000000 | 0.0000000 | 0.0000000 | 0.0000000 | −10.8244988 | −5.5973242 |
| A | −0.0247478 | 0.0830070 | 0.2627193 | 0.4625186 | 0.1464370 | −0.2005729 | −0.1362365 |
| B | −0.0417117 | −0.8112926 | −1.1387755 | −1.1116904 | −0.1698953 | 0.0526574 | 0.0626627 |

TABLE 4-continued

| | | | | | | | |
|---|---|---|---|---|---|---|---|
| C | 0.3110626 | 2.3021412 | 2.0723941 | 1.5912790 | 0.1117498 | 0.0102193 | −0.0252880 |
| D | −1.0130564 | −4.1836612 | −2.4444138 | −1.6061269 | −0.0634561 | −0.0090359 | 0.0075010 |
| E | 1.7589418 | 5.0467303 | 1.9176466 | 1.0855971 | 0.0287105 | 0.0023863 | −0.0014408 |
| F | −1.8091287 | −4.0494266 | −0.9907477 | −0.4768917 | −0.0090165 | −0.0003304 | 0.0001697 |
| G | 1.1258055 | 2.0724279 | 0.3234978 | 0.1297930 | 0.0017792 | 0.0000241 | −0.0000112 |
| H | −0.3970271 | −0.6104917 | −0.0601376 | −0.0197278 | −0.0001964 | −0.0000007 | 0.0000003 |
| J | 0.0613702 | 0.0784477 | 0.0048119 | 0.0012726 | 0.0000092 | 0.0000000 | 0.0000000 |

With reference to FIGS. 7 to 12, an optical imaging system according to another example is described below.

Figure 7:
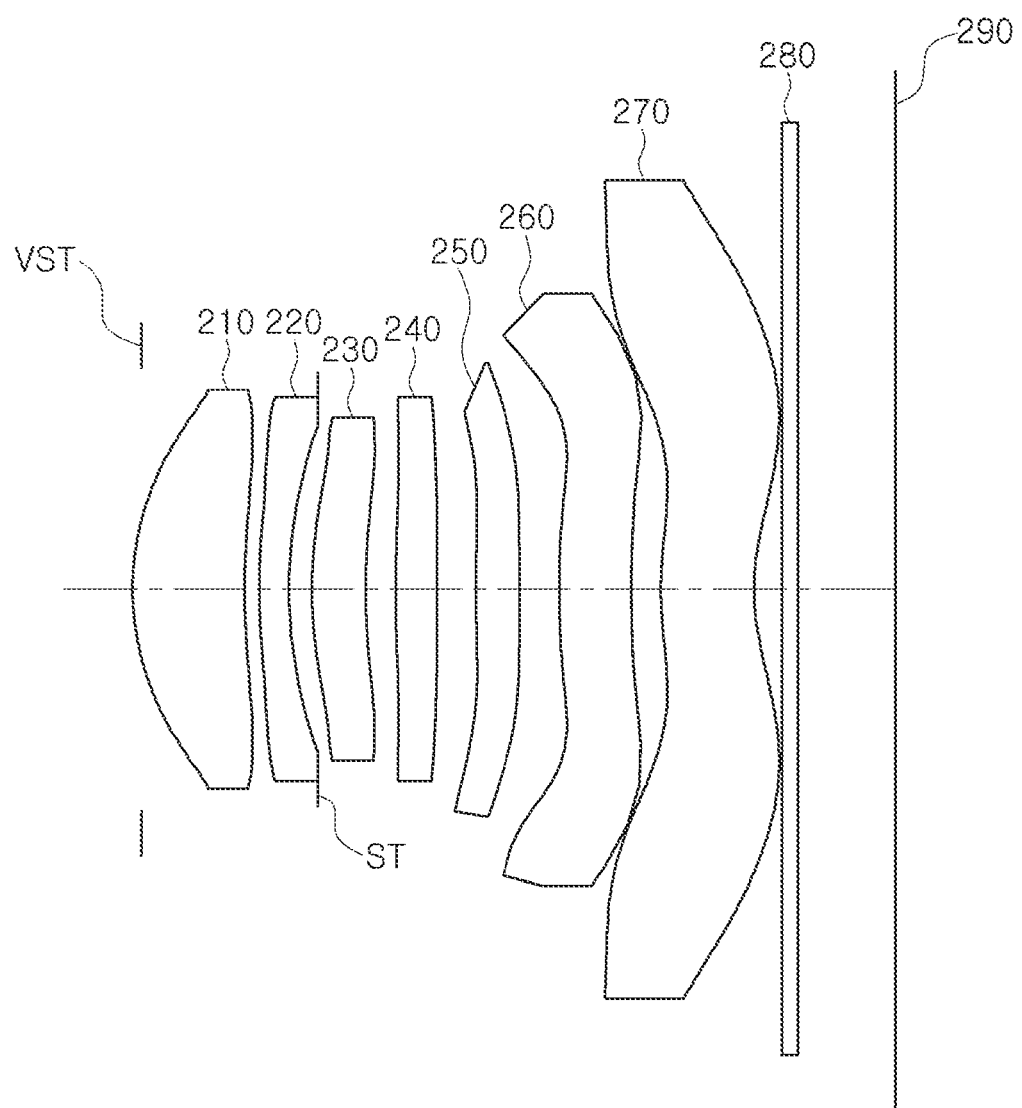
FIG. 7 is a diagram illustrating a case in which a variable stop is open to a maximum degree in an example of an optical imaging system.
Figure 8:
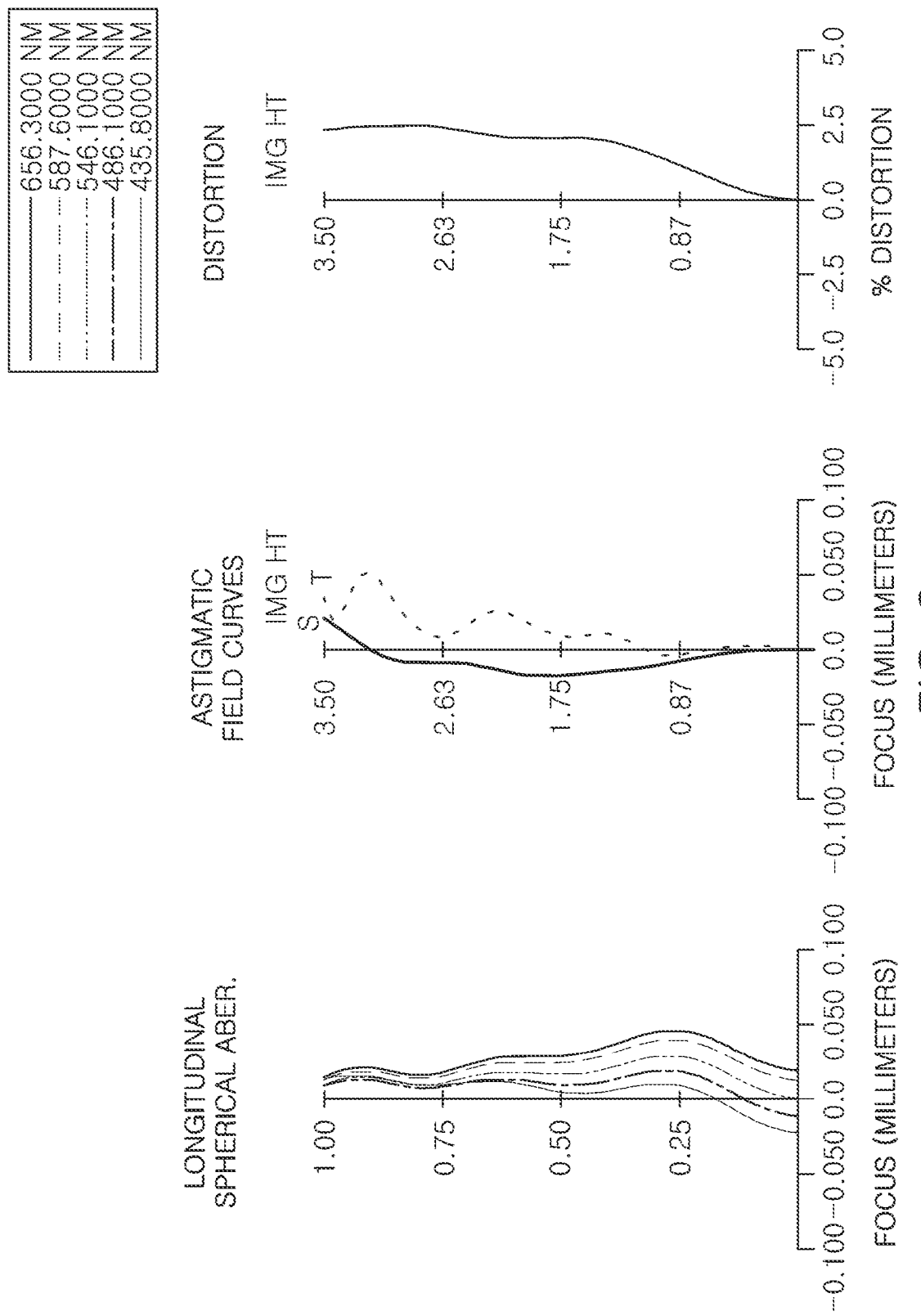
FIG. 8 is a set of curves illustrating aberration characteristics of the optical imaging system shown in FIG. 7.
Figure 9:
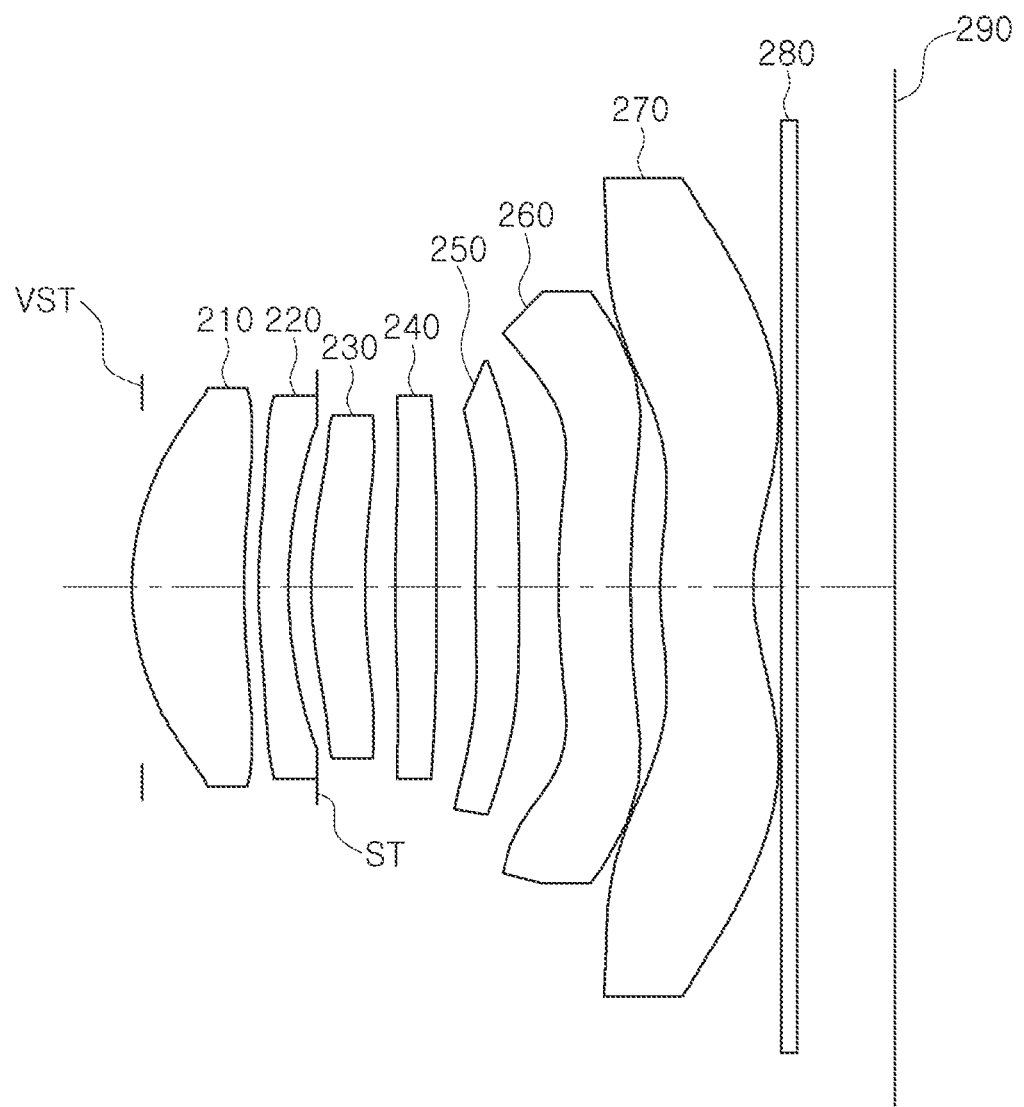
FIG. 9 is a diagram illustrating the case in which the variable stop is narrowed in the example of an optical imaging system.
Figure 10:
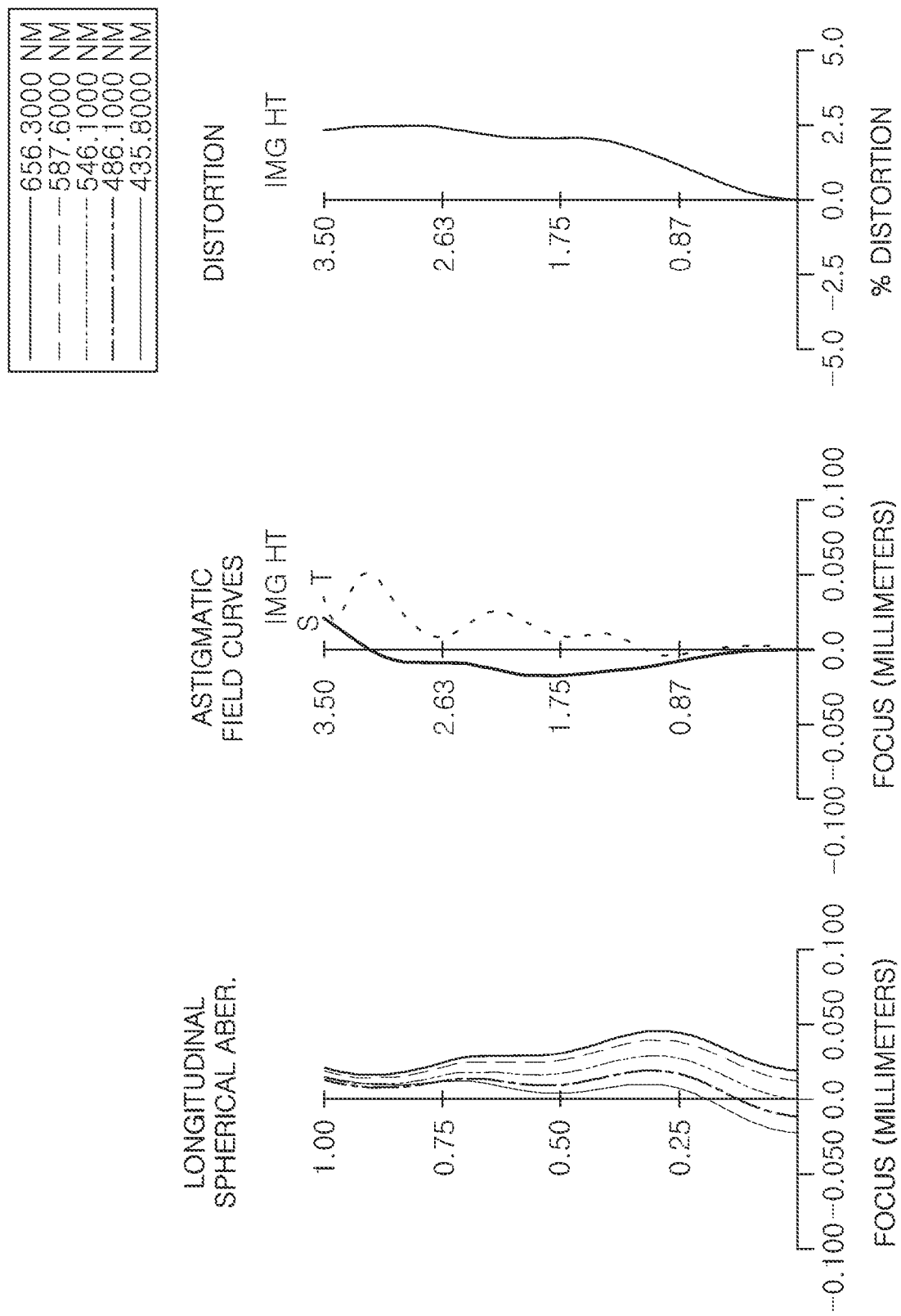
FIG. 10 is a set of curves illustrating aberration characteristics of the optical imaging system shown in FIG. 9.
Figure 11:
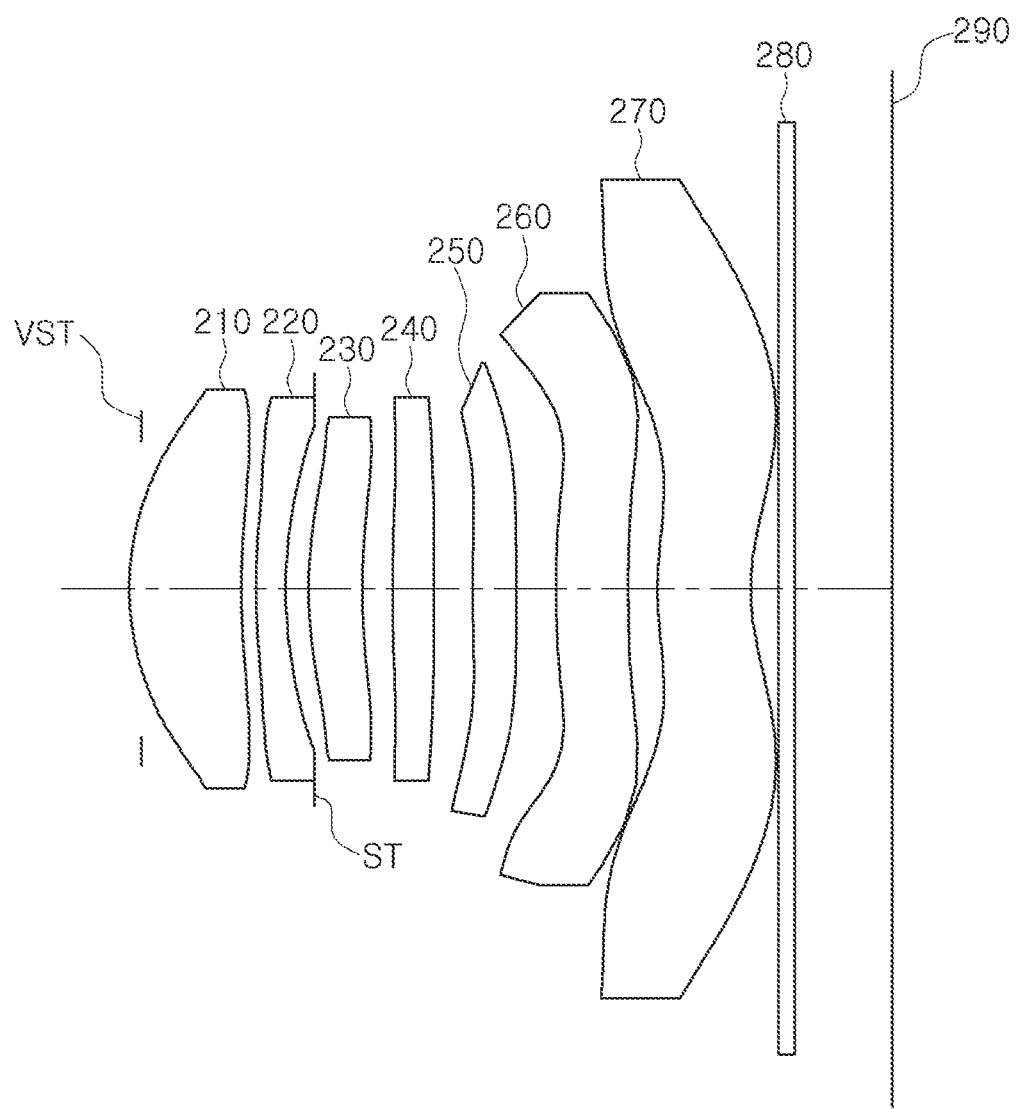
FIG. 11 is a diagram illustrating the case in which the variable stop is narrowed to a maximum degree in the example of an optical imaging system.
Figure 12:
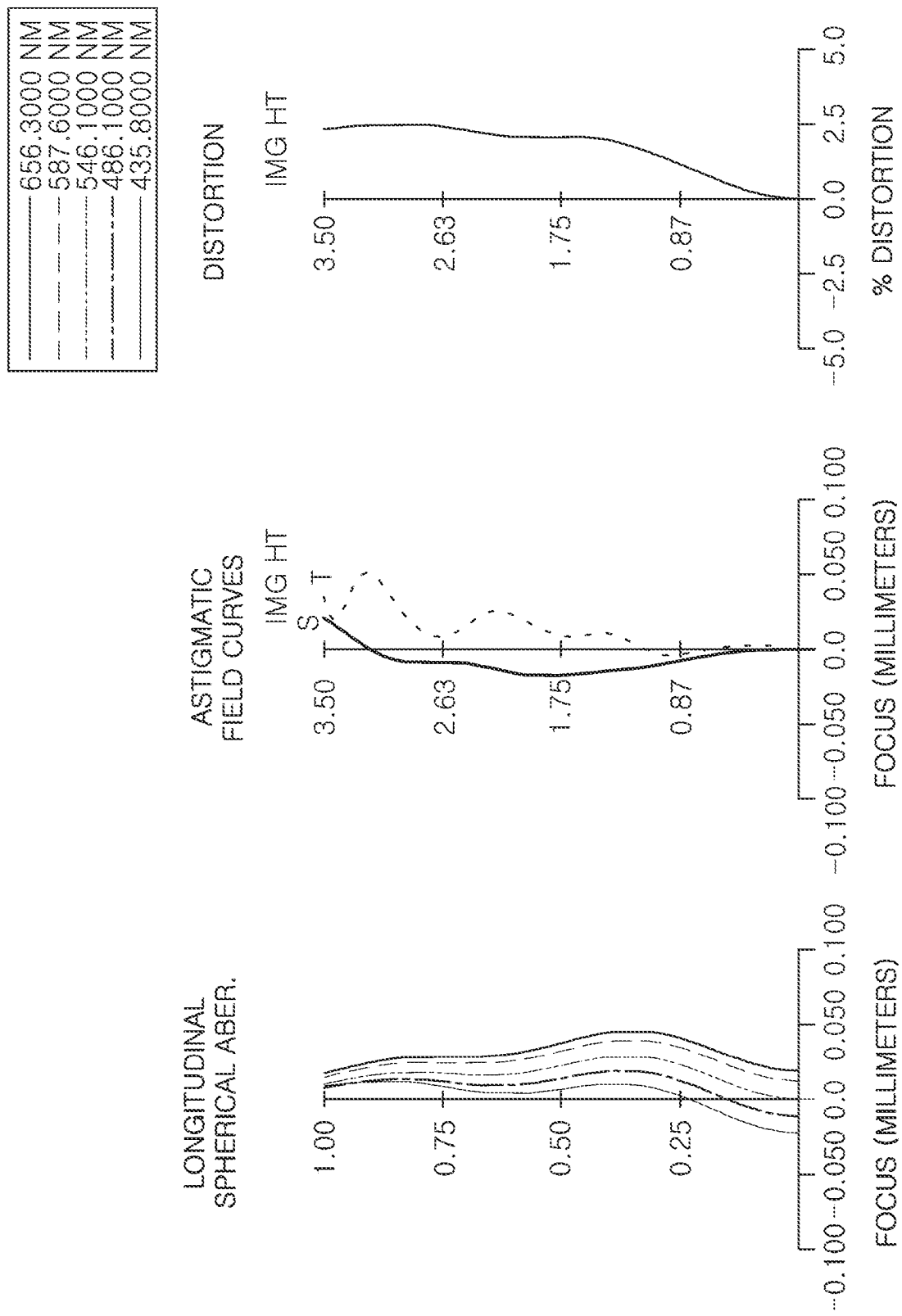
FIG. 12 is a set of curves illustrating aberration characteristics of the optical imaging system shown in FIG. 11.

FIGS. 7 and 8 show the case in which a variable stop is open to a maximum degree in the example optical imaging system. FIGS. 9 and 10 show a state in which a variable stop is narrowed. FIGS. 11 and 12 show a state in which a variable stop is narrowed to a maximum degree.

The optical imaging system according to the present example may include an optical system including a first lens 210, a second lens 220, a third lens 230, a fourth lens 240, a fifth lens 250, a sixth lens 260, and a seventh lens 270 and may further include an infrared block filter 280, an image sensor 290, a variable stop VST, and a stop ST. The stop ST may have a constant diameter hole in the stop ST to pass incident light through the stop ST in the optical system.

Lens characteristics of each lens (a radius of curvature, a thickness of a lens, a distance between lenses, a refractive index, Abbe number, and an effective aperture radius) are shown in Tables 5 to 7 below.

TABLE 5

Fno = 1.6, f = 4.26, FOV = 77.32

| Surface No. | | Radius of Curvature | Thickness/ Distance | Refractive Index | Abbe Number | Effective Aperture Radius |
|---|---|---|---|---|---|---|
| S0 | VST | | 0 | | | 1.500 |
| S1 | First Lens | 1.836 | 0.760 | 1.544 | 56.094 | 1.350 |
| S2 | | 4.339 | 0.100 | | | 1.282 |
| S3 | Second Lens | 3.744 | 0.200 | 1.661 | 20.353 | 1.300 |
| S4 | | 2.524 | 0.158 | | | 1.100 |
| S5 | Third Lens | 2.824 | 0.365 | 1.544 | 56.094 | 1.128 |
| S6 | | 4.378 | 0.204 | | | 1.160 |
| S7 | Fourth Lens | 11.403 | 0.280 | 1.544 | 56.094 | 1.226 |
| S8 | | 78.793 | 0.266 | | | 1.300 |
| S9 | Fifth Lens | 15.196 | 0.296 | 1.650 | 21.525 | 1.356 |
| S10 | | 34.227 | 0.273 | | | 1.567 |
| S11 | Sixth Lens | 12.665 | 0.491 | 1.614 | 25.952 | 1.720 |
| S12 | | 12.460 | 0.202 | | | 2.190 |
| S13 | Seventh Lens | 2.424 | 0.632 | 1.537 | 55.656 | 2.720 |
| S14 | | 1.483 | 0.189 | | | 2.767 |
| S15 | Infrared Block Filter | Infinity | 0.110 | 1.518 | 64.197 | 3.117 |
| S16 | | Infinity | 0.645 | | | 3.152 |
| S17 | Imaging Plane | Infinity | 0.015 | | | 3.501 |

Table 5 above shows the case in which a diameter of a variable stop is largest.

TABLE 6

Fno = 1.8, f = 4.26, FOV = 77.32

| Surface No. | | Radius of Curvature | Thickness/ Distance | Refractive Index | Abbe Number | Effective Aperture Radius |
|---|---|---|---|---|---|---|
| S0 | VST | | 0 | | | 1.200 |
| S1 | First Lens | 1.836 | 0.760 | 1.544 | 56.094 | 1.350 |
| S2 | | 4.339 | 0.100 | | | 1.282 |
| S3 | Second Lens | 3.744 | 0.200 | 1.661 | 20.353 | 1.300 |
| S4 | | 2.524 | 0.158 | | | 1.100 |
| S5 | Third Lens | 2.824 | 0.365 | 1.544 | 56.094 | 1.128 |
| S6 | | 4.378 | 0.204 | | | 1.160 |
| S7 | Fourth Lens | 11.403 | 0.280 | 1.544 | 56.094 | 1.226 |
| S8 | | 78.793 | 0.266 | | | 1.300 |
| S9 | Fifth Lens | 15.196 | 0.296 | 1.650 | 21.525 | 1.356 |
| S10 | | 34.227 | 0.273 | | | 1.567 |
| S11 | Sixth Lens | 12.665 | 0.491 | 1.614 | 25.952 | 1.720 |
| S12 | | 12.460 | 0.202 | | | 2.190 |
| S13 | Seventh Lens | 2.424 | 0.632 | 1.537 | 55.656 | 2.720 |
| S14 | | 1.483 | 0.189 | | | 2.767 |
| S15 | Infrared Block Filter | Infinity | 0.110 | 1.518 | 64.197 | 3.117 |
| S16 | | Infinity | 0.645 | | | 3.152 |
| S17 | Imaging Plane | Infinity | 0.015 | | | 3.501 |

Table 6 above shows the case in which a diameter of a variable stop is smaller than in Table 5 above.

TABLE 7

Fno = 2.1, f = 4.26, FOV = 77.32

| Surface No. | | Radius of Curvature | Thickness/ Distance | Refractive Index | Abbe Number | Effective Aperture Radius |
|---|---|---|---|---|---|---|
| S0 | VST | | 0 | | | 1.000 |
| S1 | First Lens | 1.836 | 0.760 | 1.544 | 56.094 | 1.350 |
| S2 | | 4.339 | 0.100 | | | 1.282 |
| S3 | Second Lens | 3.744 | 0.200 | 1.661 | 20.353 | 1.300 |
| S4 | | 2.524 | 0.158 | | | 1.100 |
| S5 | Third Lens | 2.824 | 0.365 | 1.544 | 56.094 | 1.128 |
| S6 | | 4.378 | 0.204 | | | 1.160 |
| S7 | Fourth Lens | 11.403 | 0.280 | 1.544 | 56.094 | 1.226 |
| S8 | | 78.793 | 0.266 | | | 1.300 |
| S9 | Fifth Lens | 15.196 | 0.296 | 1.650 | 21.525 | 1.356 |
| S10 | | 34.227 | 0.273 | | | 1.567 |
| S11 | Sixth Lens | 12.665 | 0.491 | 1.614 | 25.952 | 1.720 |
| S12 | | 12.460 | 0.202 | | | 2.190 |

TABLE 7-continued

Fno = 2.1, f = 4.26, FOV = 77.32

| Surface No. | | Radius of Curvature | Thickness/ Distance | Refractive Index | Abbe Number | Effective Aperture Radius |
|---|---|---|---|---|---|---|
| S13 | Seventh Lens | 2.424 | 0.632 | 1.537 | 55.656 | 2.720 |
| S14 | | 1.483 | 0.189 | | | 2.767 |
| S15 | Infrared Block Filter | Infinity | 0.110 | 1.518 | 64.197 | 3.117 |
| S16 | | Infinity | 0.645 | | | 3.152 |
| S17 | Imaging Plane | Infinity | 0.015 | | | 3.501 |

Table 7 above shows the case in which a diameter of a variable stop is smallest.

The optical imaging system according to the present example may include the variable stop VST disposed in front of the first lens 210, and the stop ST disposed between the second lens 220 and the third lens 230. However, the stop ST may be disposed between the first lens 210 and the second lens 220.

The variable stop VST and the stop ST are devices to selectively change an amount of light incident on the optical system including the first lens 210 to the seventh lens 270. For example, a diameter of the variable stop VST may be increased to allow a relatively high amount of light to be incident in a low light level environment (refer to FIG. 7 and Table 5) and a diameter of the variable stop VST may be reduced to allow a relatively low amount of light to be incident in a high light level environment (refer to FIG. 11 and Table 7).

The optical imaging system according to the present example may change Fno depending on a diameter of the variable stop VST. Fno refers to a value indicating brightness of the optical system.

In the optical imaging system according to the present example, when a diameter of the variable stop VST is largest, Fno may be less than 1.7 and, when a diameter of the variable stop VST is smallest, Fno may be greater than 2.0.

In general, when Fno is changed, a position in which a focal point is formed may be changed. For example, a position in which a focal point is formed when Fno is 1.6 may be different from a position in which a focal point is formed when Fno is 2.1.

However, in the optical imaging system according to the present example, even if Fno is changed, a focal point is formed at the same position and, thus, image quality may be maintained constant.

FIG. 8 is a set of curves illustrating aberration characteristics when the optical imaging system according to the present example has a smallest Fno value.

A left curve of FIG. 8 shows longitudinal spherical aberration of an optical imaging system with respect to various wavelengths.

In the longitudinal spherical aberration curve of FIG. 8, a horizontal axis is a coefficient of longitudinal spherical aberration and a vertical axis is normalization of a distance to an effective aperture from an optical axis.

In a vertical axis of the longitudinal spherical aberration curve of FIG. 8, when a distance to the effective aperture from the optical axis is 1, a point of 0.25 may refer to a point of 25% of the distance to the effective aperture from the optical axis and a point of 0.75 may refer to a point of 75% of the distance to the effective aperture from the optical axis.

The effective aperture is a stop that actually blocks light and, in the optical imaging system according to the present example, the variable stop VST or the stop ST may function as an effective aperture depending on a diameter of the variable stop VST. For example, when the variable stop VST is open to a maximum degree, the stop ST may function as an effective aperture and, when the variable stop VST is narrowed to a maximum degree, the variable stop VST may function as an effective aperture.

Referring to FIG. 8, when the variable stop VST is open to a maximum degree and Fno has a smallest value, the optical imaging system according to the present example may be configured in such a way that longitudinal spherical aberration has a largest value at a position closest to an optical axis and has a smallest value at a position closest to an effective aperture with respect to light with a wavelength equal to or greater than 555 nm.

For example, the optical imaging system may be configured in such a way that longitudinal spherical aberration has a largest value at a point between 0 and 0.5 and has a smallest value at a point between 0.5 and 1.0.

Alternatively, the optical imaging system may be configured in such a way that longitudinal spherical aberration has a largest value at a point between 0.2 and 0.3 and has a smallest value at a point between 0.7 and 0.9.

For example, the optical imaging system may be configured in such a way that longitudinal spherical aberration is largest at a point of 0.25 and is smallest at a point of 0.75 with respect to light with a wavelength equal to or greater than 555 nm.

The optical imaging system according to the present example may be configured in such a way that a longitudinal spherical aberration curve has an inflection point.

According to the present example, the first lens 210 may have a positive refractive power, a first surface of the first lens 210 may have a convex shape in a paraxial region, and a second surface of the first lens 210 may have a concave shape in a paraxial region.

The second lens 220 may have a negative refractive power, a first surface of the second lens 220 may have a convex surface in a paraxial region, and a second surface of the second lens 220 may have a concave shape in a paraxial region.

The first lens 210 and the second lens 220 may be formed of plastic materials with different optical characteristics. For example, a difference of Abbe number between the first lens 210 and the second lens 220 may be greater than 30.

The third lens 230 may have a positive refractive power, a first surface of the third lens 230 may have a convex shape in a paraxial region, and a second surface of the third lens 230 may have a concave shape in a paraxial region.

The fourth lens 240 may have a positive refractive power, a first surface of the fourth lens 240 may have a convex shape in a paraxial region, and a second surface of the fourth lens 240 may have a concave shape in a paraxial region.

The fifth lens 250 may have a positive refractive power, a first surface of the fifth lens 250 may have a convex shape in a paraxial region, and a second surface of the fifth lens 250 may have a concave shape in a paraxial region.

The sixth lens 260 may have a negative refractive power, a first surface of the sixth lens 260 may have a convex shape in a paraxial region, and a second surface of the sixth lens 260 may have a concave shape in a paraxial region.

At least one inflection point may be formed on at least one of the first and second surfaces of the sixth lens 260. For example, the first surface of the sixth lens 260 may have a shape that becomes more convex toward an edge from a concave shape in a paraxial region. The second surface of the sixth lens 260 may have a shape that becomes more concave toward an edge from a convex shape in a paraxial region.

The seventh lens 270 may have a negative refractive power, a first surface of the seventh lens 270 may have a convex shape in a paraxial region, and a second surface of the seventh lens 270 may have a concave shape in a paraxial region.

At least one inflection point may be formed on at least one of the first and second surfaces of the seventh lens 270. For example, the first surface of the seventh lens 270 may have a shape that becomes more concave toward an edge from a convex shape in a paraxial region. The second surface of the seventh lens 270 may have a shape that becomes more convex toward an edge from a concave shape in a paraxial region.

Each surface of the first lens 210 to the seventh lens 270 may have an aspherical surface coefficient shown in Table 8 below. For example, both an object-side surface and an image-side surface of the first lens 210 to the seventh lens 270 are aspherical surfaces.

TABLE 8

| | S1 | S2 | S3 | S4 | S5 | S6 | S7 |
|---|---|---|---|---|---|---|---|
| R | 1.83576 | 4.33870 | 3.74393 | 2.52396 | 2.82431 | 4.37838 | 11.40332 |
| K | −0.29420 | −26.42663 | −46.02958 | −3.83612 | −7.96792 | 0.00000 | −99.00000 |
| A | −0.00485 | −0.04904 | −0.06287 | −0.09868 | −0.03667 | −0.02632 | 0.03839 |
| B | 0.02572 | 0.03370 | 0.03147 | 0.14606 | 0.13421 | −0.03356 | −0.16835 |
| C | −0.05394 | −0.04307 | 0.04271 | −0.05162 | −0.44544 | −0.04791 | 0.30850 |
| D | 0.03976 | 0.04756 | −0.07462 | −0.07986 | 0.81675 | 0.14981 | −0.43574 |
| E | −0.03742 | −0.03914 | 0.03878 | 0.10482 | −0.88730 | −0.28097 | 0.46111 |
| F | 0.01188 | 0.01792 | −0.00098 | −0.05746 | 0.48103 | 0.20226 | −0.36123 |
| G | −0.00168 | −0.00335 | −0.00266 | 0.01707 | −0.09591 | −0.04838 | 0.17737 |
| H | 0.00000 | 0.00000 | 0.00000 | 0.00000 | 0.00000 | 0.00000 | −0.03731 |
| J | 0.00000 | 0.00000 | 0.00000 | 0.00000 | 0.00000 | 0.00000 | 0.00000 |

| | S8 | S9 | S10 | S11 | S12 | S13 | S14 |
|---|---|---|---|---|---|---|---|
| R | 78.39312 | 15.19595 | 34.22746 | 12.66545 | 12.45978 | 2.42446 | 1.48273 |
| K | −99.00000 | 53.47803 | −38.70698 | 30.85969 | 28.54414 | −2.27042 | −1.01120 |
| A | 0.04079 | 0.06645 | 0.14059 | 0.22784 | 0.09258 | −0.27281 | −0.26985 |
| B | −0.11937 | −0.25595 | −0.45158 | −0.41025 | −0.10243 | 0.10046 | 0.14197 |
| C | 0.07151 | 0.22253 | 0.53595 | 0.36835 | 0.03965 | −0.01646 | −0.06240 |
| D | 0.05196 | 0.02808 | −0.39816 | −0.23652 | −0.01112 | 0.00105 | 0.01900 |
| E | −0.11331 | −0.27353 | 0.17621 | 0.08963 | 0.00244 | 0.00004 | −0.00366 |
| F | 0.06686 | 0.25967 | −0.04089 | −0.01736 | −0.00032 | −0.00001 | 0.00042 |
| G | −0.01318 | −0.10642 | 0.00380 | 0.00134 | 0.00002 | −0.00000 | −0.00003 |
| H | 0.00000 | 0.01665 | 0.00000 | 0.00000 | 0.00000 | 0.00000 | 0.00000 |
| J | 0.00000 | 0.00000 | 0.00000 | 0.00000 | 0.00000 | 0.00000 | 0.00000 |

With reference to FIGS. 13 to 16, an optical imaging system according to another example is described below.

Figure 13:
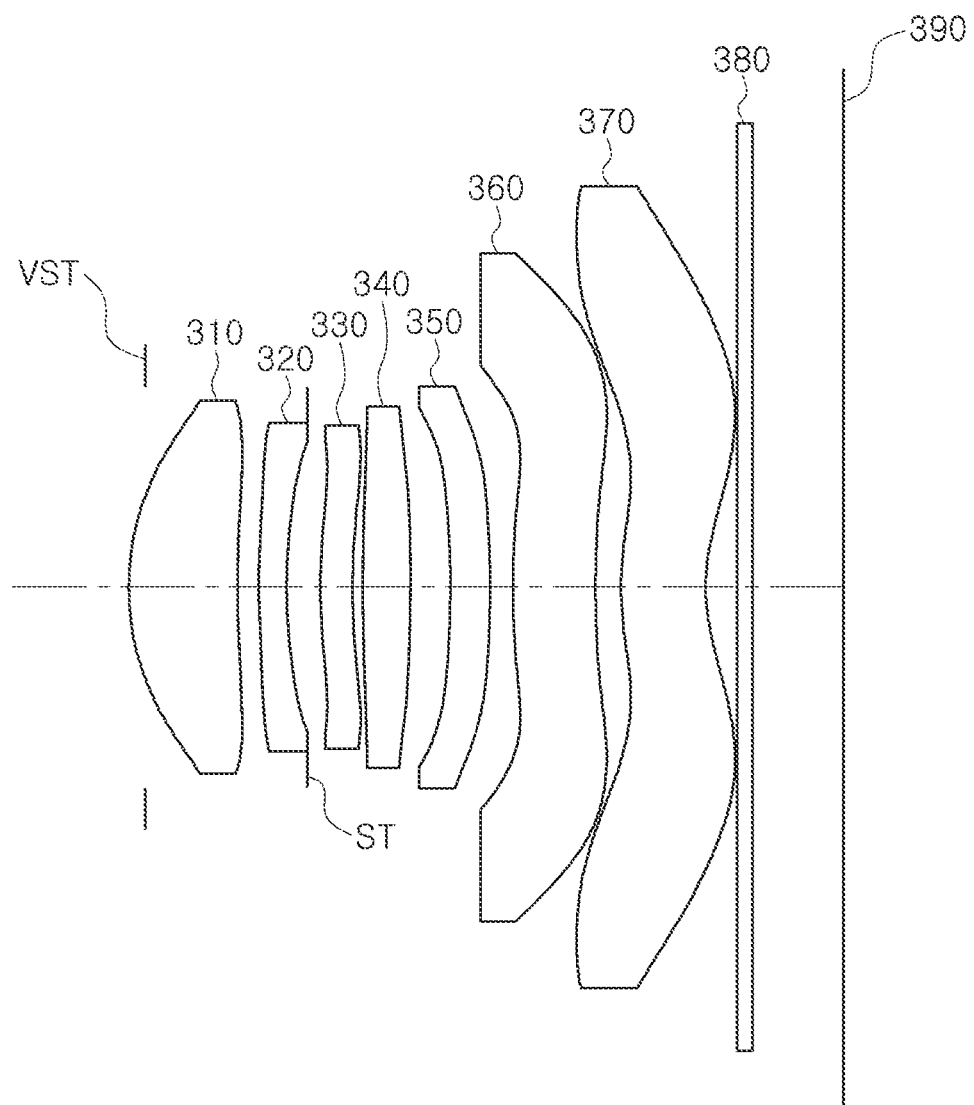
FIG. 13 is a diagram illustrating a case in which a variable stop is open to a maximum degree in an example of an optical imaging.
Figure 14:
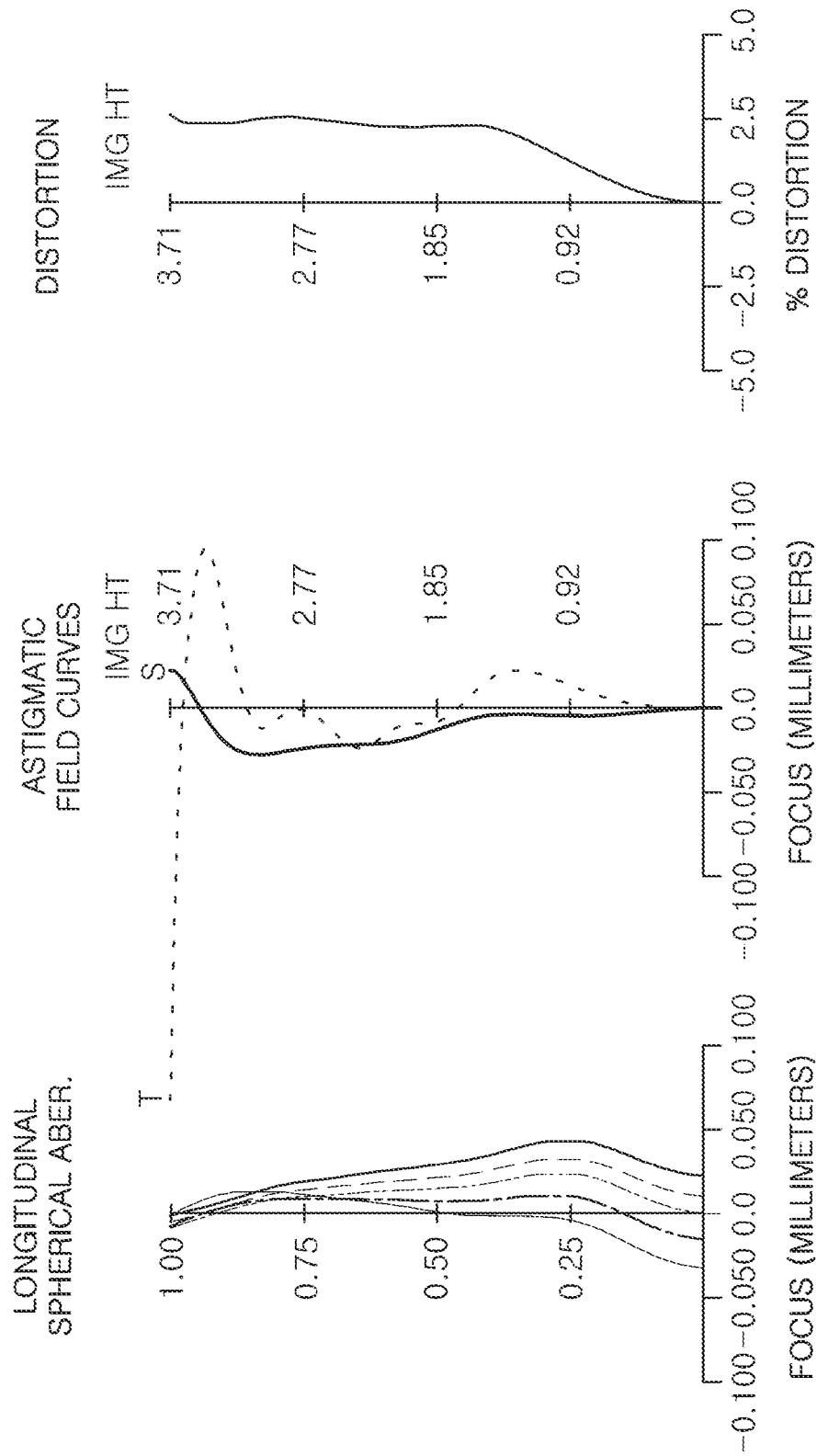
FIG. 14 is a set of curves illustrating aberration characteristics of the optical imaging system shown in FIG. 13.
Figure 15:
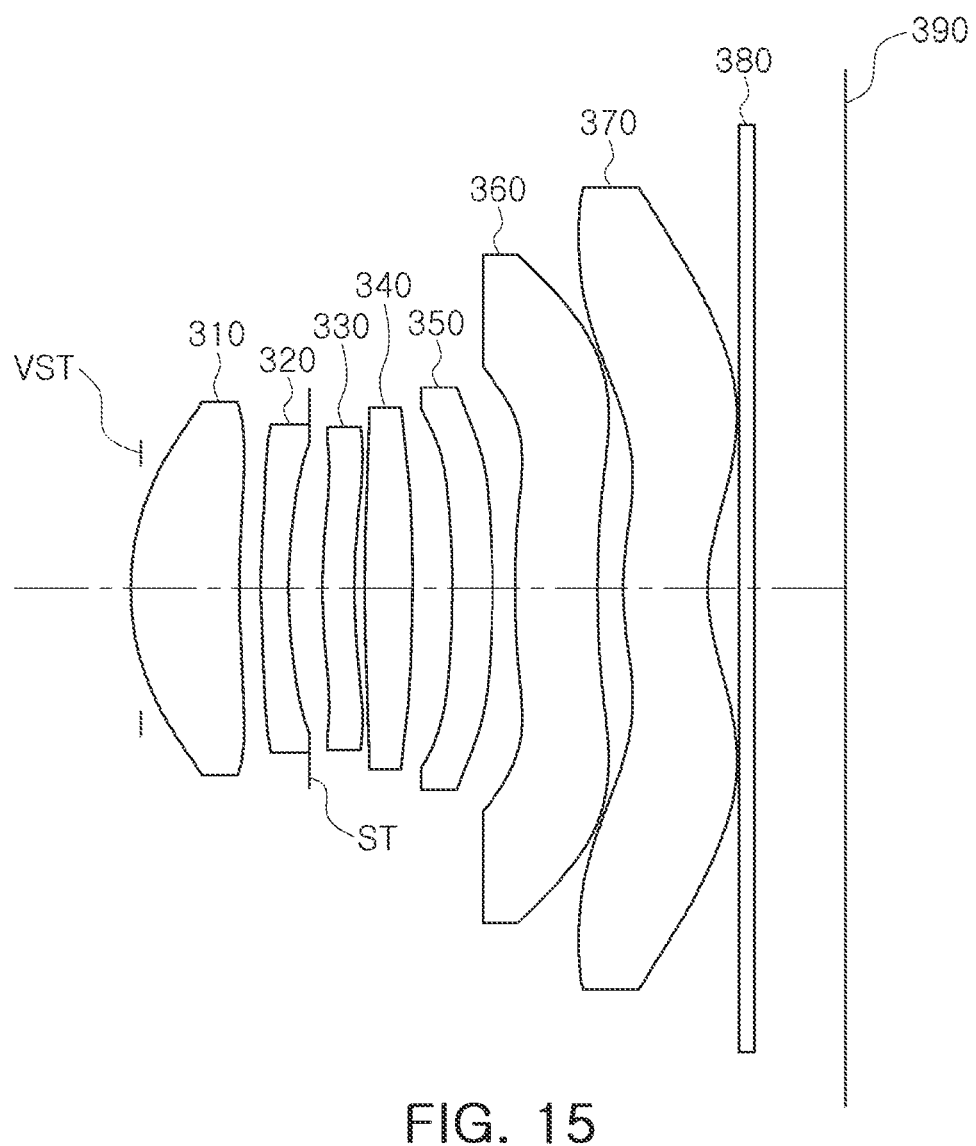
FIG. 15 is a diagram illustrating a case in which the variable stop is narrowed to a maximum degree in the example of an optical imaging system.
Figure 16:
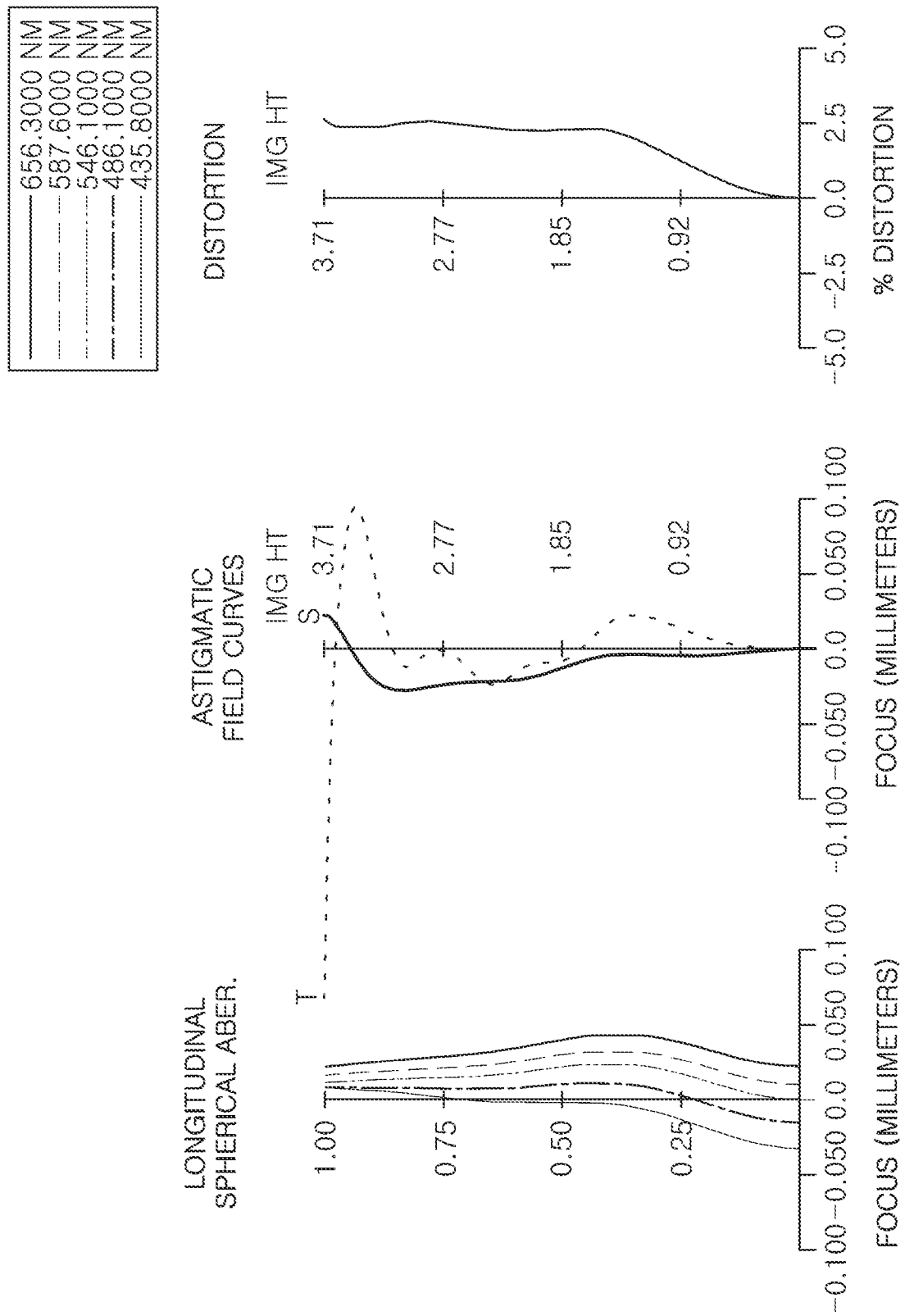
FIG. 16 is a set of curves illustrating aberration characteristics of the optical imaging system shown in FIG. 15.

FIGS. 13 and 14 show the case in which a variable stop is open to a maximum degree in the optical imaging system according to the present example. FIGS. 15 and 16 show a state in which a variable stop is narrowed to a maximum degree in this example.

The optical imaging system according to the present example may include an optical system including a first lens 310, a second lens 320, a third lens 330, a fourth lens 340, a fifth lens 350, a sixth lens 360, and a seventh lens 370 and may further include an infrared block filter 380, an image sensor 390, a variable stop VST, and a stop ST.

Lens characteristics of each lens (a radius of curvature, a thickness of a lens, a distance between lenses, a refractive index, Abbe number, and an effective aperture radius) are shown in Tables 9 and 10 below.

TABLE 9

Fno = 1.5, f = 4.18, FOV = 78.36

| Surface Number | | Radius of Curvature | Thickness/ Distance | Refractive Index | Abbe Number | Effective Aperature Radius |
|---|---|---|---|---|---|---|
| S0 | VST | | −0.12 | | | 1.450 |
| S1 | First Lens | 1.829 | 0.789 | 1.544 | 56.094 | 1.340 |
| S2 | | 6.869 | 0.155 | | | 1.275 |
| S3 | Second Lens | 5.475 | 0.200 | 1.661 | 20.353 | 1.180 |
| S4 | | 3.347 | 0.247 | | | 1.045 |
| S5 | Third Lens | 4.527 | 0.230 | 1.661 | 20.353 | 1.117 |
| S6 | | 4.609 | 0.076 | | | 1.192 |
| S7 | Fourth Lens | 18.673 | 0.346 | 1.544 | 56.094 | 1.220 |
| S8 | | −13.780 | 0.288 | | | 1.300 |
| S9 | Fifth Lens | −8.115 | 0.293 | 1.650 | 21.525 | 1.353 |
| S10 | | −7.630 | 0.165 | | | 1.562 |
| S11 | Sixth Lens | 12.539 | 0.600 | 1.639 | 23.528 | 1.720 |
| S12 | | 11.686 | 0.185 | | | 2.290 |

TABLE 9-continued

Fno = 1.5, f = 4.18, FOV = 78.36

| Surface Number | | Radius of Curvature | Thickness/ Distance | Refractive Index | Abbe Number | Effective Aperature Radius |
|---|---|---|---|---|---|---|
| S13 | Seventh Lens | 1.931 | 0.613 | 1.537 | 55.656 | 2.720 |
| S14 | | 1.310 | 0.227 | | | 2.934 |
| S15 | Infrared Block Filter | Infinity | 0.110 | 1.519 | 64.197 | 3.326 |
| S16 | | Infinity | 0.645 | | | 3.362 |
| S17 | Imaging Plane | Infinity | 0.015 | | | 3.750 |

Table 9 above shows the case in which a diameter of a variable stop is largest.

TABLE 10

Fno = 2.4, f = 4.18, FOV = 78.36

| Surface Number | | Radius of Curvature | Thickness/ Distance | Refractive Index | Abbe Number | Effective Aperature Radius |
|---|---|---|---|---|---|---|
| S0 | VST | | −0.12 | | | 0.880 |
| S1 | First Lens | 1.829 | 0.789 | 1.544 | 56.094 | 1.340 |
| S2 | | 6.869 | 0.155 | | | 1.275 |
| S3 | Second Lens | 5.475 | 0.200 | 1.661 | 20.353 | 1.180 |
| S4 | | 3.347 | 0.247 | | | 1.045 |
| S5 | Third Lens | 4.527 | 0.230 | 1.661 | 20.353 | 1.117 |
| S6 | | 4.609 | 0.076 | | | 1.192 |
| S7 | Fourth Lens | 18.673 | 0.346 | 1.544 | 56.094 | 1.220 |
| S8 | | −13.780 | 0.288 | | | 1.300 |
| S9 | Fifth Lens | −8.115 | 0.293 | 1.650 | 21.525 | 1.353 |
| S10 | | −7.630 | 0.165 | | | 1.562 |
| S11 | Sixth Lens | 12.539 | 0.600 | 1.639 | 23.528 | 1.720 |
| S12 | | 11.686 | 0.185 | | | 2.290 |
| S13 | Seventh Lens | 1.931 | 0.613 | 1.537 | 55.656 | 2.720 |
| S14 | | 1.310 | 0.227 | | | 2.934 |
| S15 | Infrared Block Filter | Infinity | 0.110 | 1.519 | 64.197 | 3.326 |
| S16 | | Infinity | 0.645 | | | 3.362 |
| S17 | Imaging Plane | Infinity | 0.015 | | | 3.750 |

Table 10 above shows the case in which a diameter of a variable stop is smallest.

The optical imaging system according to the present example may include the variable stop VST disposed in front of the first lens 310, and the stop ST disposed between the second lens 320 and the third lens 330. However, the stop ST may be disposed between the first lens 310 and the second lens 320.

The variable stop VST and the stop ST are devices to selectively change an amount of light incident on the optical system includes the first lens 310 to the seventh lens 370. For example, a diameter of the variable stop VST may be increased to allow a relatively high amount of light to be incident in a low light level environment (refer to FIG. 13 and Table 9) and a diameter of the variable stop VST may be reduced to allow a relatively low amount of light to be incident in a high light level environment (refer to FIG. 15 and Table 10).

The optical imaging system according to the present example may change Fno depending on a diameter of the variable stop VST. Fno refers to a value indicating brightness of the optical system.

In the optical imaging system according to the present example, when a diameter of the variable stop VST is largest, Fno may be less than 1.7 and, when a diameter of the variable stop VST is smallest, Fno may be greater than 2.0.

In general, when Fno is changed, a position in which a focal point is formed may be changed. For example, a position in which a focal point is formed when Fno is 1.5 may be different from a position in which a focal point is formed when Fno is 2.4.

However, in the optical imaging system according to the present example, even if Fno is changed, a focal point is formed at the same position and, thus, image quality may be maintained constant.

FIG. 14 is a set of curves illustrating aberration characteristics when the optical imaging system according to the present example has a smallest Fno value.

A left curve of FIG. 14 shows longitudinal spherical aberration of an optical imaging system with respect to various wavelengths.

In the longitudinal spherical aberration curve of FIG. 14, a horizontal axis is a coefficient of longitudinal spherical aberration and a vertical axis is normalization of a distance to an effective aperture from an optical axis.

In a vertical axis of the longitudinal spherical aberration curve of FIG. 14, when a distance to the effective aperture from the optical axis is 1, a point of 0.25 may refer to a point of 25% of the distance to the effective aperture from the optical axis and a point of 0.75 may refer to a point of 75% of the distance to the effective aperture from the optical axis.

The effective aperture is a stop that actually blocks light and, in the optical imaging system according to the third exemplary embodiment of the present disclosure, the variable stop VST or the stop may function as an effective aperture depending on a diameter of the variable stop VST. For example, when the variable stop VST is open to a maximum degree, the stop ST may function as an effective aperture and, when the variable stop VST is narrowed to a maximum degree, the variable stop VST may function as an effective aperture.

Referring to FIG. 14, when the variable stop VST is open to a maximum degree and Fno has a smallest value, the optical imaging system according to the present example may be configured in such a way that longitudinal spherical aberration has a largest value at a position closest to an optical axis and has a smallest value at a position closest to an effective aperture with respect to light with a wavelength equal to or greater than 546.1 nm.

For example, the optical imaging system may be configured in such a way that longitudinal spherical aberration has a largest value at a point between 0 and 0.5 and has a smallest value at a point between 0.5 and 1.0.

Alternatively, the optical imaging system may be configured in such a way that longitudinal spherical aberration has a largest value at a point between 0.2 and 0.3 and has a smallest value at a point between 0.7 and 1.0.

For example, the optical imaging system may be configured in such a way that longitudinal spherical aberration is largest at a point of 0.25 and is smallest at a point of 1.0 with respect to light with a wavelength equal to or greater than 546.1 nm.

The optical imaging system according to the present example may be configured in such a way that a longitudinal spherical aberration curve has an inflection point.

According to the present example, the first lens 310 may have a positive refractive power, a first surface of the first lens 310 may have a convex shape in a paraxial region, and a second surface of the first lens 310 may have a concave shape in a paraxial region.

The second lens 320 may have a negative refractive power, a first surface of the second lens 320 may have a convex surface in a paraxial region, and a second surface of the second lens 320 may have a concave shape in a paraxial region.

The first lens 310 and the second lens 320 may be formed of plastic materials with different optical characteristics. For example, a difference of Abbe number between the first lens 310 and the second lens 320 may be greater than 30.

The third lens 330 may have a positive refractive power, a first surface of the third lens 330 may have a convex shape in a paraxial region, and a second surface of the third lens 330 may have a concave shape in a paraxial region.

The fourth lens 340 may have a positive refractive power, and first and second surfaces of the fourth lens 340 may have a convex shape in a paraxial region.

The fifth lens 350 may have a positive refractive power, a first surface of the fifth lens 350 may have a convex shape in a paraxial region, and a second surface of the fifth lens 350 may have a concave shape in a paraxial region.

The sixth lens 360 may have a negative refractive power, a first surface of the sixth lens 360 may have a concave shape in a paraxial region, and a second surface of the sixth lens 360 may have a convex shape in a paraxial region.

At least one inflection point may be formed on at least one of the first and second surfaces of the sixth lens 360. For example, the first surface of the sixth lens 360 may have a shape that becomes more concave toward an edge from a convex shape in a paraxial region. The second surface of the sixth lens 360 may have a shape that becomes more convex toward an edge from a concave shape in a paraxial region.

The seventh lens 370 may have a negative refractive power, a first surface of the seventh lens 370 may have a convex shape in a paraxial region, and a second surface of the seventh lens 370 may have a concave shape in a paraxial region.

At least one inflection point may be formed on at least one of the first and second surfaces of the seventh lens 370. For example, the first surface of the seventh lens 370 may have a shape that becomes more concave toward an edge from a convex shape in a paraxial region. The second surface of the seventh lens 370 may have a shape that becomes more convex toward an edge from a concave shape in a paraxial region.

Each surface of the first lens 310 to the seventh lens 370 may have an aspherical surface coefficient shown in Table 11 below. For example, both an object-side surface and an image-side surface of the first lens 310 to the seventh lens 370 are aspherical surfaces.

With reference to FIGS. 17 to 24, an optical imaging system according to another example is described below.

Figure 17:
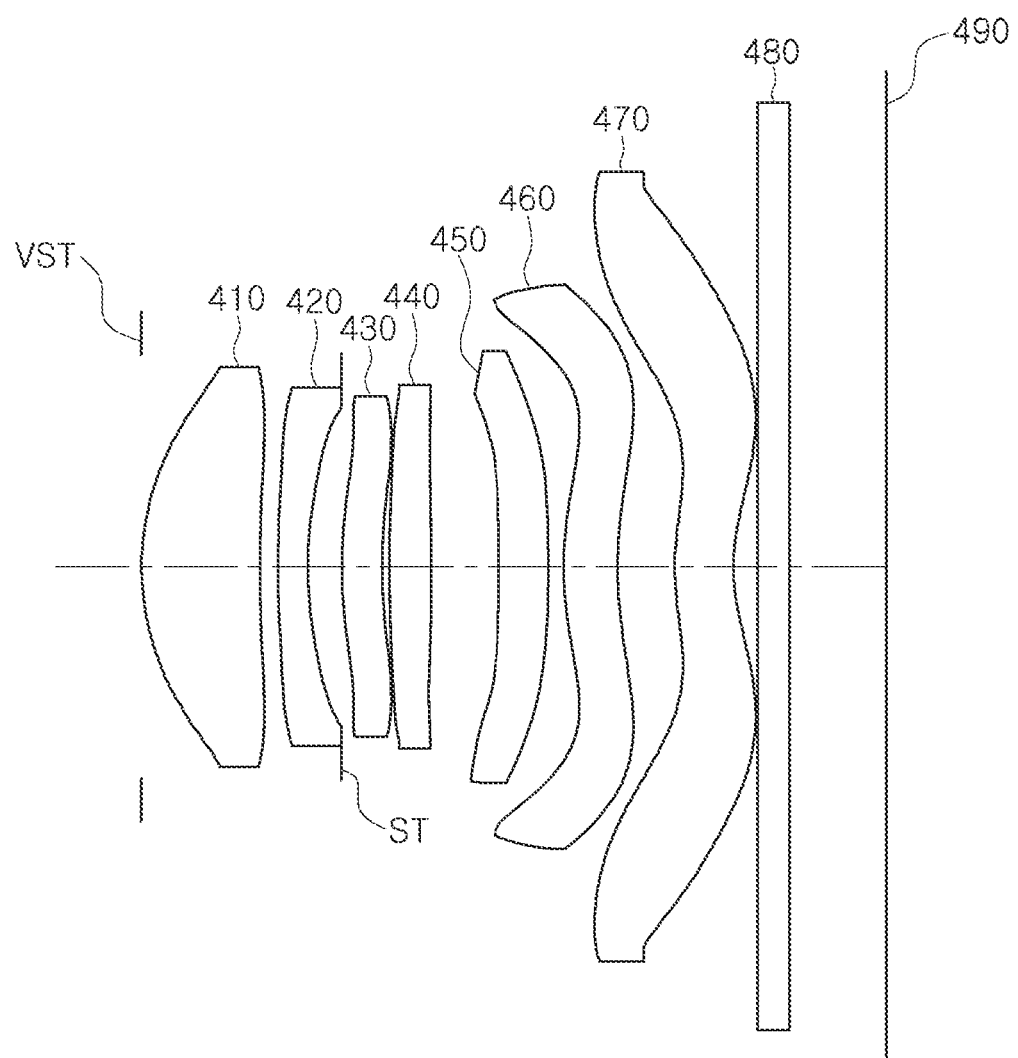
FIG. 17 is a diagram illustrating a case in which the variable stop is open to a maximum degree in an example of an optical imaging system.
Figure 18:
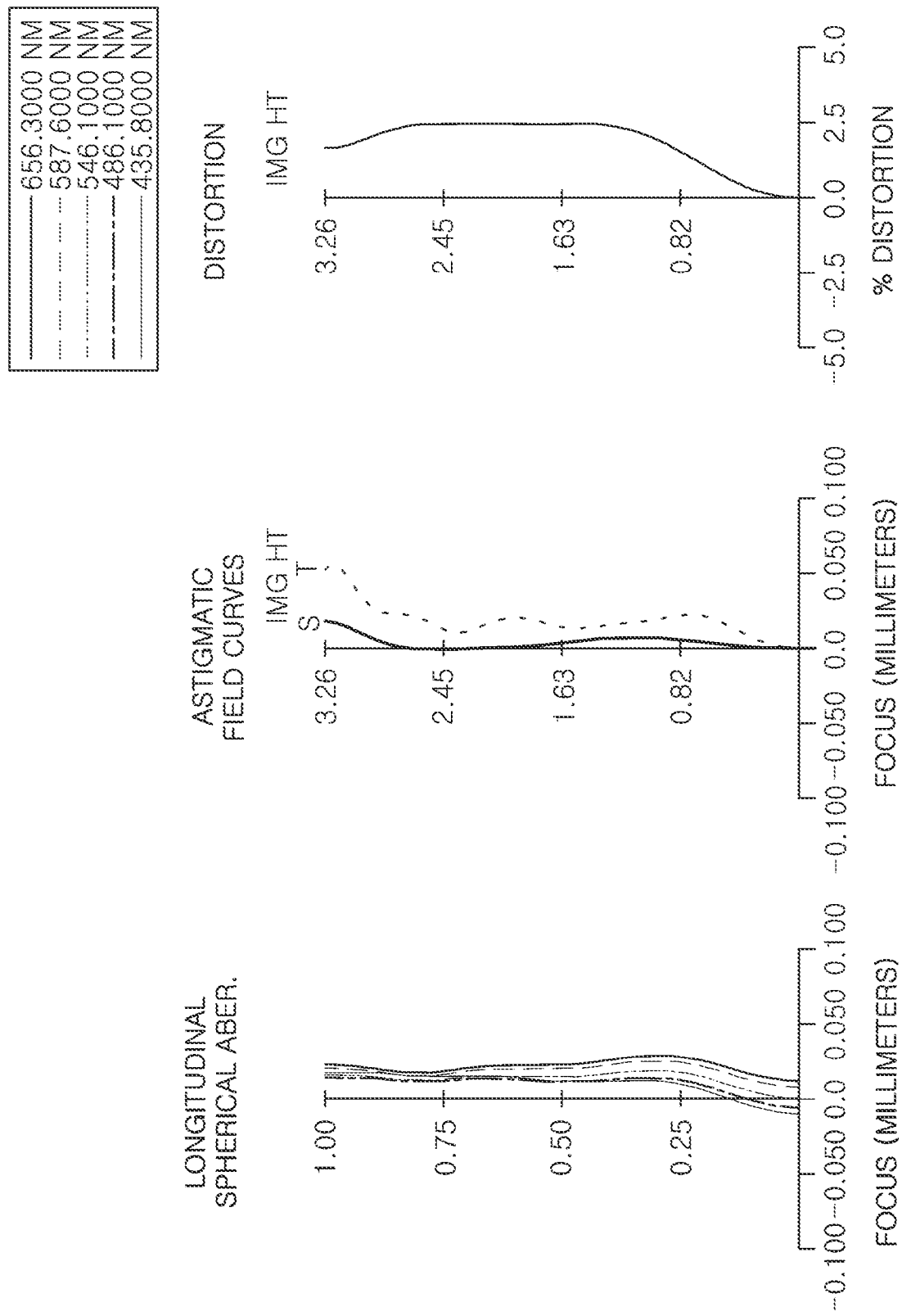
FIG. 18 is a set of curves illustrating aberration characteristics of the optical imaging system shown in FIG. 17.
Figure 19:
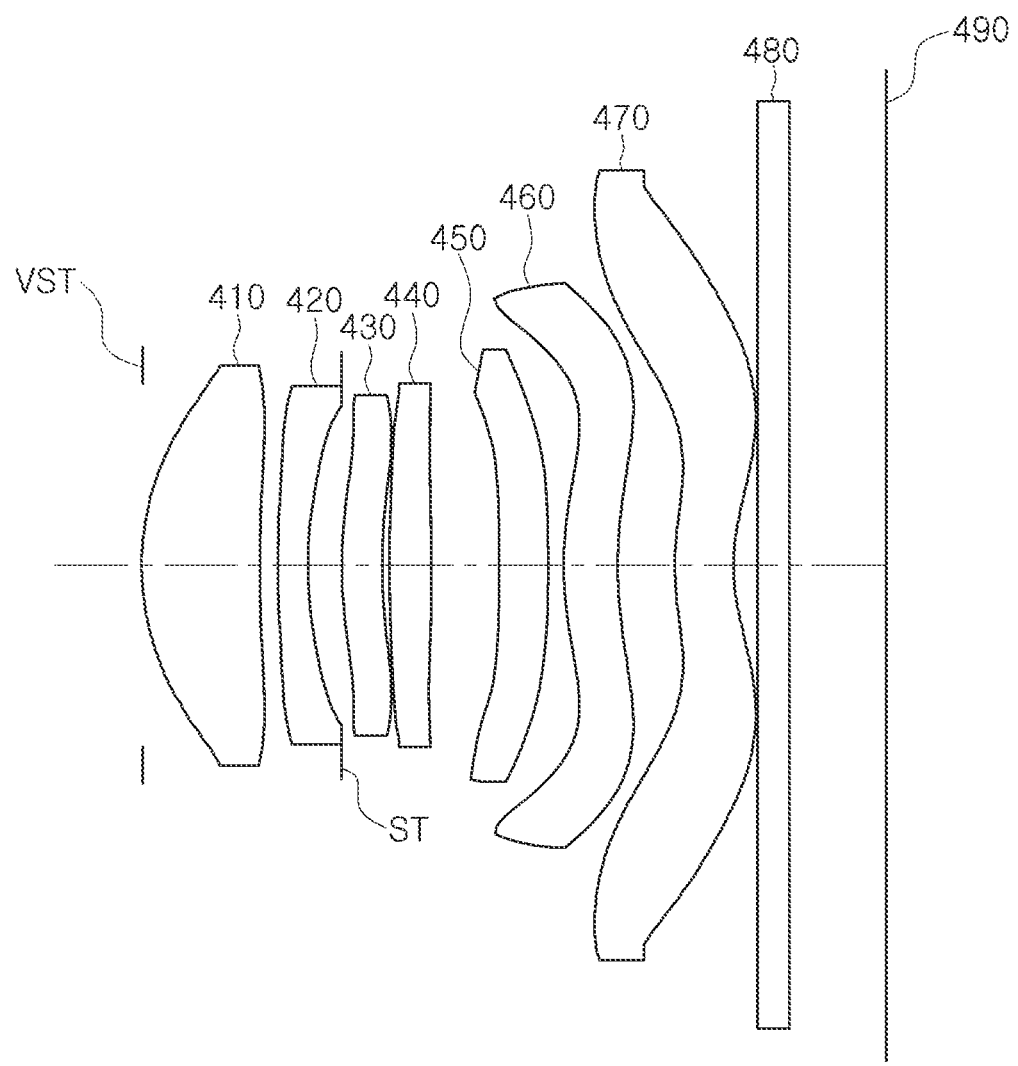
FIG. 19 is a diagram illustrating a case in which the variable stop is narrowed in the example of an optical imaging system.
Figure 20:
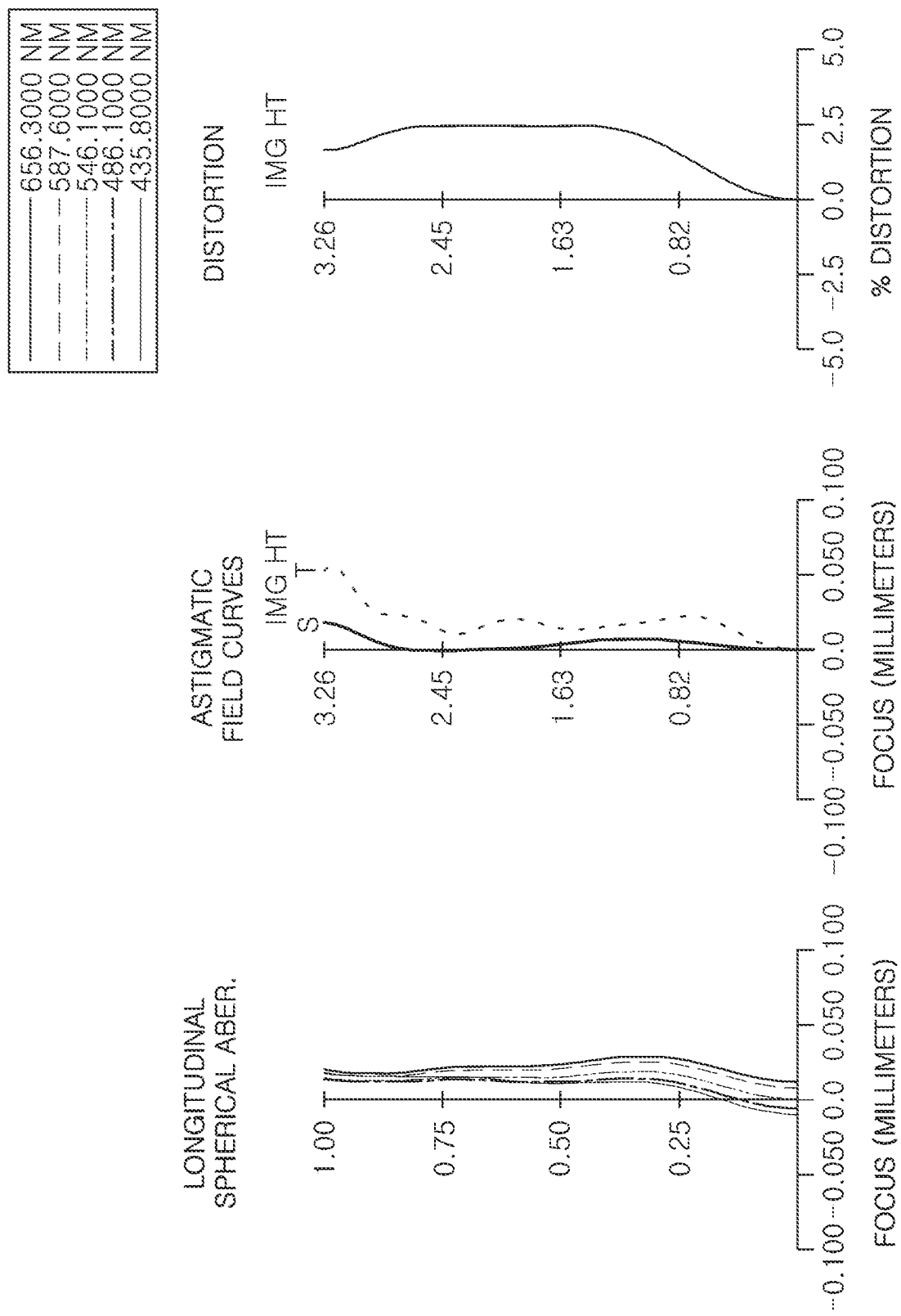
FIG. 20 is a set of curves illustrating aberration characteristics of the optical imaging system shown in FIG. 19.
Figure 21:
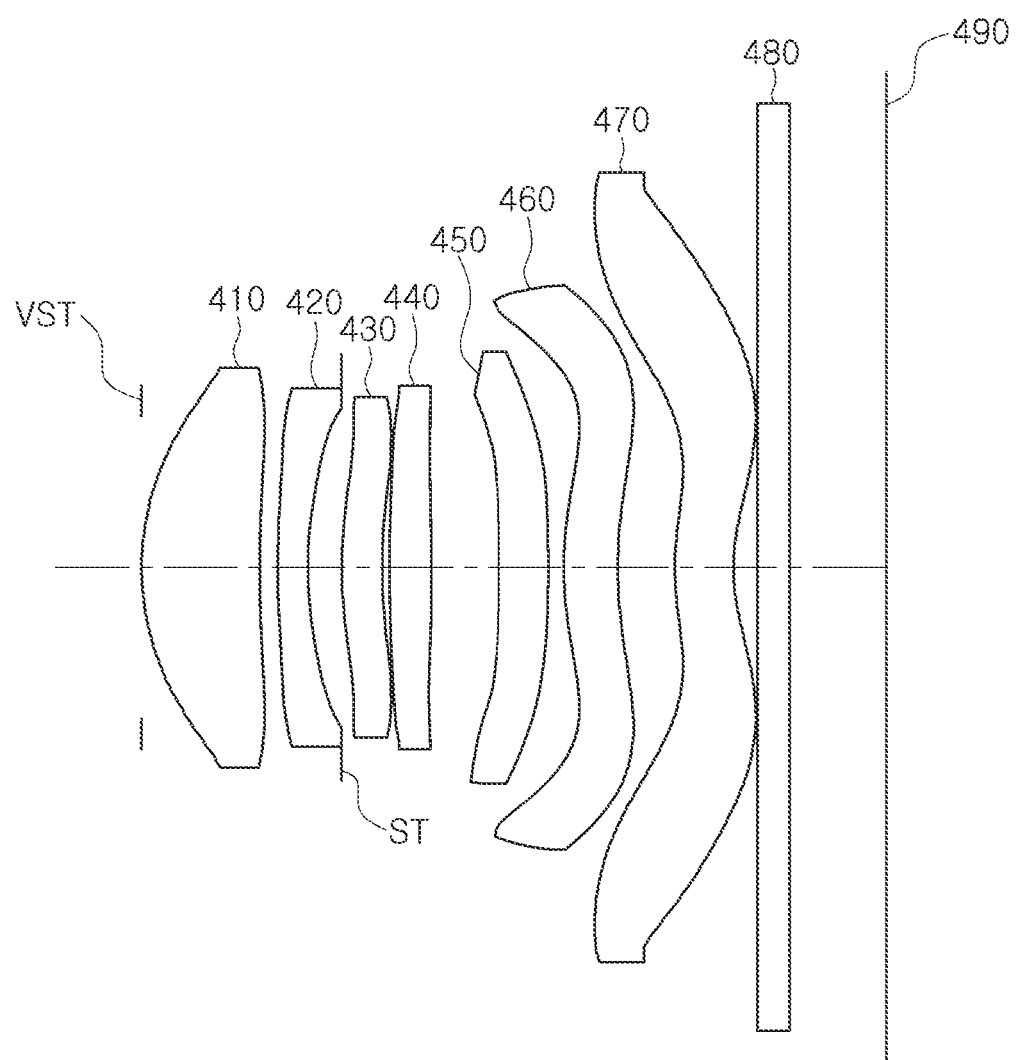
FIG. 21 is a diagram illustrating a case in which the variable stop is further narrowed in the example of an optical imaging system.
Figure 22:
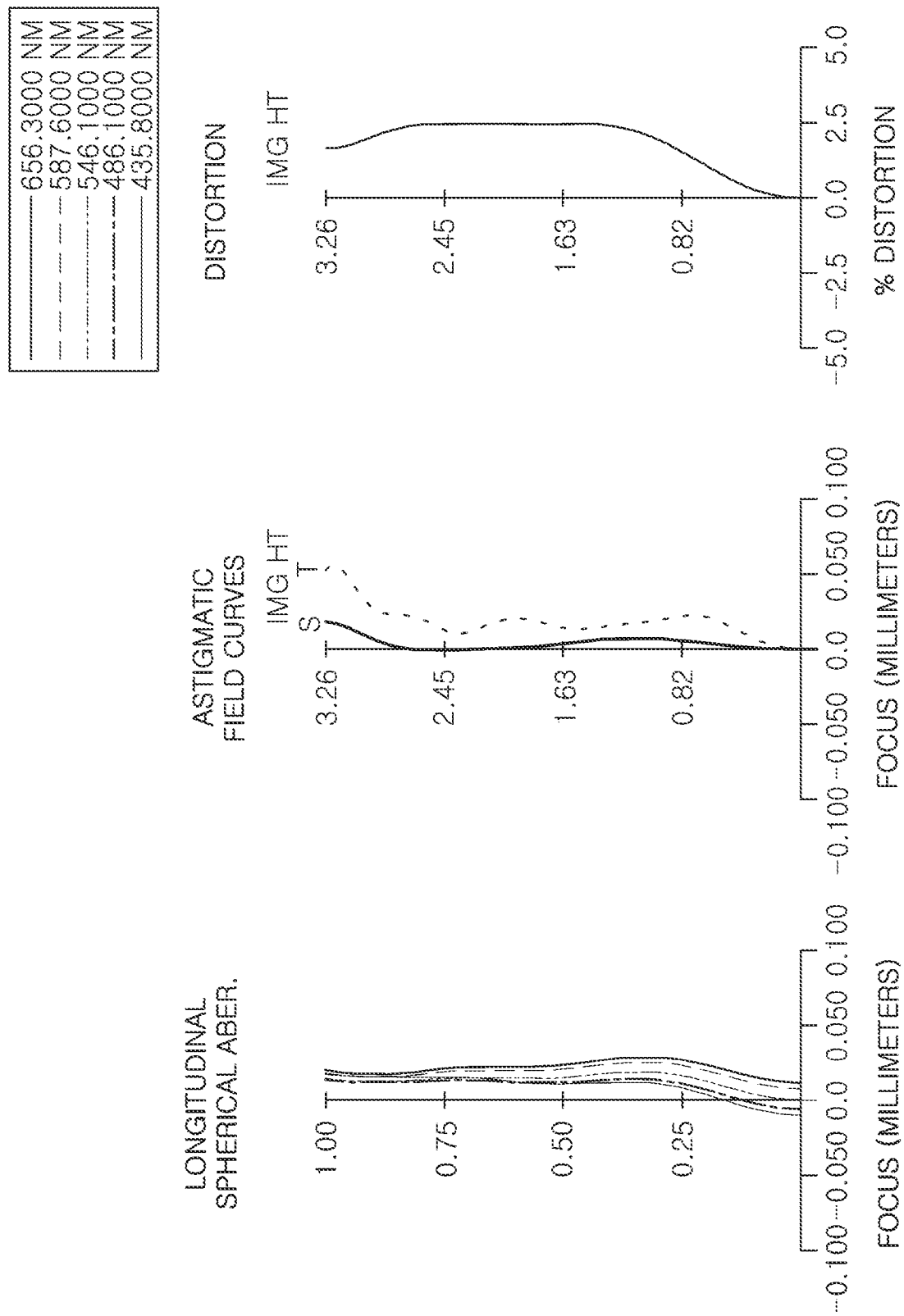
FIG. 22 is a set of curves illustrating aberration characteristics of the optical imaging system shown in FIG. 21.
Figure 23:
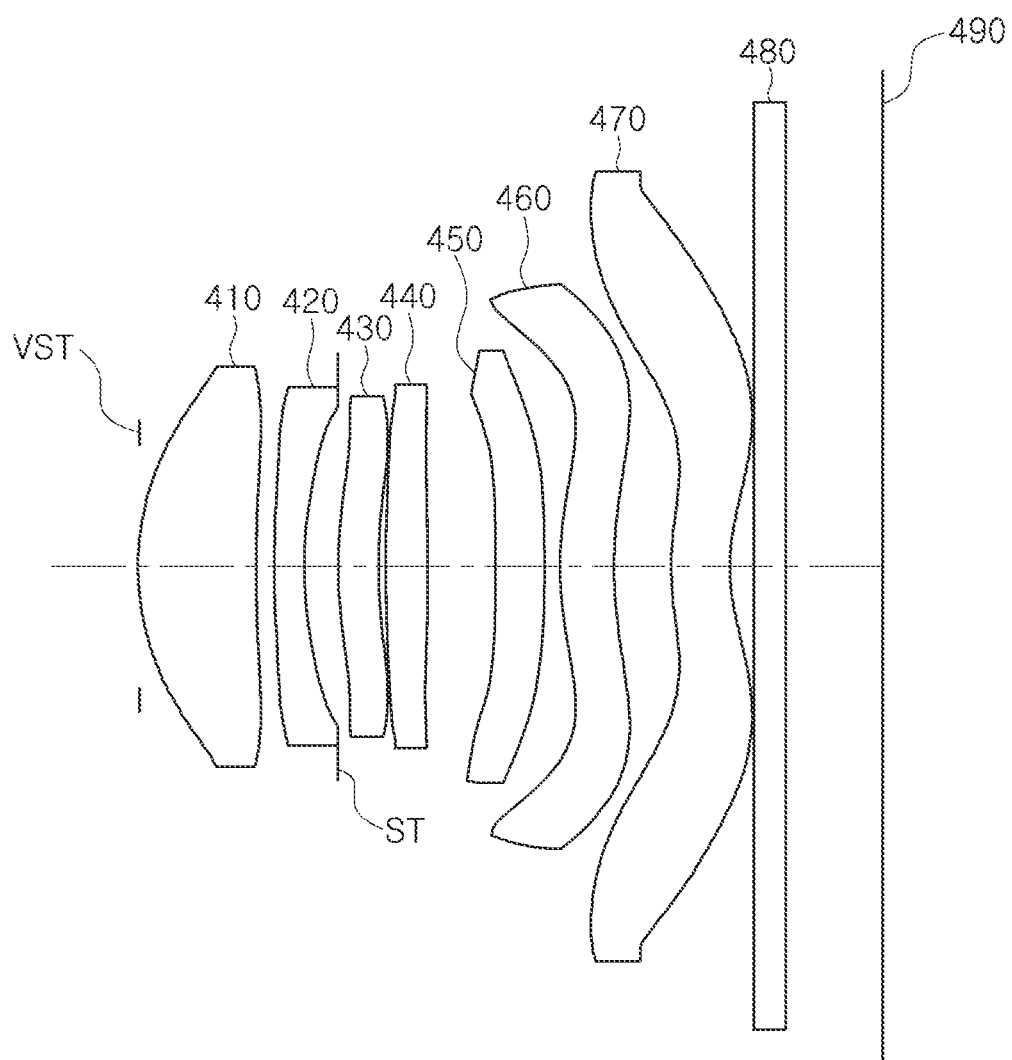
FIG. 23 is a diagram illustrating a case in which the variable stop is narrowed to a maximum degree in the example of an optical imaging system.
Figure 24:
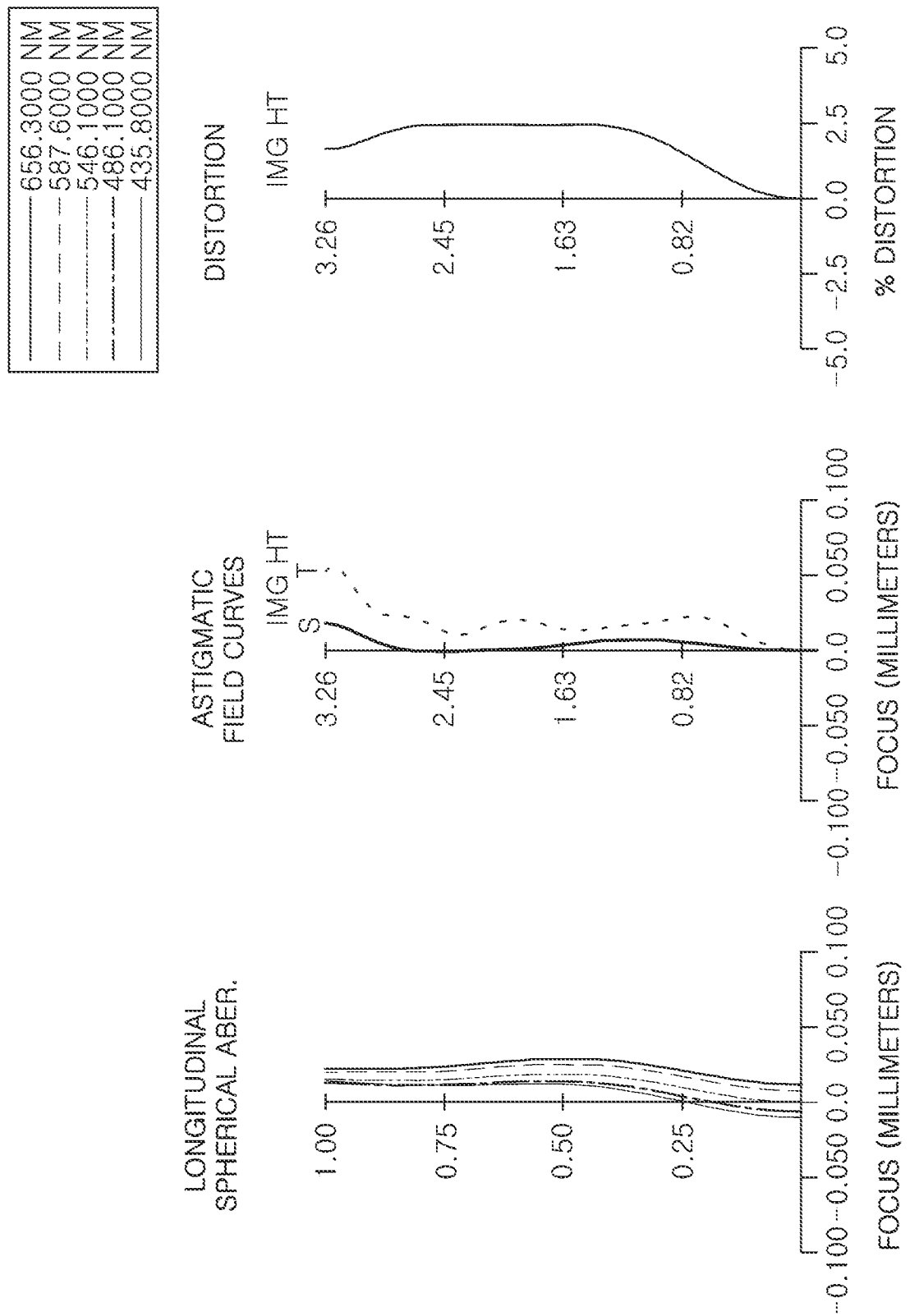
FIG. 24 is a set of curves illustrating aberration characteristics of the optical imaging system shown in FIG. 23.

FIGS. 17 and 18 show the case in which a variable stop is open to a maximum degree in the optical imaging system according to the present example. FIGS. 19 and 20 show a state in which a variable stop is narrowed. FIGS. 21 and 22 show a state in which a variable stop is further narrowed. FIGS. 23 and 24 show a state in which a variable stop is narrowed to a maximum degree.

The optical imaging system according to the present example may include an optical system including a first lens 410, a second lens 420, a third lens 430, a fourth lens 440, a fifth lens 450, a sixth lens 460, and a seventh lens 470 and may further include an infrared block filter 480, an image sensor 490, a variable stop VST, and a stop ST.

Lens characteristics of each lens (a radius of curvature, a thickness of a lens, a distance between lenses, a refractive index, Abbe number, and an effective aperture radius) are shown in Tables 12 to 15 below.

TABLE 12

Fno = 1.5, f = 4.17, FOV = 74.92

| Surface Number | | Radius of Curvature | Thickness/ Distance | Refractive Index | Abbe Number | Effective Aperature Radius |
|---|---|---|---|---|---|---|
| S0 | VST | | 0 | | | 1.400 |
| S1 | First Lens | 1.727 | 0.780 | 1.544 | 56.094 | 1.320 |
| S2 | | 6.657 | 0.120 | | | 1.274 |
| S3 | Second Lens | 4.934 | 0.200 | 1.661 | 20.353 | 1.182 |
| S4 | | 2.462 | 0.224 | | | 1.050 |
| S5 | Third Lens | 2.875 | 0.267 | 1.544 | 56.094 | 1.050 |
| S6 | | 3.758 | 0.045 | | | 1.122 |
| S7 | Fourth Lens | 10.984 | 0.278 | 1.544 | 56.094 | 1.148 |
| S8 | | −39.517 | 0.453 | | | 1.200 |
| S9 | Fifth Lens | −12.773 | 0.329 | 1.661 | 20.353 | 1.300 |

TABLE 11

| | S1 | S2 | S3 | S4 | S5 | S6 | S7 |
|---|---|---|---|---|---|---|---|
| R | 1.841825777 | 9.986499769 | 13.514411715 | 3.411717931 | 3.710117726 | 3.500774311 | 2.600541018 |
| K | −1.462086048 | −17.911336310 | −86.751030400 | 4.714183878 | −12.794964643 | −29.087824787 | −1.083666264 |
| A | 0.012787687 | −0.014423998 | −0.038677499 | −0.039448598 | −0.002502043 | −0.120048768 | −0.219525068 |
| B | 0.061325433 | −0.068102706 | −0.085674929 | −0.045848211 | 0.041109312 | 0.394419353 | 0.409072538 |
| C | −0.172377517 | 0.144165512 | 0.224002318 | −0.031294597 | −0.081729586 | −1.126101273 | −1.013326450 |
| D | 0.293949461 | −0.185500693 | −0.221528035 | 0.480893077 | −0.209725735 | 2.316987711 | 1.920992012 |
| E | −0.317459658 | 0.172633230 | 0.131917758 | −1.188355751 | 0.766238723 | −3.526794926 | −2.622662289 |
| F | 0.216411595 | −0.121328965 | −0.067940911 | 1.541755701 | −1.085565792 | 3.656187608 | 2.393083051 |
| G | −0.090331182 | 0.058293916 | 0.039089481 | −1.167392869 | 0.788633311 | −2.420793755 | −1.383999360 |
| H | 0.020875572 | −0.016259386 | −0.015450589 | 0.490464599 | −0.272573408 | 0.933238273 | 0.469060118 |
| J | −0.002044838 | 0.001935483 | 0.002457452 | −0.087513593 | 0.033559898 | −0.159052761 | −0.071624129 |

| | S8 | S9 | S10 | S11 | S12 | S13 | S14 |
|---|---|---|---|---|---|---|---|
| R | 6.780691861 | −1000.0000000 | −1000.0000000 | 1000.0000000 | −1000.0000000 | 1.909463283 | 1.255004609 |
| K | −31.366571689 | 0.000000000 | 0.000000000 | 0.000000000 | 0.000000000 | −8.976905994 | −6.875363936 |
| A | −0.021909532 | 0.126158908 | 0.366089989 | 0.527121827 | 0.242774714 | 0.216708688 | 0.132917276 |
| B | −0.035226558 | −0.931094568 | −1.532913655 | −1.377008793 | −0.388154543 | 0.055500844 | 0.049273435 |
| C | 0.001749531 | 2.533200496 | 2.854923762 | 1.940404882 | 0.307591001 | 0.022492482 | −0.009561421 |
| D | 0.090905297 | −4.487991577 | −3.429848311 | −1.926310859 | −0.167470752 | −0.018664145 | 0.000607829 |
| E | −0.208642721 | 5.318798482 | 2.735253933 | 1.303888871 | 0.065444093 | 0.005573581 | 0.000064163 |
| F | 0.202887339 | −4.223098698 | −1.429525289 | −0.577519294 | −0.017792971 | −0.000880068 | −0.000005612 |
| G | −0.090783014 | 2.151266399 | 0.467377379 | 0.158714621 | 0.003141095 | 0.000072531 | 0.000000873 |
| H | 0.012401651 | −0.636085441 | −0.086044114 | −0.024387837 | −0.000319946 | −0.000002449 | 0.000000080 |
| J | 0.002081585 | 0.082886009 | 0.006766030 | 0.001593693 | 0.000014166 | 0.000000000 | 0.000000000 |

TABLE 12-continued

Fno = 1.5, f = 4.17, FOV = 74.92

| Surface Number | | Radius of Curvature | Thickness/ Distance | Refractive Index | Abbe Number | Effective Aperature Radius |
|---|---|---|---|---|---|---|
| S10 | | −89.472 | 0.100 | | | 1.554 |
| S11 | Sixth Lens | 2.272 | 0.357 | 1.614 | 25.952 | 1.650 |
| S12 | | 2.549 | 0.378 | | | 1.962 |
| S13 | Seventh Lens | 1.723 | 0.388 | 1.537 | 55.656 | 2.600 |
| S14 | | 1.239 | 0.160 | | | 2.502 |
| S15 | Infrared Block Filter | Infinity | 0.210 | 1.518 | 64.197 | 2.975 |
| S16 | | Infinity | 0.625 | | | 3.054 |
| S17 | Imaging Plane | Infinity | 0.014 | | | 3.282 |

Table 12 above shows the case in which a diameter of a variable stop is largest.

TABLE 13

Fno = 1.7, f = 4.17, FOV = 14.92

| Surface Number | | Radius of Curvature | Thickness/ Distance | Refractive Index | Abbe Number | Effective Aperature Radius |
|---|---|---|---|---|---|---|
| S0 | VST | | 0 | | | 1.200 |
| S1 | First Lens | 1.727 | 0.780 | 1.544 | 56.094 | 1.320 |
| S2 | | 6.657 | 0.120 | | | 1.274 |
| S3 | Second Lens | 4.934 | 0.200 | 1.661 | 20.353 | 1.182 |
| S4 | | 2.462 | 0.224 | | | 1.050 |
| S5 | Third Lens | 2.875 | 0.267 | 1.544 | 56.094 | 1.050 |
| S6 | | 3.758 | 0.045 | | | 1.122 |
| S7 | Fourth Lens | 10.984 | 0.278 | 1.544 | 56.094 | 1.148 |
| S8 | | −39.517 | 0.453 | | | 1.200 |
| S9 | Fifth Lens | −12.773 | 0.329 | 1.661 | 20.353 | 1.300 |
| S10 | | −89.472 | 0.100 | | | 1.554 |
| S11 | Sixth Lens | 2.272 | 0.357 | 1.614 | 25.952 | 1.650 |
| S12 | | 2.549 | 0.378 | | | 1.962 |
| S13 | Seventh Lens | 1.723 | 0.388 | 1.537 | 55.656 | 2.600 |
| S14 | | 1.239 | 0.160 | | | 2.502 |
| S15 | Infrared Block Filter | Infinity | 0.210 | 1.518 | 64.197 | 2.975 |
| S16 | | Infinity | 0.625 | | | 3.054 |
| S17 | Imaging Plane | Infinity | 0.014 | | | 3.282 |

Table 13 above shows the case in which a diameter of a variable stop is smaller than in Table 12 above.

TABLE 14

Fno = 2.0, f = 4.17, FOV = 74.92

| Surface Number | | Radius of Curvature | Thickness/ Distance | Refractive Index | Abbe Number | Effective Aperature Radius |
|---|---|---|---|---|---|---|
| S0 | VST | | 0 | | | 1.000 |
| S1 | First Lens | 1.727 | 0.780 | 1.544 | 56.094 | 1.320 |
| S2 | | 6.657 | 0.120 | | | 1.274 |
| S3 | Second Lens | 4.934 | 0.200 | 1.661 | 20.353 | 1.182 |
| S4 | | 2.462 | 0.224 | | | 1.050 |
| S5 | Third Lens | 2.875 | 0.267 | 1.544 | 56.094 | 1.050 |
| S6 | | 3.758 | 0.045 | | | 1.122 |
| S7 | Fourth Lens | 10.984 | 0.278 | 1.544 | 56.094 | 1.148 |
| S8 | | −39.517 | 0.453 | | | 1.200 |
| S9 | Fifth Lens | −12.773 | 0.329 | 1.661 | 20.353 | 1.300 |
| S10 | | −89.472 | 0.100 | | | 1.554 |
| S11 | Sixth Lens | 2.272 | 0.357 | 1.614 | 25.952 | 1.650 |
| S12 | | 2.549 | 0.378 | | | 1.962 |
| S13 | Seventh Lens | 1.723 | 0.388 | 1.537 | 55.656 | 2.600 |
| S14 | | 1.239 | 0.160 | | | 2.502 |
| S15 | Infrared Block Filter | Infinity | 0.210 | 1.518 | 64.197 | 2.975 |
| S16 | | Infinity | 0.625 | | | 3.054 |
| S17 | Imaging Plane | Infinity | 0.014 | | | 3.282 |

Table 14 above shows the case in which a diameter of a variable stop is smaller than in Table 13 above.

TABLE 15

Fno = 2.6, f = 4.17, FOV = 74.92

| Surface Number | | Radius of Curvature | Thickness/ Distance | Refractive Index | Abbe Number | Effective Aperature Radius |
|---|---|---|---|---|---|---|
| S0 | VST | | 0 | | | 0.800 |
| S1 | First Lens | 1.727 | 0.780 | 1.544 | 56.094 | 1.320 |
| S2 | | 6.657 | 0.120 | | | 1.274 |
| S3 | Second Lens | 4.934 | 0.200 | 1.661 | 20.353 | 1.182 |
| S4 | | 2.462 | 0.224 | | | 1.050 |
| S5 | Third Lens | 2.875 | 0.267 | 1.544 | 56.094 | 1.050 |
| S6 | | 3.758 | 0.045 | | | 1.122 |
| S7 | Fourth Lens | 10.984 | 0.278 | 1.544 | 56.094 | 1.148 |
| S8 | | −39.517 | 0.453 | | | 1.200 |
| S9 | Fifth Lens | −12.773 | 0.329 | 1.661 | 20.353 | 1.300 |
| S10 | | −89.472 | 0.100 | | | 1.554 |
| S11 | Sixth Lens | 2.272 | 0.357 | 1.614 | 25.952 | 1.650 |
| S12 | | 2.549 | 0.378 | | | 1.962 |
| S13 | Seventh Lens | 1.723 | 0.388 | 1.537 | 55.656 | 2.600 |
| S14 | | 1.239 | 0.160 | | | 2.502 |
| S15 | Infrared Block Filter | Infinity | 0.210 | 1.518 | 64.197 | 2.975 |
| S16 | | Infinity | 0.625 | | | 3.054 |
| S17 | Imaging Plane | Infinity | 0.014 | | | 3.282 |

Table 15 above shows the case in which a diameter of a variable stop is smallest.

The optical imaging system according to the present example may include the variable stop VST disposed in front of the first lens 410 and the stop ST disposed between the second lens 420 and the third lens 430. However, the stop ST may be disposed between the first lens 410 and the second lens 420.

The variable stop VST and the stop ST are devices to selectively change an amount of light incident on the optical system including the first lens 410 to the seventh lens 470. For example, a diameter of the variable stop VST may be increased to allow a relatively high amount of light to be incident in a low light level environment (refer to FIG. 17 and Table 12) and a diameter of the variable stop VST may be reduced to allow a relatively low amount of light to be incident in a high light level environment (refer to FIG. 23 and Table 15).

The optical imaging system according to the present example may change Fno depending on a diameter of the variable stop VST. Fno refers to a value indicating brightness of the optical system.

In the optical imaging system according to the present example, when a diameter of the variable stop VST is largest, Fno may be less than 1.7 and, when a diameter of the variable stop VST is smallest, Fno may be greater than 2.0.

In general, when Fno is changed, a position in which a focal point is formed may be changed. For example, a position in which a focal point is formed when Fno is 1.5 may be different from a position in which a focal point is formed when Fno is 2.6.

However, in the optical imaging system according to the present example, even if Fno is changed, a focal point is formed at the same position and, thus, image quality may be maintained constant.

FIG. 18 is a set of curves illustrating aberration characteristics when the optical imaging system according to the present example has a smallest Fno value.

A left curve of FIG. 18 shows longitudinal spherical aberration of an optical imaging system with respect to various wavelengths.

In the longitudinal spherical aberration curve of FIG. 18, a horizontal axis is a coefficient of longitudinal spherical aberration and a vertical axis is normalization of a distance to an effective aperture from an optical axis.

In a vertical axis of the longitudinal spherical aberration curve of FIG. 18, when a distance to the effective aperture from the optical axis is 1, a point of 0.25 may refer to a point of 25% of the distance to the effective aperture from the optical axis and a point of 0.75 may refer to a point of 75% of the distance to the effective aperture from the optical axis.

The effective aperture is a stop that actually blocks light and, in the optical imaging system according to the present example, the variable stop VST or the stop ST may function as an effective aperture depending on a diameter of the variable stop VST. For example, when the variable stop VST is open to a maximum degree, the stop ST may function as an effective aperture and, when the variable stop VST is narrowed to a maximum degree, the variable stop VST may function as an effective aperture.

Referring to FIG. 18, when the variable stop VST is open to a maximum degree and Fno has a smallest value, the optical imaging system according to the present example may be configured in such a way that longitudinal spherical aberration has a largest value at a position closest to an optical axis and has a smallest value at a position closest to an effective aperture with respect to light with a wavelength equal to or greater than 555 nm.

For example, the optical imaging system may be configured in such a way that longitudinal spherical aberration has a largest value at a point between 0 and 0.5 and has a smallest value at a point between 0.5 and 1.0.

Alternatively, the optical imaging system may be configured in such a way that longitudinal spherical aberration has a largest value at a point between 0.2 and 0.3 and has a smallest value at a point between 0.7 and 0.9.

For example, the optical imaging system may be configured in such a way that longitudinal spherical aberration is largest at a point of 0.25 and is smallest at a point of 0.75 with respect to light with a wavelength equal to or greater than 555 nm.

The optical imaging system according to the present example may be configured in such a way that a longitudinal spherical aberration curve has an inflection point.

According to the present example, the first lens 410 may have a positive refractive power, a first surface of the first lens 410 may have a convex shape in a paraxial region, and a second surface of the first lens 410 may have a concave shape in a paraxial region.

The second lens 420 may have a negative refractive power, a first surface of the second lens 420 may have a convex surface in a paraxial region, and a second surface of the second lens 420 may have a concave shape in a paraxial region.

The first lens 410 and the second lens 420 may be formed of plastic materials with different optical characteristics. For example, a difference of Abbe number between the first lens 410 and the second lens 420 may be greater than 30.

The third lens 430 may have a positive refractive power, a first surface of the third lens 430 may have a convex shape in a paraxial region, and a second surface of the third lens 430 may have a concave shape in a paraxial region.

The fourth lens 440 may have a positive refractive power, and first and second surfaces of the fourth lens 440 may have a convex shape in a paraxial region.

The fifth lens 450 may have a negative refractive power, a first surface of the fifth lens 450 may have a concave shape in a paraxial region, and a second surface of the fifth lens 450 may have a convex shape in a paraxial region.

The sixth lens 460 may have a positive refractive power, a first surface of the sixth lens 460 may have a convex shape in a paraxial region, and a second surface of the sixth lens 460 may have a concave shape in a paraxial region.

At least one inflection point may be formed on at least one of the first and second surfaces of the sixth lens 460. For example, the first surface of the sixth lens 460 may have a shape that becomes more concave toward an edge from a convex shape in a paraxial region. The second surface of the sixth lens 460 may have a shape that becomes more convex toward an edge from a concave shape in a paraxial region.

The seventh lens 470 may have a negative refractive power, a first surface of the seventh lens 470 may have a convex shape in a paraxial region, and a second surface of the seventh lens 470 may have a concave shape in a paraxial region.

At least one inflection point may be formed on at least one of the first and second surfaces of the seventh lens 470. For example, the first surface of the seventh lens 470 may have a shape that becomes more concave toward an edge from a convex shape in a paraxial region. The second surface of the seventh lens 470 may have a shape that becomes more convex toward an edge from a concave shape in a paraxial region.

Each surface of first lens 410 to the seventh lens 470 may have an aspherical surface coefficient shown in Table 16 below. For example, both an object-side surface and an image-side surface of the first lens 410 to the seventh lens 470 are aspherical surfaces.

TABLE 16

|   | S1 | S2 | S3 | S4 | S5 | S6 | S7 |
|---|---|---|---|---|---|---|---|
| R | 1.727025001 | 6.656619798 | 4.934295111 | 2.461913044 | 2.874643903 | 3.757542793 | 10.984274633 |
| K | −0.316001259 | −23.399576583 | −52.054678944 | −2.452294363 | −14.692377772 | 0.000000000 | −21.692188230 |
| A | −0.000206429 | −0.049863841 | −0.089379339 | −0.095117034 | 0.012923436 | 0.006858822 | 0.038457659 |
| B | 0.014640135 | 0.031140638 | 0.104699603 | 0.117910875 | −0.079731761 | −0.122175605 | −0.121197084 |
| C | −0.034488868 | −0.021470246 | −0.057735512 | −0.032168975 | −0.092185555 | −0.141617784 | 0.034132887 |
| D | 0.037987400 | 0.002436814 | 0.023665765 | −0.038075289 | 0.319093460 | 0.527124986 | 0.103297876 |
| E | −0.023732705 | 0.003636043 | −0.003488114 | 0.058774191 | −0.495065260 | −0.708221530 | 0.095531107 |
| F | 0.006497328 | −0.001744632 | 0.003395651 | −0.022810665 | 0.393519081 | 0.490689993 | −0.379211756 |
| G | −0.000828330 | 0.000128581 | −0.001756639 | 0.007395962 | −0.113535832 | −0.135894739 | 0.305542281 |
| H | 0.000000000 | 0.000000000 | 0.000000000 | 0.000000000 | 0.000000000 | 0.000000000 | −0.079879280 |
| J | 0.000000000 | 0.000000000 | 0.000000000 | 0.000000000 | 0.000000000 | 0.000000000 | 0.000000000 |

|   | S8 | S9 | S10 | S11 | S12 | S13 | S14 |
|---|---|---|---|---|---|---|---|
| R | −39.516845235 | −12.772963983 | −89.472087188 | 2.272202391 | 2.549448528 | 1.723442286 | 1.238597896 |
| K | −99.000000000 | 72.843871805 | 99.000000000 | −8.387764524 | −25.993999668 | −3.818806861 | −0.960751624 |
| A | −0.000751588 | 0.030872135 | 0.014251157 | 0.005531708 | 0.032959879 | −0.393751339 | −0.420838929 |
| B | −0.071778447 | −0.027822379 | −0.226917689 | −0.143316759 | −0.067201550 | 0.182809652 | 0.249298017 |
| C | 0.073492604 | −0.349578575 | 0.311555518 | 0.146165050 | 0.015841889 | −0.045404409 | −0.119351166 |
| D | 0.003082466 | 0.957465690 | −0.278953240 | −0.132726871 | 0.002180816 | 0.007361900 | 0.039834796 |
| E | 0.012678405 | −1.332527126 | 0.148536875 | 0.070731345 | −0.002007885 | −0.000811583 | −0.008522950 |
| F | 0.064818855 | 1.034982535 | 0.040256965 | −0.018712224 | 0.000404988 | 0.000055561 | 0.001107292 |
| G | 0.033244344 | −0.426527606 | 0.004223138 | 0.001940659 | −0.000026799 | −0.000001727 | −0.000079768 |
| H | 0.000000000 | 0.072221121 | 0.000000000 | 0.000000000 | 0.000000000 | 0.000000000 | 0.000002461 |
| J | 0.000000000 | 0.000000000 | 0.000000000 | 0.000000000 | 0.000000000 | 0.000000000 | 0.000000000 |

With reference to FIGS. 25 to 28, an optical imaging system according to another example is described below.

Figure 25:
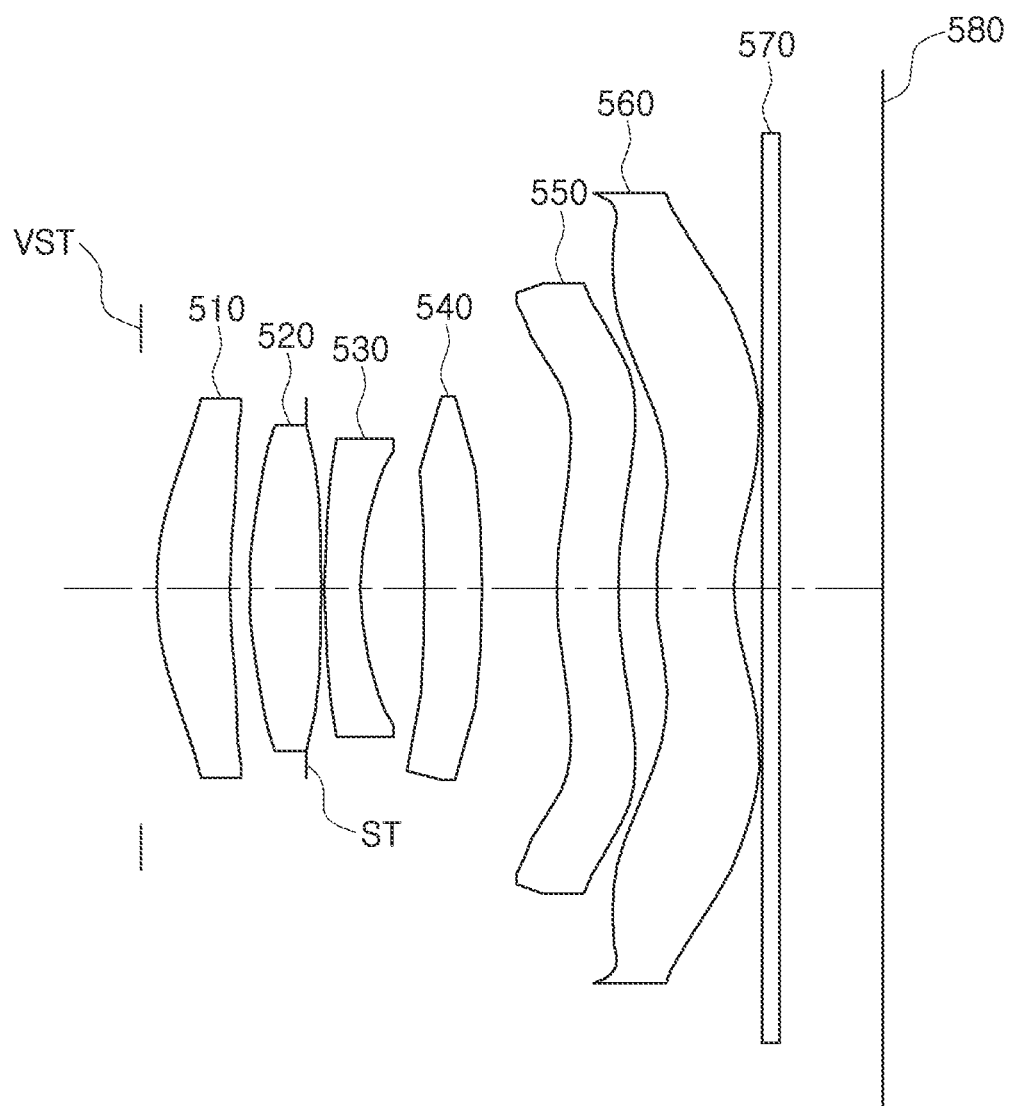
FIG. 25 is a diagram illustrating a case in which a variable stop is open to a maximum degree in an example of an optical imaging system.
Figure 26:
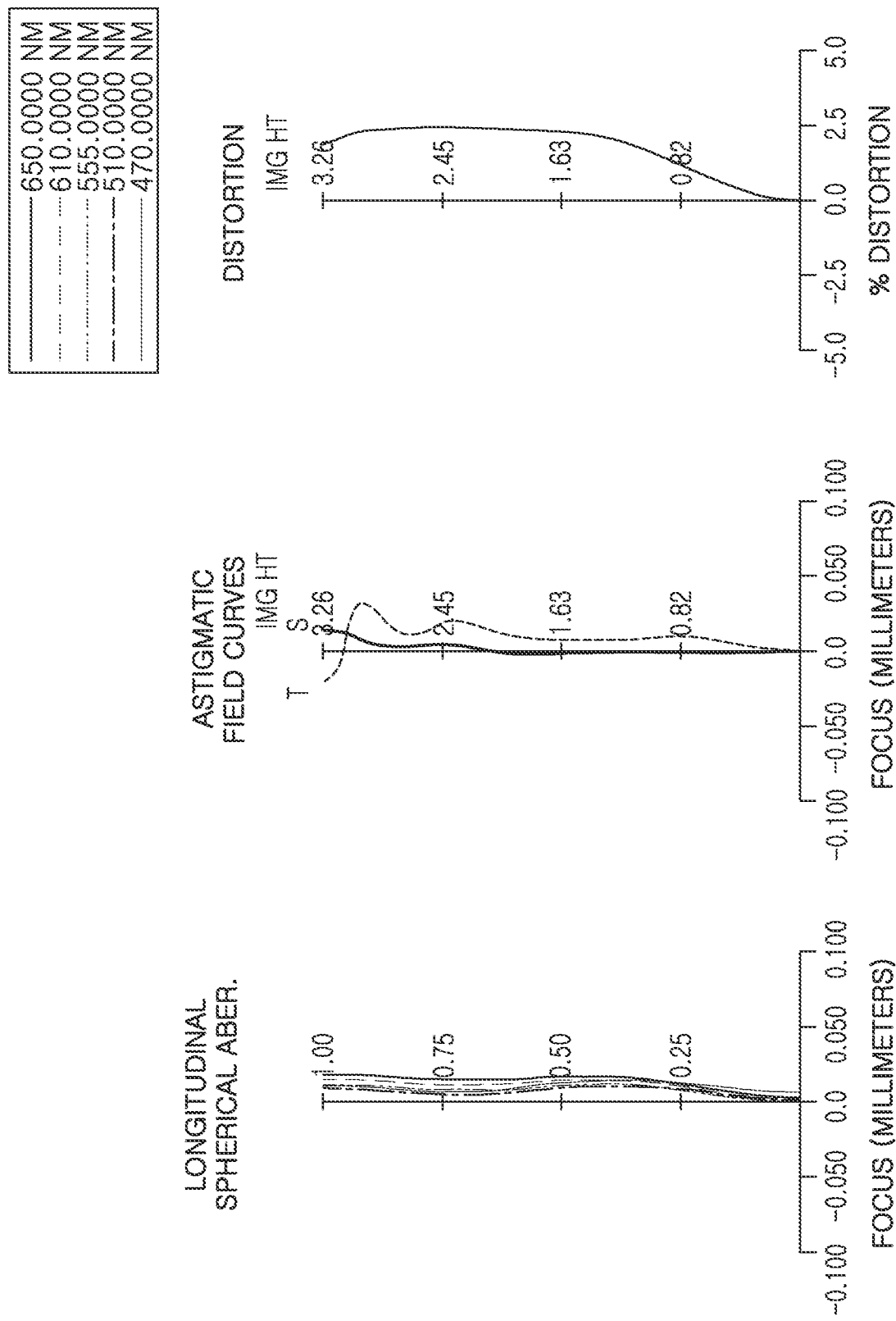
FIG. 26 is a set of curves illustrating aberration characteristics of the optical imaging system shown in FIG. 25.
Figure 27:
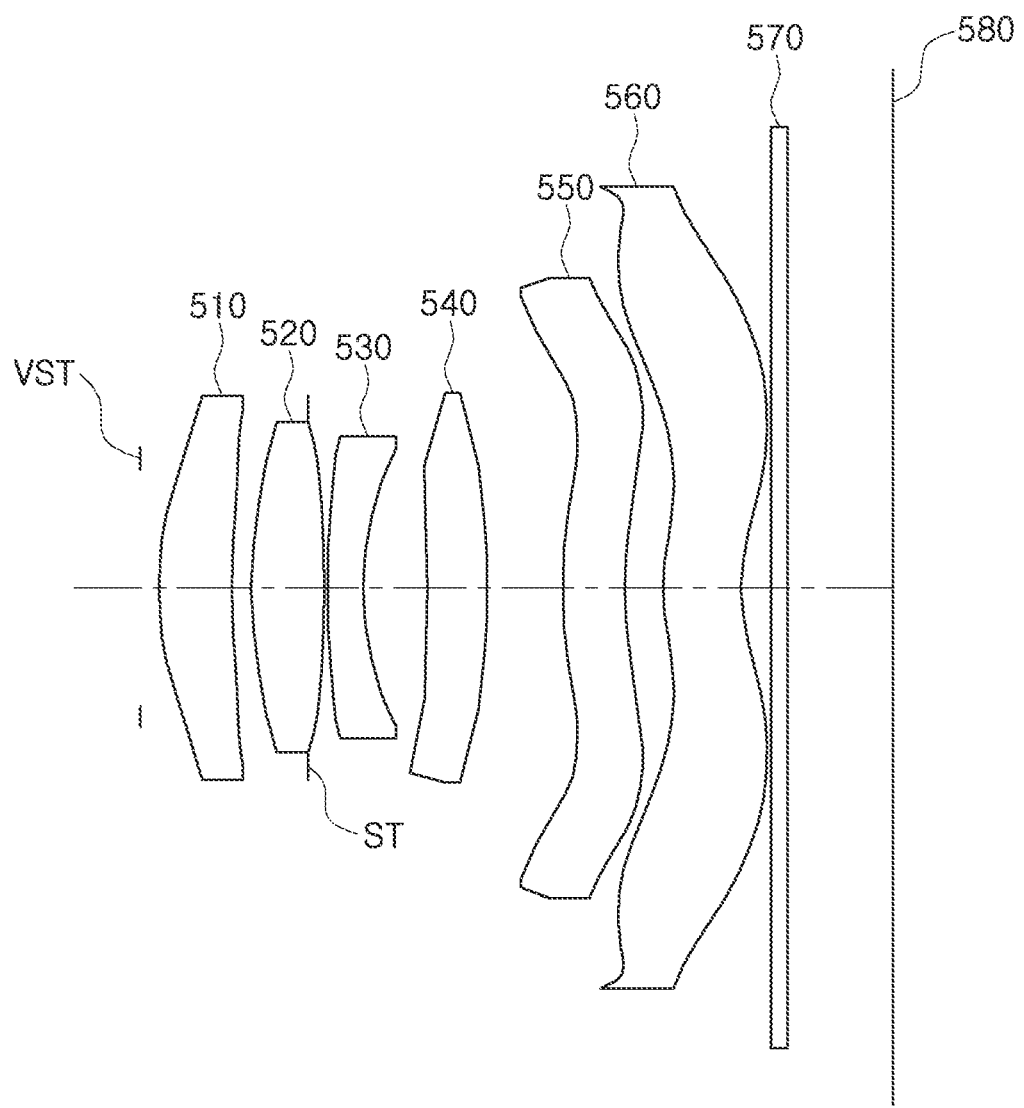
FIG. 27 is a diagram illustrating a case in which the variable stop is narrowed to a maximum degree in the example of an optical imaging system.
Figure 28:
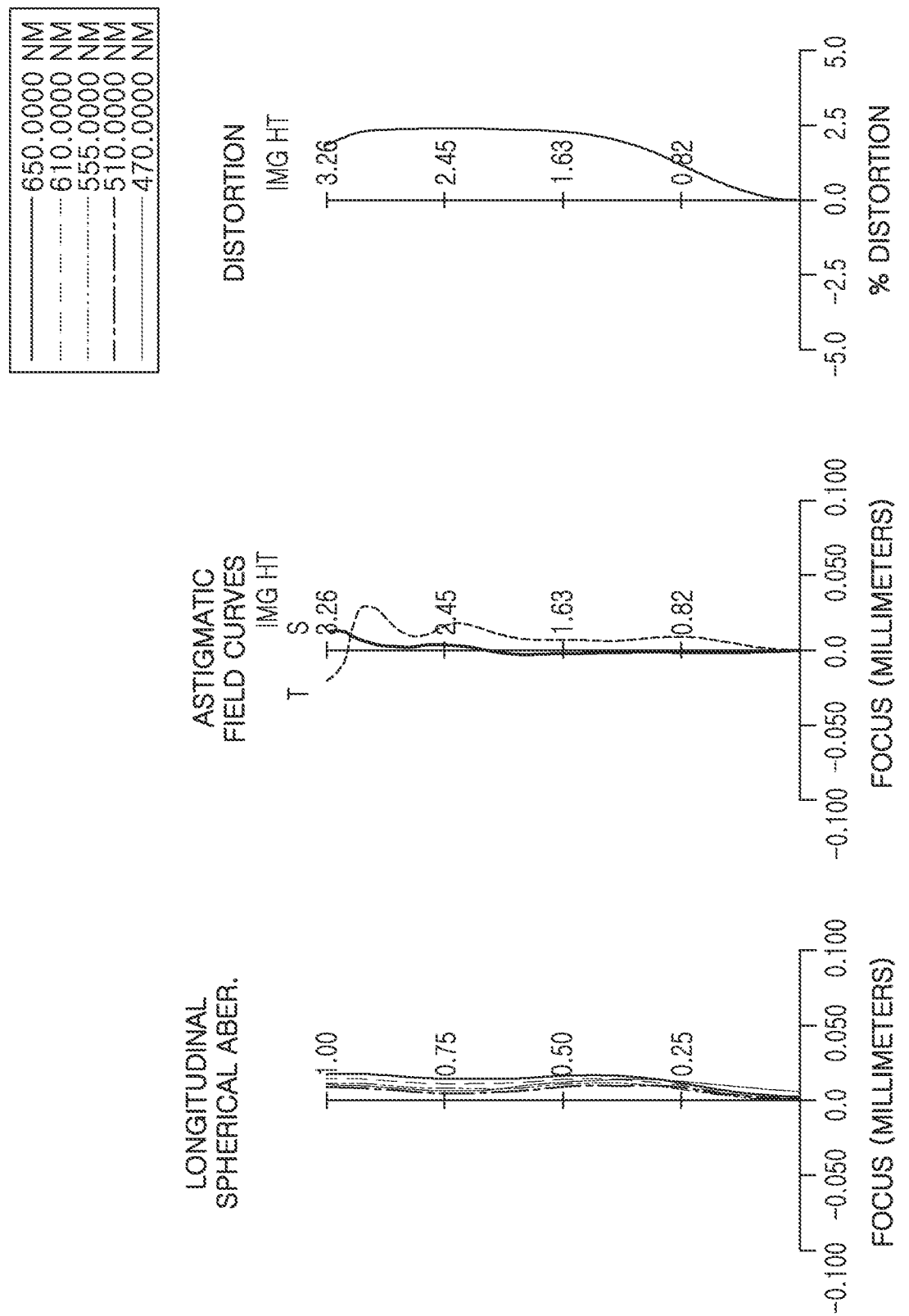
FIG. 28 is a set of curves illustrating aberration characteristics of the optical imaging system shown in FIG. 27.

FIGS. 25 and 26 show the case in which a variable stop is open to a maximum degree in the optical imaging system according to the present example. FIGS. 27 and 28 show a state in which a variable stop is narrowed to a maximum degree.

The optical imaging system according to the present example may include an optical system including a first lens 510, a second lens 520, a third lens 530, a fourth lens 540, a fifth lens 550, and a sixth lens 560 and may further include an infrared block filter 570, an image sensor 580, a variable stop VST, and a stop ST.

Lens characteristics of each lens (a radius of curvature, a thickness of a lens, a distance between lenses, a refractive index, Abbe number, and an effective aperture radius) are shown in Tables 17 and 18 below.

TABLE 17

Fno = 1.7, f = 4.10, FOV = 75.84

| Surface Number | | Radius of Curvature | Thickness/ Distance | Refractive Index | Abbe Number | Effective Aperature Radius |
|---|---|---|---|---|---|---|
| S0 | VST | | 0.12 | | | 1.600 |
| S1 | First Lens | 2.047 | 0.482 | 1.546 | 56.1 | 1.285 |
| S2 | | 3.899 | 0.133 | | | 1.186 |
| S3 | Second Lens | 2.869 | 0.483 | 1.546 | 56.1 | 1.100 |
| S4 | | −7.145 | 0.020 | | | 1.063 |
| S5 | Third Lens | 6.959 | 0.240 | 1.667 | 20.4 | 1.008 |
| S6 | | 1.960 | 0.422 | | | 0.920 |
| S7 | Fourth Lens | 54.380 | 0.392 | 1.656 | 21.5 | 1.070 |
| S8 | | −28.856 | 0.508 | | | 1.298 |
| S9 | Fifth Lens | 2.962 | 0.410 | 1.656 | 21.5 | 1.875 |
| S10 | | 2.468 | 0.254 | | | 2.200 |
| S11 | Sixth Lens | 1.503 | 0.519 | 1.537 | 55.7 | 2.501 |
| S12 | | 1.243 | 0.193 | | | 2.670 |
| S13 | Infrared Block Filter | Infinity | 0.110 | 1.516 | 55.2 | 3.033 |
| S14 | | Infinity | 0.690 | | | 3.071 |
| S15 | Imaging Plane | Infinity | 0.010 | | | 3.501 |

Table 17 above shows the case in which a diameter of a variable stop is largest.

TABLE 18

Fno = 2.6, f = 4.10, FOV = 75.84

| Surface Number | | Radius of Curvature | Thickness/ Distance | Refractive Index | Abbe Number | Effective Aperature Radius |
|---|---|---|---|---|---|---|
| S0 | VST | | 0.12 | | | 0.780 |
| S1 | First Lens | 2.047 | 0.482 | 1.546 | 56.1 | 1.285 |
| S2 | | 3.899 | 0.133 | | | 1.186 |
| S3 | Second Lens | 2.869 | 0.483 | 1.546 | 56.1 | 1.100 |
| S4 | | −7.145 | 0.020 | | | 1.063 |
| S5 | Third Lens | 6.959 | 0.240 | 1.667 | 20.4 | 1.008 |
| S6 | | 1.960 | 0.422 | | | 0.920 |
| S7 | Fourth Lens | 54.380 | 0.392 | 1.656 | 21.5 | 1.070 |
| S8 | | −28.856 | 0.508 | | | 1.298 |
| S9 | Fifth Lens | 2.962 | 0.410 | 1.656 | 21.5 | 1.875 |
| S10 | | 2.468 | 0.254 | | | 2.200 |
| S11 | Sixth Lens | 1.503 | 0.519 | 1.537 | 55.7 | 2.501 |
| S12 | | 1.243 | 0.193 | | | 2.670 |
| S13 | Infrared Block Filter | Infinity | 0.110 | 1.516 | 55.2 | 3.033 |

TABLE 18-continued

Fno = 2.6, f = 4.10, FOV = 75.84

| Surface Number | | Radius of Curvature | Thickness/ Distance | Refractive Index | Abbe Number | Effective Aperature Radius |
|---|---|---|---|---|---|---|
| S14 | | Infinity | 0.690 | | | 3.071 |
| S15 | Imaging Plane | Infinity | 0.010 | | | 3.501 |

Table 18 above shows the case in which a diameter of a variable stop is smallest.

The optical imaging system according to the present example may include the variable stop VST disposed in front of the first lens 510 and the stop ST disposed between the second lens 520 and the third lens 530. However, the stop ST may be disposed between the first lens 510 and the second lens 520.

The variable stop VST and the stop ST are devices to selectively change an amount of light incident on the optical system including the first lens 510 to the sixth lens 560. For example, a diameter of the variable stop VST may be increased to allow a relatively high amount of light to be incident in a low light level environment (refer to FIG. 25 and Table 17) and a diameter of the variable stop VST may be reduced to allow a relatively low amount of light to be incident in a high light level environment (refer to FIG. 27 and Table 18).

The optical imaging system according to the present example may change Fno depending on a diameter of the variable stop VST. Fno refers to a value indicating brightness of the optical system.

In the optical imaging system according to the present example, when a diameter of the variable stop VST is largest, Fno may be less than 1.7 and, when a diameter of the variable stop VST is smallest, Fno may be greater than 2.0.

In general, when Fno is changed, a position in which a focal point is formed may be changed. For example, a position in which a focal point is formed when Fno is 1.7 may be different from a position in which a focal point is formed when Fno is 2.6.

However, in the optical imaging system according to the present example, even if Fno is changed, a focal point is formed at the same position and, thus, image quality may be maintained constant.

FIG. 26 is a set of curves illustrating aberration characteristics when the optical imaging system has a smallest Fno value according to the present example.

A left curve of FIG. 26 shows longitudinal spherical aberration of an optical imaging system with respect to various wavelengths.

In the longitudinal spherical aberration curve of FIG. 26, a horizontal axis is a coefficient of longitudinal spherical aberration and a vertical axis is normalization of a distance to an effective aperture from an optical axis.

In a vertical axis of the longitudinal spherical aberration curve of FIG. 26, when a distance to the effective aperture from the optical axis is 1, a point of 0.25 may refer to a point of 25% of the distance to the effective aperture from the optical axis and a point of 0.75 may refer to a point of 75% of the distance to the effective aperture from the optical axis.

The effective aperture is a stop that actually blocks light and, in the optical imaging system according to the present example, the variable stop VST or the stop ST may function as an effective aperture depending on a diameter of the variable stop VST. For example, when the variable stop VST is open to a maximum degree, the stop ST may function as an effective aperture and, when the variable stop VST is narrowed to a maximum degree, the variable stop VST may function as an effective aperture.

Referring to FIG. 26, when the variable stop VST is open to a maximum degree and Fno has a smallest value, the optical imaging system according to the present example may be configured in such a way that longitudinal spherical aberration has a largest value at a position closest to an optical axis and has a smallest value at a position closest to an effective aperture with respect to light with a wavelength equal to or greater than 555 nm.

For example, the optical imaging system may be configured in such a way that longitudinal spherical aberration has a largest value at a point between 0 and 0.5 and has a smallest value at a point between 0.5 and 1.0.

For example, the optical imaging system may be configured in such a way that longitudinal spherical aberration has a largest value at a point of 0.4 and has a smallest value at a point of 0.75 with respect to light with a wavelength equal to or greater than 555 nm.

The optical imaging system according to the present example may be configured in such a way that a longitudinal spherical aberration curve has an inflection point.

According to the present example, the first lens 510 may have a positive refractive power, a first surface of the first lens 510 may have a convex shape in a paraxial region, and a second surface of the first lens 510 may have a concave shape in a paraxial region.

The second lens 520 may have a positive refractive power and first and second surfaces of the second lens 520 may have a convex shape in a paraxial region.

The third lens 530 may have a negative refractive power, a first surface of the third lens 530 may have a convex shape in a paraxial region, and a second surface of the third lens 530 may have a concave shape in a paraxial region.

The fourth lens 540 may have a positive refractive power and first and second surfaces of the fourth lens 540 may have a convex shape in a paraxial region.

The fifth lens 550 may have a negative refractive power, a first surface of the fifth lens 550 may have a convex shape in a paraxial region, and a second surface of the fifth lens 550 may have a concave shape in a paraxial region.

At least one inflection point may be formed on at least one of the first and second surfaces of the fifth lens 550. For example, the first surface of the fifth lens 550 may have a shape that becomes more concave toward an edge from a convex shape in a paraxial region. The second surface of the fifth lens 550 may have a shape that becomes more convex toward an edge from a concave shape in a paraxial region.

The sixth lens 560 may have a negative refractive power, a first surface of the sixth lens 560 may have a convex shape in a paraxial region, and a second surface of the sixth lens 560 may have a concave shape at a paraxial region.

At least one inflection point may be formed on at least one of the first and second surfaces of the sixth lens 560. For example, the first surface of the sixth lens 560 may have a shape that becomes more concave toward an edge from a convex shape in a paraxial region. The second surface of the sixth lens 560 may have a shape that becomes more convex toward an edge from a concave shape in a paraxial region.

Each surface of the first lens 510 to the sixth lens 560 may have an aspherical surface coefficient shown in Table 19 below. For example, both an object-side surface and an image-side surface of the first lens 510 to the sixth lens 560 are aspherical surfaces.

TABLE 19

|   | S1 | S2 | S3 | S4 | S5 | S6 |
|---|---|---|---|---|---|---|
| R | 2.047 | 3.899 | −2.799 | −45.506 | 40.820 | −6.167 |
| K | −1.248 | −6.379 | −0.038 | 0.143 | 0.025 | −0.013 |
| A | −0.016 | −0.071 | 0.012 | −0.571 | −0.199 | 0.217 |
| B | −0.013 | −0.028 | −0.209 | 1.004 | 0.205 | −0.472 |
| C | −0.004 | −0.002 | 0.582 | −1.082 | 0.218 | 0.741 |
| D | −0.014 | 0.113 | −0.645 | 0.707 | −0.720 | −0.700 |
| E | 0.019 | −0.128 | 0.351 | −0.250 | 0.656 | 0.362 |
| F | −0.005 | 0.067 | −0.080 | 0.033 | −0.214 | −0.069 |
| G | 0.000 | −0.015 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

|   | S7 | S8 | S9 | S10 | S11 | S12 |
|---|---|---|---|---|---|---|
| R | −0.111 | −47.338 | −1.028 | −39.932 | 1.503 | 1.243 |
| K | 0.139 | −0.124 | −0.083 | 0.001 | −11.103 | −5.026 |
| A | −0.482 | 0.108 | 0.090 | 0.036 | −0.254 | −0.174 |
| B | 1.281 | −0.239 | −0.167 | −0.080 | 0.111 | 0.100 |
| C | −2.097 | 0.454 | 0.146 | 0.056 | −0.013 | −0.046 |
| D | 2.022 | −0.523 | −0.079 | −0.022 | −0.008 | 0.015 |
| E | −1.049 | 0.359 | 0.026 | 0.005 | 0.004 | −0.003 |
| F | 0.000 | −0.133 | 0.000 | 0.000 | −0.001 | 0.000 |
| G | 0.000 | 0.000 | 0.000 | 0.000 | 0.000 | 0.000 |
| H | 0.000 | 0.000 | 0.000 | 0.000 | 0.000 | 0.000 |
| J | 0.000 | 0.000 | 0.000 | 0.000 | 0.000 | 0.000 |

With reference to FIGS. 29 to 32, an optical imaging system according to another example is described below.

Figure 29:
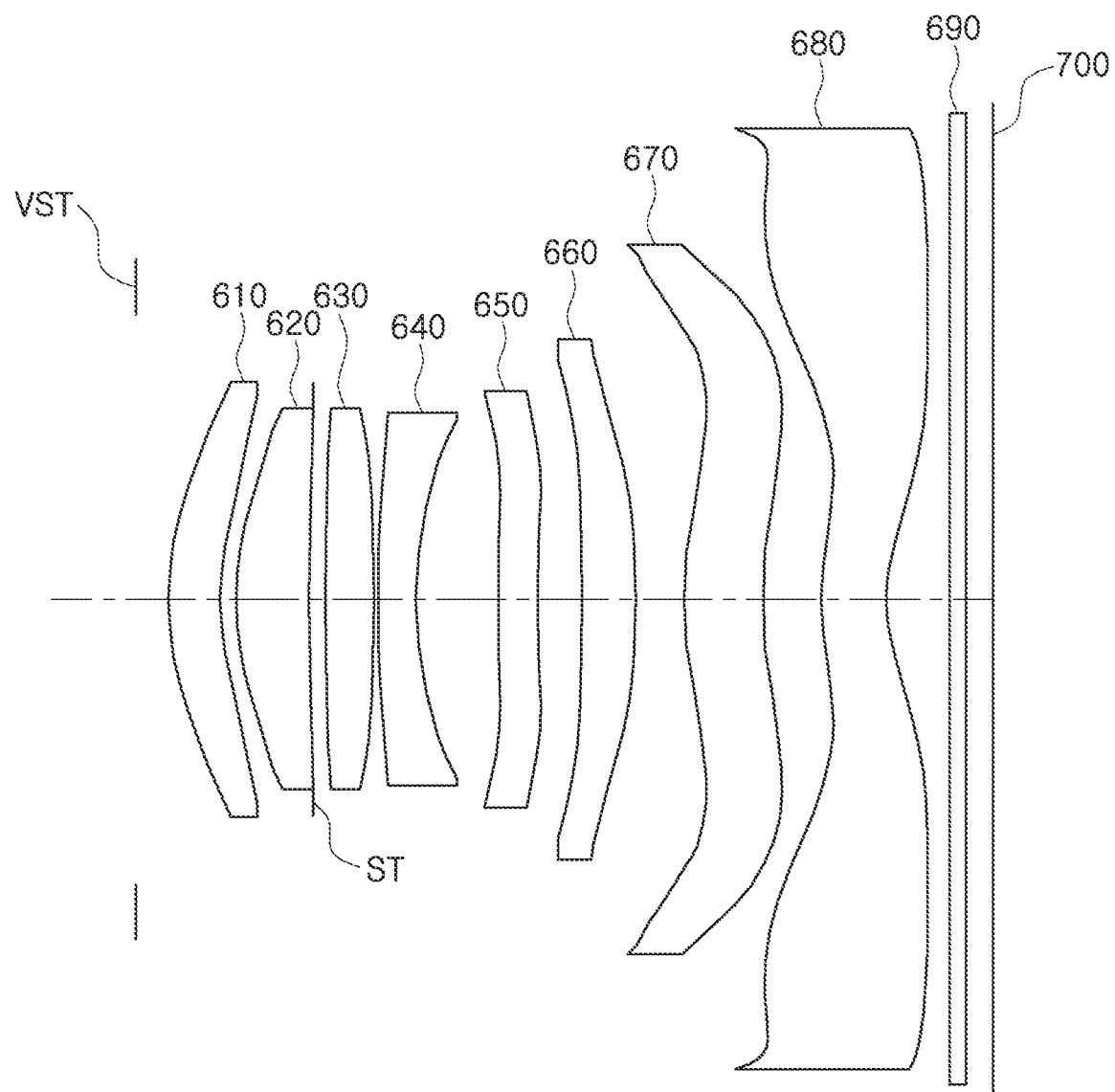
FIG. 29 is a diagram illustrating a case in which a variable stop is open to a maximum degree in an example of an optical imaging system.
Figure 30:
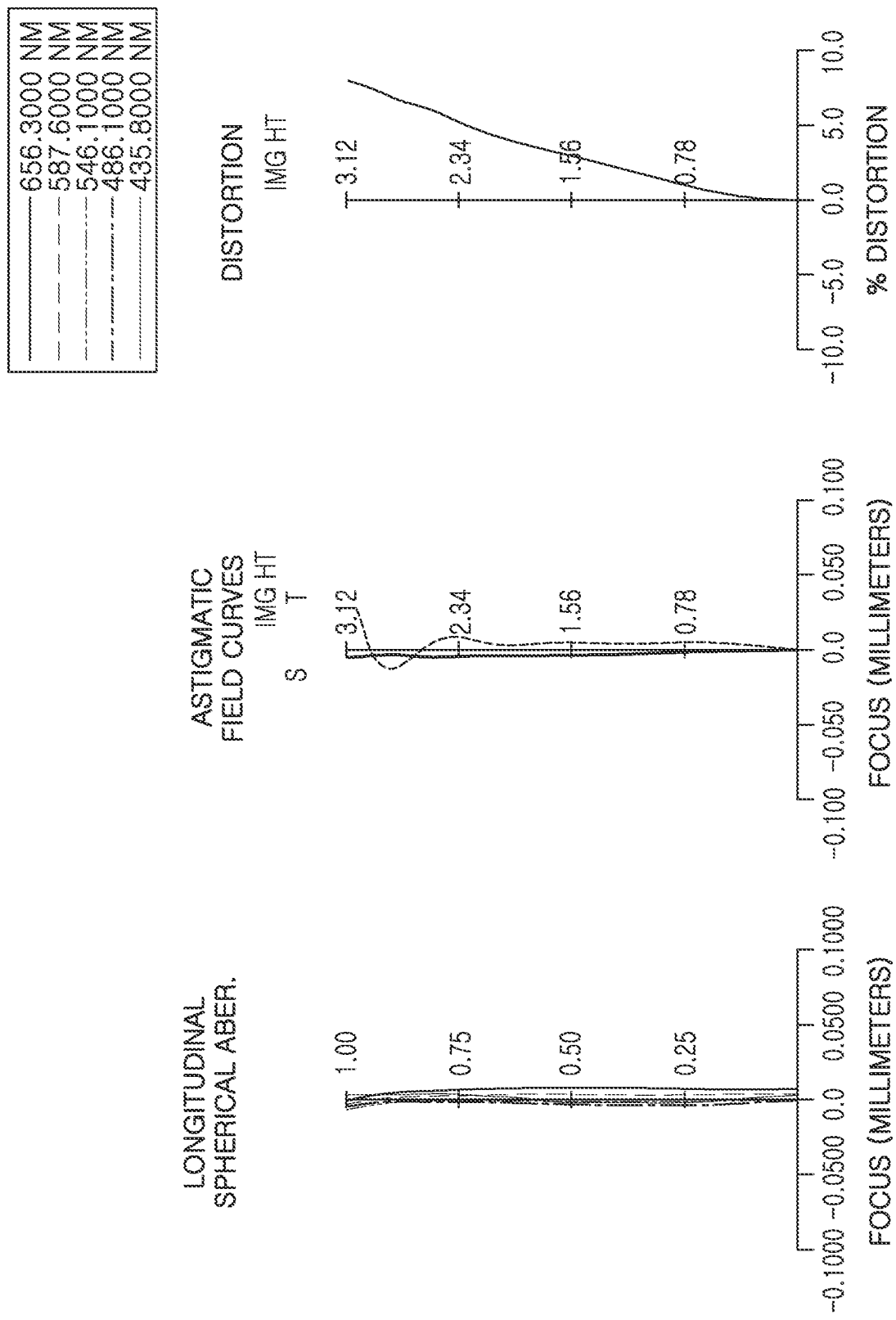
FIG. 30 is a set of curves illustrating aberration characteristics of the optical imaging system shown in FIG. 29.
Figure 31:
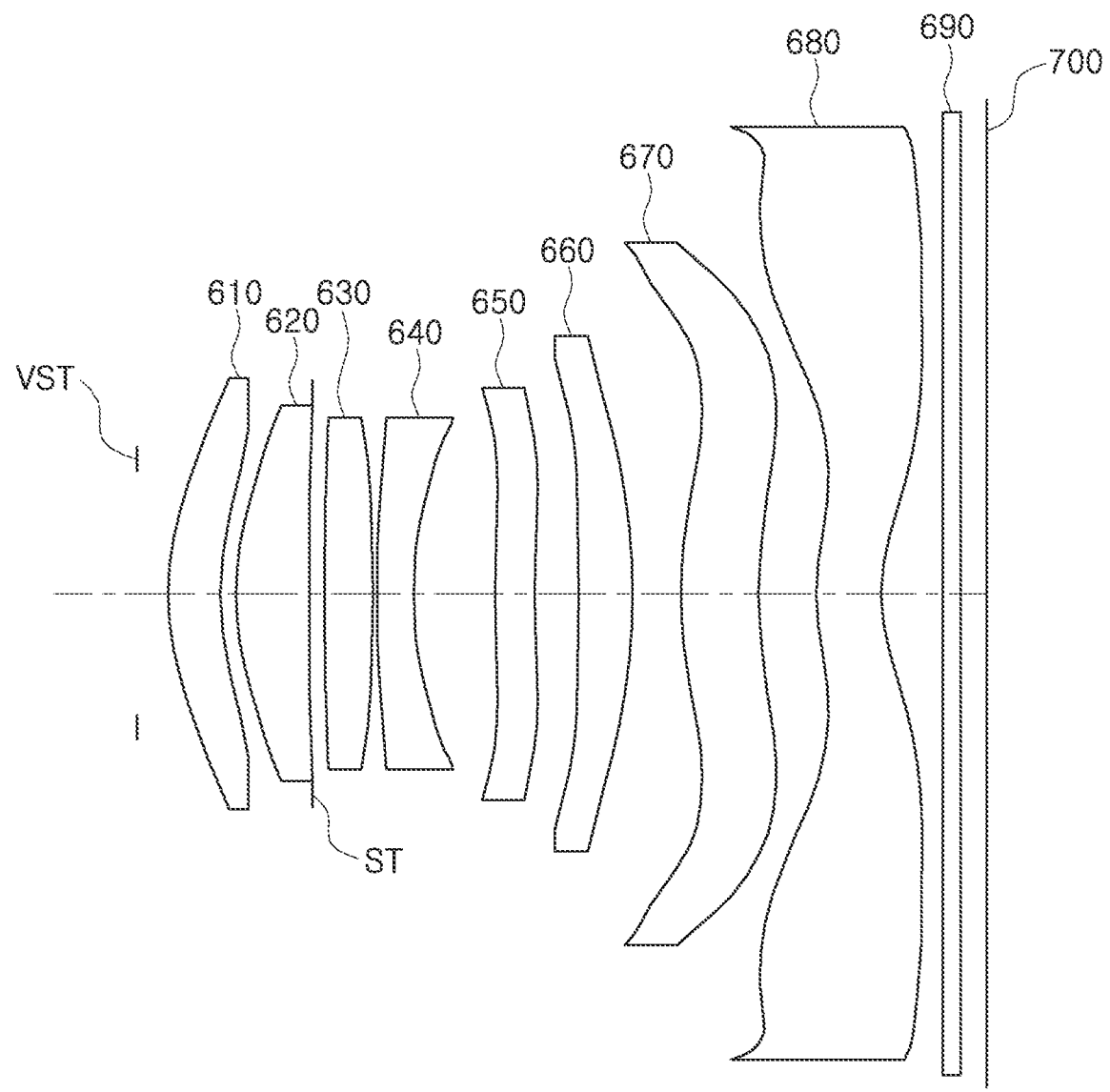
FIG. 31 is a diagram illustrating a case in which the variable stop is narrowed to a maximum degree in the example of an optical imaging system.
Figure 32:
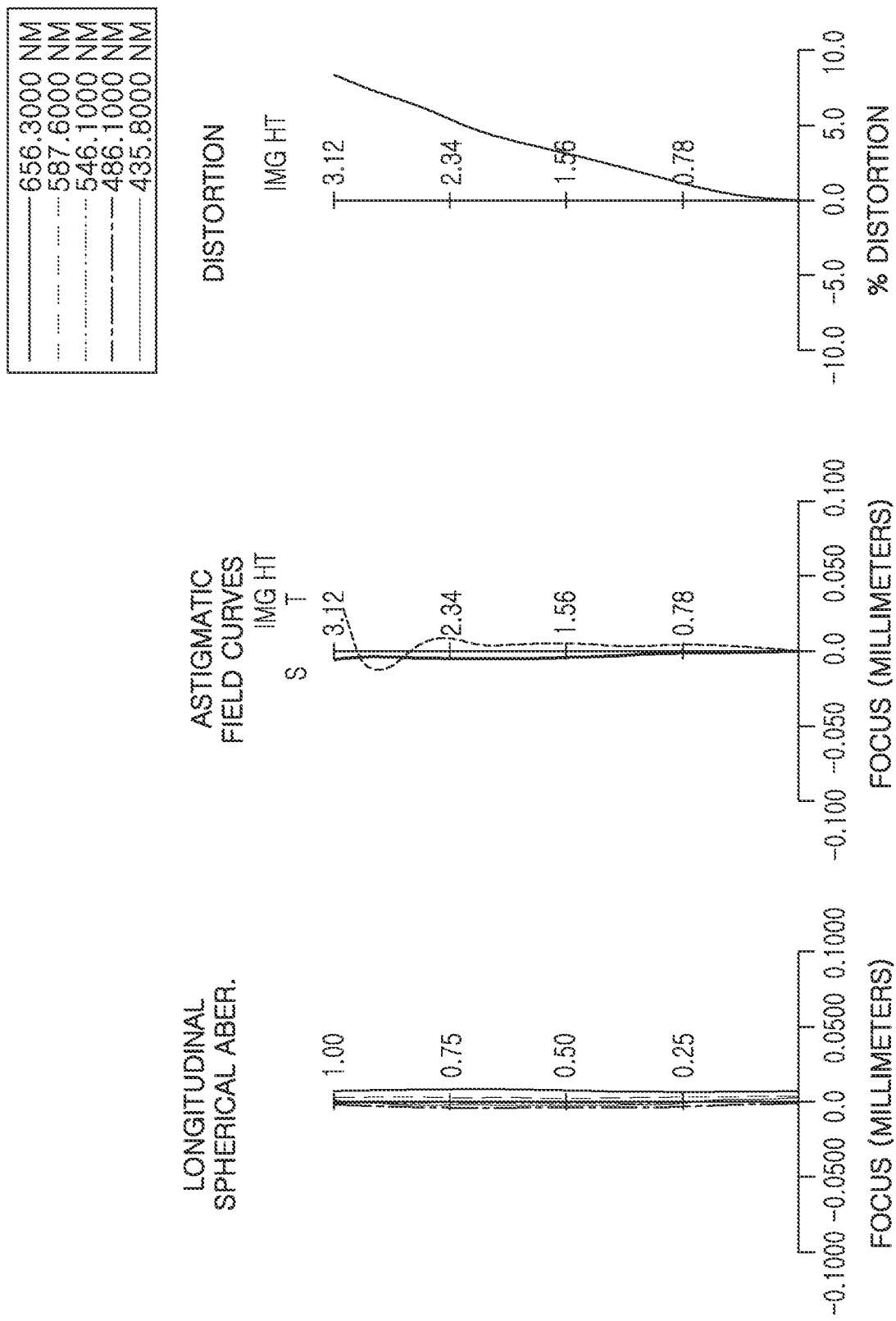
FIG. 32 is a set of curves illustrating aberration characteristics of the optical imaging system shown in FIG. 31.

FIGS. 29 and 30 show the case in which a variable stop is open to a maximum degree in the optical imaging system according to the present example. FIGS. 31 and 32 show a state in which a variable stop is narrowed to a maximum degree.

The optical imaging system according to the present example may include an optical system including a first lens 610, a second lens 620, a third lens 630, a fourth lens 640, a fifth lens 650, a sixth lens 660, a seventh lens 670, and an eighth lens 680 and may further include an infrared block filter 690, an image sensor 700, a variable stop VST, and a stop ST.

Lens characteristics of each lens (a radius of curvature, a thickness of a lens, a distance between lenses, a refractive index, Abbe number, and an effective aperture radius) are shown in Tables 20 and 21 below.

TABLE 20

Fno = 1.6, f = 4.055, FOV = 71.8

| Surface Number | | Radius of Curvature | Thickness/ Distance | Refractive Index | Abbe Number | Effective Aperature Radius |
|---|---|---|---|---|---|---|
| S0 | VST | | 0.2 | | | 1.838 |
| S1 | First Lens | 2.0002 | 0.332 | 1.546 | 56.1 | 1.411 |
| S2 | | 1.897 | 0.102 | | | 1.323 |
| S3 | Second Lens | 1.908 | 0.468 | 1.546 | 56.1 | 1.228 |
| S4 | | 27.333 | 0.104 | | | 1.229 |
| S5 | Third Lens | 27.796 | 0.312 | 1.546 | 56.1 | 1.231 |
| S6 | | −8.235 | 0.024 | | | 1.231 |
| S7 | Fourth Lens | 8.660 | 0.238 | 1.656 | 21.5 | 1.203 |
| S8 | | 2.442 | 0.527 | | | 1.155 |
| S9 | Fifth Lens | 7.751 | 0.256 | 1.656 | 21.5 | 1.214 |
| S10 | | 7.583 | 0.287 | | | 1.348 |
| S11 | Sixth Lens | −13.132 | 0.343 | 1.546 | 56.1 | 1.546 |
| S12 | | −4.728 | 0.317 | | | 1.684 |
| S13 | Seventh Lens | 3.037 | 0.496 | 1.646 | 23.5 | 2.103 |
| S14 | | 3.065 | 0.379 | | | 2.289 |
| S15 | Eighth Lens | 1.742 | 0.413 | 1.537 | 55.7 | 2.699 |
| S16 | | 1.161 | 0.400 | | | 3.044 |
| S17 | Infrared Block Filter | Infinity | 0.110 | 1.518 | 64.197 | 3.122 |
| S18 | | Infinity | 0.175 | | | 3.144 |
| S19 | Imaging Plane | Infinity | 0.000 | | | 3.205 |

Table 20 above shows the case in which a diameter of a variable stop is largest.

TABLE 21

Fno = 2.6, f = 4.055, FOV = 71.8

| Surface Number | | Radius of Curvature | Thickness/ Distance | Refractive Index | Abbe Number | Effective Aperature Radius |
|---|---|---|---|---|---|---|
| S0 | VST | | 0.2 | | | 0.800 |
| S1 | First Lens | 2.0002 | 0.332 | 1.546 | 56.1 | 1.411 |
| S2 | | 1.897 | 0.102 | | | 1.323 |
| S3 | Second Lens | 1.908 | 0.468 | 1.546 | 56.1 | 1.228 |
| S4 | | 27.333 | 0.104 | | | 1.229 |
| S5 | Third Lens | 27.796 | 0.312 | 1.546 | 56.1 | 1.231 |
| S6 | | −8.235 | 0.024 | | | 1.231 |
| S7 | Fourth Lens | 8.660 | 0.238 | 1.656 | 21.5 | 1.203 |
| S8 | | 2.442 | 0.527 | | | 1.155 |
| S9 | Fifth Lens | 7.751 | 0.256 | 1.656 | 21.5 | 1.214 |
| S10 | | 7.583 | 0.287 | | | 1.348 |
| S11 | Sixth Lens | −13.132 | 0.343 | 1.546 | 56.1 | 1.546 |
| S12 | | −4.728 | 0.317 | | | 1.684 |
| S13 | Seventh Lens | 3.037 | 0.496 | 1.646 | 23.5 | 2.103 |
| S14 | | 3.065 | 0.379 | | | 2.289 |
| S15 | Eighth Lens | 1.742 | 0.413 | 1.537 | 55.7 | 2.699 |
| S16 | | 1.161 | 0.400 | | | 3.044 |
| S17 | Infrared Block Filter | Infinity | 0.110 | 1.518 | 64.197 | 3.122 |
| S18 | | Infinity | 0.175 | | | 3.144 |
| S19 | Imaging Plane | Infinity | 0.000 | | | 3.205 |

Table 21 above shows the case in which a diameter of a variable stop is smallest.

The optical imaging system according to the present example may include the variable stop VST disposed in front of the first lens 610 and the stop ST disposed between the second lens 620 and the third lens 630. However, the stop ST may be disposed between the first lens 610 and the second lens 620.

The variable stop VST and the stop ST are devices to selectively change an amount of light incident on the optical system including the first lens 610 to the eighth lens 680. For example, a diameter of the variable stop VST may be increased to allow a relatively high amount of light to be incident in a low light level environment (refer to FIG. 29 and Table 20) and a diameter of the variable stop VST may be reduced to allow a relatively low amount of light to be incident in a high light level environment (refer to FIG. 31 and Table 21).

The optical imaging system according to the present example may change Fno depending on a diameter of the variable stop VST. Fno refers to a value indicating brightness of the optical system.

In the optical imaging system according to the present example, when a diameter of the variable stop VST is largest, Fno may be less than 1.7 and, when a diameter of the variable stop VST is smallest, Fno may be greater than 2.0.

In general, when Fno is changed, a position in which a focal point is formed may be changed. For example, a position in which a focal point is formed when Fno is 1.6 may be different from a position in which a focal point is formed when Fno is 2.6.

However, in the optical imaging system according to the present example, even if Fno is changed, a focal point is formed at the same position and, thus, image quality may be maintained constant.

FIG. 30 is a set of curves illustrating aberration characteristics when the optical imaging system according to the present example has a smallest Fno value.

A left curve of FIG. 30 shows longitudinal spherical aberration of an optical imaging system with respect to various wavelengths.

In the longitudinal spherical aberration curve of FIG. 30, a horizontal axis is a coefficient of longitudinal spherical aberration and a vertical axis is normalization of a distance to an effective aperture from an optical axis.

In a vertical axis of the longitudinal spherical aberration curve of FIG. 30, when a distance to the effective aperture from the optical axis is 1, a point of 0.25 may refer to a point of 25% of the distance to the effective aperture from the optical axis and a point of 0.75 may refer to a point of 75% of the distance to the effective aperture from the optical axis.

The effective aperture is a stop that actually blocks light and, in the optical imaging system according to the present example, the variable stop VST or the stop ST may function as an effective aperture depending on a diameter of the variable stop VST. For example, when the variable stop VST is open to a maximum degree, the stop ST may function as an effective aperture and, when the variable stop VST is narrowed to a maximum degree, the variable stop VST may function as an effective aperture.

Referring to FIG. 30, when the variable stop VST is open to a maximum degree and Fno has a smallest value, the optical imaging system according to the present example may be configured in such a way that longitudinal spherical aberration has a largest value at a position closest to an optical axis and has a smallest value at a position closest to an effective aperture with respect to light with a wavelength equal to or greater than 546.1 nm.

For example, the optical imaging system may be configured in such a way that longitudinal spherical aberration has a largest value at a point between 0 and 0.5 and has a smallest value at a point between 0.5 and 1.0.

For example, the optical imaging system may be configured in such a way that longitudinal spherical aberration has a largest value at a point of 0.4 and has a smallest value at a point of 1.0 with respect to light with a wavelength equal to or greater than 546.1 nm.

The optical imaging system according to the present example may be configured in such a way that a longitudinal spherical aberration curve has an inflection point.

According to the present example, the first lens 610 may have a positive refractive power, a first surface of the first lens 610 may have a convex shape in a paraxial region, and a second surface of the first lens 610 may have a concave shape in a paraxial region.

The second lens 620 may have a positive refractive power, a first surface of the second lens 620 may have a convex shape in a paraxial region, and a second surface of the second lens 620 may have a concave shape in a paraxial region.

The third lens 630 may have a positive refractive power and first and second surfaces of the third lens 630 may each have a convex shape in a paraxial region.

The fourth lens 640 may have a negative refractive power, a first surface of the fourth lens 640 may have a convex shape in a paraxial region, and a second surface of the fourth lens 640 may have a concave shape in a paraxial region.

The fifth lens 650 may have a negative refractive power, a first surface of the fifth lens 650 may have a convex shape in a paraxial region, and a second surface of the fifth lens 650 may have a concave shape in a paraxial region.

At least one inflection point may be formed on at least one of the first and second surfaces of the fifth lens 650. For example, the first surface of the fifth lens 650 may have a shape that becomes more concave toward an edge from a convex shape in a paraxial region. The second surface of the fifth lens 650 may have a shape that becomes more convex toward an edge from a concave shape in a paraxial region.

The sixth lens 660 may have a positive refractive power, a first surface of the sixth lens 660 may have a concave shape in a paraxial region, and a second surface of the sixth lens 660 may have a convex shape in a paraxial region.

The seventh lens 670 may have a positive refractive power, a first surface of the seventh lens 670 may have a convex shape in a paraxial region, and a second surface of the seventh lens 670 may have a concave shape in a paraxial region.

At least one inflection point may be formed on at least one of the first and second surfaces of the seventh lens 670. For example, the first surface of the seventh lens 670 may have a shape that becomes more concave toward an edge from a convex shape in a paraxial region. The second surface of the seventh lens 670 may have a shape that becomes more convex toward an edge from a concave shape in a paraxial region.

The eighth lens 680 may have a negative refractive power, a first surface of the eighth lens 680 may have a convex shape in a paraxial region, and a second surface of the eighth lens 680 may have a concave shape in a paraxial region.

At least one inflection point may be formed on at least one of the first and second surfaces of the eighth lens 680. For example, the first surface of the eighth lens 680 may have a shape that becomes more concave toward an edge from a convex shape in a paraxial region. The second surface of the eighth lens 680 may have a shape that becomes more convex toward an edge from a concave shape in a paraxial region.

Each surface of the first lens 610 to the eighth lens 680 may have an aspherical surface coefficient shown in Table 22 below. For example, both an object-side surface and an image-side surface of the first lens 610 to the eighth lens 680 are aspherical surfaces.

TABLE 22

|   | S1 | S2 | S3 | S4 | S5 | S6 | S7 | S8 |
|---|---|---|---|---|---|---|---|---|
| R | 2.020 | 1.897 | 1.908 | 27.333 | 27.796 | −8.235 | 8.660 | 2.442 |
| K | −1.143 | −5.090 | −3.609 | 0.000 | 0.000 | −85.463 | 38.379 | −6.655 |
| A | −0.011 | 0.006 | 0.012 | 0.000 | −0.004 | 0.104 | 0.049 | 0.006 |
| B | −0.017 | −0.134 | −0.107 | 0.001 | 0.032 | −0.363 | −0.300 | 0.008 |
| C | 0.018 | 0.192 | 0.209 | 0.060 | −0.011 | 0.644 | 0.579 | 0.012 |
| D | −0.014 | −0.285 | −0.437 | −0.317 | −0.215 | −0.810 | −0.672 | 0.024 |
| E | −0.001 | 0.327 | 0.582 | 0.597 | 0.529 | 0.773 | 0.553 | −0.062 |
| F | 0.007 | −0.214 | −0.406 | −0.535 | −0.542 | −0.522 | −0.331 | 0.052 |
| G | −0.003 | 0.072 | 0.142 | 0.234 | 0.260 | 0.209 | 0.124 | −0.022 |
| H | 0.000 | −0.010 | −0.020 | −0.040 | −0.048 | −0.036 | −0.021 | 0.004 |
| J | 0.000 | 0.000 | 0.000 | 0.000 | 0.000 | 0.000 | 0.000 | 0.000 |

|   | S9 | S10 | S11 | S12 | S13 | S14 | S15 | S16 |
|---|---|---|---|---|---|---|---|---|
| R | 7.751 | 7.583 | −13.132 | −4.728 | 3.037 | 3.065 | 1.742 | 1.161 |
| K | −99.000 | −88.527 | 25.461 | −3.044 | −2.230 | −40.205 | −11.187 | −4.591 |
| A | −0.043 | −0.026 | 0.062 | 0.046 | −0.004 | 0.077 | −0.168 | −0.115 |
| B | −0.027 | −0.068 | −0.155 | −0.171 | −0.070 | −0.121 | 0.034 | 0.046 |
| C | −0.003 | 0.072 | 0.209 | 0.244 | 0.052 | 0.074 | 0.010 | −0.013 |
| D | 0.064 | −0.050 | −0.202 | −0.206 | −0.022 | −0.030 | −0.006 | 0.003 |
| E | −0.102 | 0.018 | 0.122 | 0.108 | 0.005 | 0.008 | 0.001 | 0.000 |
| F | 0.082 | 0.002 | −0.043 | −0.034 | −0.001 | −0.001 | 0.000 | 0.000 |
| G | −0.032 | −0.003 | 0.008 | 0.006 | 0.000 | 0.000 | 0.000 | 0.000 |
| H | 0.005 | 0.000 | −0.001 | 0.000 | 0.000 | 0.000 | 0.000 | 0.000 |
| J | 0.000 | 0.000 | 0.000 | 0.000 | 0.000 | 0.000 | 0.000 | 0.000 |

As set forth above, according to the examples described herein, an optical imaging system may have high resolution and may adjust an amount of light incident on the optical system depending on a light level of a surrounding environment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having a positive refractive power, a convex object-side surface, and a concave image-side surface;
   a second lens having a negative refractive power, a convex object-side surface, and a concave image-side surface;
   a third lens having a convex object-side surface and a concave image-side surface;
   a fourth lens having a positive refractive power;
   a fifth lens having a refractive power, a convex object-side surface, and a concave image-side surface;
   a sixth lens having a refractive power and a convex object-side surface; and
   a seventh lens having a negative refractive power,
   wherein the first to seventh lenses are sequentially disposed from an object side of the optical imaging system toward an image side of the optical imaging system,
   wherein $-0.5<(|Ri|-|Rj|)/(|Ri|+|Rj|)<0.5$ is satisfied, where Ri is a radius of curvature of an object-side surface of the sixth lens, and Rj is a radius of curvature of an image-side surface of the sixth lens,
   wherein f14>f is satisfied, where f14 is a synthesized focal length of the first to fourth lenses, and f is an overall focal length of the optical imaging system, and
   wherein $1.64<Nmax\leq1.75$ is satisfied, where Nmax is a largest refractive index among a refractive index of the second lens, a refractive index of the third lens, and a refractive index of the fourth lens.

2. The optical imaging system of claim 1, wherein TTL/IMGHT<2.0 is satisfied, where TTL is a distance from an object-side surface of the first lens to an imaging plane of the optical imaging system, and IMGHT is one half of a diagonal length of the imaging plane.

3. The optical imaging system of claim 1, wherein FOV≥70° is satisfied, where FOV is an angle of view of the optical imaging system.

4. The optical imaging system of claim 1, wherein 4.7 mm<TTL<6.00 mm is satisfied, where TTL is a distance from an object-side surface of the first lens to an imaging plane of the optical imaging system.

5. The optical imaging system of claim 1, wherein the fourth lens has a convex object-side surface.

6. The optical imaging system of claim 1, wherein the fourth lens has a convex image-side surface.

7. The optical imaging system of claim 1, wherein the sixth lens has a concave image-side surface.

8. The optical imaging system of claim 1, wherein the seventh lens has a concave image-side surface.

* * * * *